(12) United States Patent
Conrad

(10) Patent No.: US 9,227,201 B2
(45) Date of Patent: *Jan. 5, 2016

(54) CYCLONE SUCH AS FOR USE IN A SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 13/780,213

(22) Filed: Feb. 28, 2013

(65) Prior Publication Data
US 2014/0237955 A1 Aug. 28, 2014

(51) Int. Cl.
*B01D 50/00* (2006.01)
*B04C 3/00* (2006.01)
(Continued)

(52) U.S. Cl.
CPC . *B04C 3/00* (2013.01); *A47L 5/225* (2013.01); *A47L 5/26* (2013.01); *A47L 5/30* (2013.01); *A47L 5/32* (2013.01); *A47L 7/0095* (2013.01); *A47L 9/16* (2013.01); *A47L 9/1608* (2013.01); *A47L 9/1683* (2013.01); *A47L 9/244* (2013.01); *A47L 9/32* (2013.01); *B01D 45/16* (2013.01); *B01D 50/002* (2013.01); *B04C 3/06* (2013.01);
(Continued)

(58) Field of Classification Search
CPC .............. B04C 3/00; B04C 5/14; B04C 5/13; B04C 3/06; B01D 45/16; B01D 50/002; A47L 5/26; A47L 9/1608; A47L 9/1683; A47L 9/32; A47L 7/0095; A47L 9/244; A47L 5/30; A47L 5/32; A47L 5/225; A47L 9/16
USPC ....... 55/447, 459.1, 337, DIG. 3, 458; 15/347
See application file for complete search history.

(56) References Cited

U.S. PATENT DOCUMENTS 911,258 A 2/1909 Neumann
1,600,762 A 9/1926 Hawley
(Continued)

FOREIGN PATENT DOCUMENTS

AU 112778 4/1940
CA 1077412 A 5/1980
(Continued)

OTHER PUBLICATIONS

International Preliminary Report on Patentability received on the corresponding international application No. PCT/CA2008/002257 issued Jun. 22, 2010.

(Continued)

*Primary Examiner* — Dung H Bui
(74) *Attorney, Agent, or Firm* — Philip C. Mendes da Costa; Bereskin & Parr LLP/S.E.N.C.R.L., s.r.l.

(57) ABSTRACT

A cyclone comprises a cyclone chamber having an air inlet, an air outlet, a first end wall, a second end wall and a sidewall, the air inlet has an inlet end having a shape and a cross sectional area in a plane transverse to a direction of airflow through the air inlet, and the air inlet is provided at a first juncture of the sidewall and the first end wall, the first end wall has a vortex finder having a wall that meets the first end wall at a second juncture, wherein the inlet is spaced from the vortex finder.

21 Claims, 68 Drawing Sheets

(51) Int. Cl.

| | | |
|---|---|---|
| *A47L 9/16* | (2006.01) | |
| *B04C 3/06* | (2006.01) | |
| *B04C 5/13* | (2006.01) | |
| *B04C 5/14* | (2006.01) | |
| *A47L 5/22* | (2006.01) | |
| *A47L 5/26* | (2006.01) | |
| *A47L 5/30* | (2006.01) | |
| *A47L 5/32* | (2006.01) | |
| *A47L 7/00* | (2006.01) | |
| *A47L 9/24* | (2006.01) | |
| *A47L 9/32* | (2006.01) | |
| *B01D 45/16* | (2006.01) | |
| *B04C 9/00* | (2006.01) | |

(52) U.S. Cl.
CPC ... *B04C 5/13* (2013.01); *B04C 5/14* (2013.01); *B04C 2009/004* (2013.01)

(56) References Cited

U.S. PATENT DOCUMENTS

| | | |
|---|---|---|
| 1,779,761 A | 10/1930 | Alford |
| 1,797,812 A | 3/1931 | Waring |
| 1,898,608 A | 2/1933 | Alexander |
| 1,937,765 A | 12/1933 | Leathers |
| 2,071,975 A | 2/1937 | O-Holm-Hansen et al. |
| 2,152,114 A | 3/1939 | Tongeren |
| 2,542,634 A | 2/1951 | Davis et al. |
| 2,678,110 A | 5/1954 | Madsen |
| 2,731,102 A | 1/1956 | James |
| 2,811,219 A | 10/1957 | Wenzl |
| 2,846,024 A | 8/1958 | Bremi |
| 2,913,111 A | 11/1959 | Rogers |
| 2,917,131 A | 12/1959 | Evans |
| 2,937,713 A | 5/1960 | Stephenson et al. |
| 2,942,691 A | 6/1960 | Dillon |
| 2,942,692 A | 6/1960 | Benz |
| 2,946,451 A | 7/1960 | Culleton |
| 2,952,330 A | 9/1960 | Winslow |
| 2,981,369 A | 4/1961 | Yellott et al. |
| 3,032,954 A | 5/1962 | Racklyeft |
| 3,130,157 A | 4/1964 | Kelsall et al. |
| 3,200,568 A | 8/1965 | McNeil |
| 3,204,772 A | 9/1965 | Ruxton |
| 3,217,469 A | 11/1965 | Eckert |
| 3,269,097 A | 8/1966 | German |
| 3,320,727 A | 5/1967 | Farley et al. |
| 3,372,532 A | 3/1968 | Campbell |
| 3,426,513 A | 2/1969 | Bauer |
| 3,518,815 A | 7/1970 | Peterson et al. |
| 3,530,649 A | 9/1970 | Porsch et al. |
| 3,561,824 A | 2/1971 | Homan |
| 3,582,616 A | 6/1971 | Wrob |
| 3,675,401 A | 7/1972 | Cordes |
| 3,684,093 A | 8/1972 | Kono |
| 3,788,044 A * | 1/1974 | McNeil ..................... 96/209 |
| 3,822,533 A | 7/1974 | Oranje |
| 3,898,068 A * | 8/1975 | McNeil ..................... 55/426 |
| 3,933,450 A | 1/1976 | Percevaut |
| 3,953,184 A | 4/1976 | Stockford et al. |
| 3,960,734 A | 6/1976 | Zagorski |
| 3,988,132 A | 10/1976 | Oranje |
| 3,988,133 A | 10/1976 | Schady |
| 4,097,381 A | 6/1978 | Ritzler |
| 4,187,088 A | 2/1980 | Hodgson |
| 4,218,805 A | 8/1980 | Brazier |
| 4,236,903 A | 12/1980 | Malmsten |
| 4,373,228 A | 2/1983 | Dyson |
| 4,382,804 A | 5/1983 | Mellor |
| 4,409,008 A | 10/1983 | Solymes |
| 4,486,207 A | 12/1984 | Baillie |
| 4,635,315 A | 1/1987 | Kozak |
| 4,678,588 A | 7/1987 | Shortt |
| 4,744,958 A | 5/1988 | Pircon |
| 4,778,494 A | 10/1988 | Patterson |
| 4,790,865 A | 12/1988 | DeMarco |
| 4,826,515 A | 5/1989 | Dyson |
| 4,853,011 A | 8/1989 | Dyson |
| 4,905,342 A | 3/1990 | Ataka |
| 5,078,761 A | 1/1992 | Dyson |
| 5,080,697 A | 1/1992 | Finke |
| 5,090,976 A | 2/1992 | Dyson |
| 5,129,125 A | 7/1992 | Gamou et al. |
| 5,139,652 A | 8/1992 | LeBlanc |
| 5,230,722 A | 7/1993 | Yonkers |
| 5,267,371 A | 12/1993 | Solerm et al. |
| 5,309,600 A | 5/1994 | Weaver et al. |
| 5,309,601 A | 5/1994 | Hampton et al. |
| 5,391,051 A | 2/1995 | Sabatier et al. |
| 5,481,780 A | 1/1996 | Daneshvar |
| 5,524,321 A | 6/1996 | Weaver et al. |
| 5,599,365 A * | 2/1997 | Alday et al. ................... 55/426 |
| 5,681,450 A | 10/1997 | Chitnis et al. |
| 5,715,566 A | 2/1998 | Weaver et al. |
| 5,755,096 A | 5/1998 | Holleyman |
| 5,858,038 A | 1/1999 | Dyson et al. |
| 5,858,043 A | 1/1999 | Geise |
| 5,893,938 A | 4/1999 | Dyson et al. |
| 5,922,093 A | 7/1999 | James et al. |
| 5,935,279 A | 8/1999 | Kilstroem |
| 5,950,274 A | 9/1999 | Kilstrom |
| 5,958,094 A | 9/1999 | Schwamborn et al. |
| 6,058,559 A | 5/2000 | Yoshimi et al. |
| 6,071,095 A | 6/2000 | Verkaart |
| 6,071,321 A | 6/2000 | Trapp et al. |
| 6,171,356 B1 | 1/2001 | Twerdun |
| 6,210,469 B1 | 4/2001 | Tokar |
| 6,221,134 B1 | 4/2001 | Conrad et al. |
| 6,228,260 B1 | 5/2001 | Conrad et al. |
| 6,231,645 B1 | 5/2001 | Conrad et al. |
| 6,251,296 B1 | 6/2001 | Conrad et al. |
| 6,260,234 B1 | 7/2001 | Wright et al. |
| 6,295,692 B1 | 10/2001 | Shideler |
| 6,398,834 B2 | 6/2002 | Oh |
| 6,406,505 B1 | 6/2002 | Oh et al. |
| 6,432,154 B2 | 8/2002 | Oh et al. |
| 6,434,785 B1 | 8/2002 | Vandenbelt et al. |
| 6,440,197 B1 | 8/2002 | Conrad et al. |
| 6,531,066 B1 | 3/2003 | Saunders et al. |
| 6,532,620 B2 | 3/2003 | Oh |
| 6,553,612 B1 | 4/2003 | Dyson et al. |
| 6,560,818 B1 | 5/2003 | Hasko |
| 6,581,239 B1 | 6/2003 | Dyson et al. |
| 6,599,338 B2 | 7/2003 | Oh et al. |
| 6,599,350 B1 | 7/2003 | Rockwell et al. |
| 6,613,316 B2 | 9/2003 | Sun et al. |
| 6,623,539 B2 | 9/2003 | Lee et al. |
| 6,625,845 B2 | 9/2003 | Hayashi et al. |
| 6,648,934 B2 | 11/2003 | Choi et al. |
| 6,706,095 B2 | 3/2004 | Morgan |
| 6,746,500 B1 | 6/2004 | Park et al. |
| 6,782,583 B2 | 8/2004 | Oh |
| 6,782,585 B1 | 8/2004 | Conrad et al. |
| 6,810,558 B2 | 11/2004 | Lee |
| 6,833,015 B2 | 12/2004 | Oh et al. |
| 6,868,578 B1 | 3/2005 | Kasper |
| 6,874,197 B1 | 4/2005 | Conrad |
| 6,896,719 B2 | 5/2005 | Coates et al. |
| 6,968,596 B2 | 11/2005 | Oh et al. |
| 7,065,826 B1 | 6/2006 | Arnold |
| 7,086,119 B2 | 8/2006 | Go et al. |
| 7,160,346 B2 | 1/2007 | Park |
| 7,175,682 B2 | 2/2007 | Nakai et al. |
| 7,222,393 B2 | 5/2007 | Kaffenberger et al. |
| 7,278,181 B2 | 10/2007 | Harris et al. |
| 7,341,611 B2 | 3/2008 | Greene et al. |
| 7,354,468 B2 | 4/2008 | Arnold et al. |
| 7,370,387 B2 | 5/2008 | Walker et al. |
| 7,377,953 B2 | 5/2008 | Oh |
| 7,381,234 B2 | 6/2008 | Oh |
| 7,386,916 B2 | 6/2008 | Bone |
| 7,395,579 B2 | 7/2008 | Oh |
| 7,410,516 B2 | 8/2008 | Ivarsson et al. |

(56) References Cited

U.S. PATENT DOCUMENTS

| | | | |
|---|---|---|---|
| 7,419,521 B2 | 9/2008 | Oh et al. |
| 7,448,363 B1 | 11/2008 | Rasmussen et al. |
| 7,449,040 B2 | 11/2008 | Conrad et al. |
| 7,485,164 B2 | 2/2009 | Jeong et al. |
| 7,488,363 B2 | 2/2009 | Jeong et al. |
| 7,544,224 B2 | 6/2009 | Tanner et al. |
| 7,547,338 B2 | 6/2009 | Kim et al. |
| 7,588,616 B2 | 9/2009 | Conrad et al. |
| 7,594,296 B2 | 9/2009 | Park |
| 7,597,730 B2 | 10/2009 | Yoo et al. |
| 7,618,470 B2 | 11/2009 | Eddington et al. |
| 7,624,475 B2 | 12/2009 | Choi |
| 7,645,311 B2 | 1/2010 | Oh et al. |
| 7,736,408 B2 | 6/2010 | Böck et al. |
| 7,740,676 B2 | 6/2010 | Burnham et al. |
| 7,776,116 B2 | 8/2010 | Oh et al. |
| 7,776,120 B2 | 8/2010 | Conrad |
| 7,779,506 B2 | 8/2010 | Kang et al. |
| 7,803,207 B2 | 9/2010 | Conrad |
| 7,867,308 B2 | 1/2011 | Conrad |
| 7,938,871 B2 | 5/2011 | Lloyd |
| 7,941,895 B2 | 5/2011 | Conrad |
| 7,979,953 B2 | 7/2011 | Yoo |
| 8,021,453 B2 | 9/2011 | Howes |
| 8,032,981 B2 | 10/2011 | Yoo |
| 8,034,140 B2 | 10/2011 | Conrad |
| 8,127,398 B2 | 3/2012 | Conrad |
| 8,166,607 B2 | 5/2012 | Conrad |
| 8,191,203 B2 | 6/2012 | Yoo |
| 8,468,464 B2 | 6/2013 | Abramson et al. |
| 2,015,464 A1 | 1/2015 | Saint-Jacques |
| 2001/0054213 A1* | 12/2001 | Oh et al. ................ 15/353 |
| 2002/0011050 A1 | 1/2002 | Hansen et al. |
| 2002/0011053 A1 | 1/2002 | Oh |
| 2002/0020154 A1 | 2/2002 | Yang |
| 2002/0062531 A1 | 5/2002 | Oh |
| 2002/0088208 A1 | 7/2002 | Lukac et al. |
| 2002/0112315 A1 | 8/2002 | Conrad |
| 2002/0124538 A1 | 9/2002 | Oh et al. |
| 2002/0134059 A1 | 9/2002 | Oh |
| 2002/0178535 A1 | 12/2002 | Oh et al. |
| 2002/0178698 A1 | 12/2002 | Oh et al. |
| 2002/0178699 A1 | 12/2002 | Oh |
| 2003/0046910 A1 | 3/2003 | Lee |
| 2003/0066273 A1 | 4/2003 | Choi et al. |
| 2003/0159238 A1 | 8/2003 | Oh |
| 2003/0159411 A1 | 8/2003 | Hansen et al. |
| 2003/0200736 A1 | 10/2003 | Ni |
| 2004/0010885 A1 | 1/2004 | Hitzelberger et al. |
| 2004/0025285 A1 | 2/2004 | McCormick et al. |
| 2004/0060146 A1 | 4/2004 | Coates et al. |
| 2004/0216264 A1 | 11/2004 | Shaver et al. |
| 2004/0237248 A1 | 12/2004 | Oh et al. |
| 2005/0050678 A1* | 3/2005 | Oh et al. ................ 15/353 |
| 2005/0132529 A1 | 6/2005 | Davidshofer |
| 2005/0138763 A1 | 6/2005 | Tanner et al. |
| 2005/0198769 A1 | 9/2005 | Lee et al. |
| 2005/0198770 A1 | 9/2005 | Jung et al. |
| 2005/0252179 A1 | 11/2005 | Oh et al. |
| 2006/0037172 A1 | 2/2006 | Choi |
| 2006/0042206 A1 | 3/2006 | Arnold et al. |
| 2006/0090290 A1 | 5/2006 | Lau |
| 2006/0123590 A1 | 6/2006 | Fester et al. |
| 2006/0137304 A1 | 6/2006 | Jeong et al. |
| 2006/0137305 A1 | 6/2006 | Jung |
| 2006/0137306 A1 | 6/2006 | Jeong et al. |
| 2006/0137309 A1 | 6/2006 | Jeong et al. |
| 2006/0137314 A1 | 6/2006 | Conrad et al. |
| 2006/0156699 A1* | 7/2006 | Kim .................... 55/345 |
| 2006/0162298 A1 | 7/2006 | Oh et al. |
| 2006/0162299 A1 | 7/2006 | North |
| 2006/0168922 A1 | 8/2006 | Oh |
| 2006/0168923 A1 | 8/2006 | Lee et al. |
| 2006/0207055 A1 | 9/2006 | Ivarsson et al. |
| 2006/0207231 A1 | 9/2006 | Arnold |
| 2006/0230715 A1 | 10/2006 | Oh et al. |
| 2006/0230723 A1 | 10/2006 | Kim et al. |
| 2006/0230724 A1 | 10/2006 | Han et al. |
| 2006/0230726 A1 | 10/2006 | Oh et al. |
| 2006/0236663 A1 | 10/2006 | Oh |
| 2006/0278081 A1 | 12/2006 | Han et al. |
| 2007/0012002 A1 | 1/2007 | Oh et al. |
| 2007/0012003 A1 | 1/2007 | Oh et al. |
| 2007/0039120 A1 | 2/2007 | Choi |
| 2007/0067944 A1 | 3/2007 | Kitamura |
| 2007/0079473 A1 | 4/2007 | Min |
| 2007/0079584 A1 | 4/2007 | Kim |
| 2007/0079585 A1 | 4/2007 | Oh et al. |
| 2007/0079587 A1 | 4/2007 | Kim |
| 2007/0084160 A1 | 4/2007 | Kim |
| 2007/0084161 A1 | 4/2007 | Yoo |
| 2007/0095028 A1 | 5/2007 | Kim |
| 2007/0095029 A1 | 5/2007 | Min |
| 2007/0209335 A1 | 9/2007 | Conrad |
| 2007/0251386 A1* | 11/2007 | Swank .............. B01D 45/12 95/271 |
| 2007/0262512 A1 | 11/2007 | Watanabe et al. |
| 2007/0271724 A1 | 11/2007 | Hakan et al. |
| 2007/0289085 A1 | 12/2007 | Yoo |
| 2007/0289089 A1 | 12/2007 | Yacobi |
| 2007/0289264 A1 | 12/2007 | Oh |
| 2007/0289267 A1 | 12/2007 | Makarov et al. |
| 2008/0040883 A1 | 2/2008 | Beskow et al. |
| 2008/0047091 A1* | 2/2008 | Nguyen ................ 15/300.1 |
| 2008/0134460 A1 | 6/2008 | Conrad |
| 2008/0134462 A1 | 6/2008 | Jansen et al. |
| 2008/0172995 A1 | 7/2008 | Conrad |
| 2008/0178416 A1 | 7/2008 | Conrad |
| 2008/0178420 A1 | 7/2008 | Conrad |
| 2008/0184681 A1 | 8/2008 | Oh et al. |
| 2008/0190080 A1 | 8/2008 | Oh et al. |
| 2009/0044371 A1 | 2/2009 | Yoo et al. |
| 2009/0113659 A1 | 5/2009 | Jeon |
| 2009/0133370 A1 | 5/2009 | Yoo et al. |
| 2009/0144929 A1 | 6/2009 | Yoo |
| 2009/0165431 A1 | 7/2009 | Oh |
| 2009/0178568 A1 | 7/2009 | Yoo |
| 2009/0181841 A1 | 7/2009 | Conrad |
| 2009/0193771 A1 | 8/2009 | Oh et al. |
| 2009/0205161 A1 | 8/2009 | Conrad |
| 2009/0209403 A1 | 8/2009 | Conrad |
| 2009/0209666 A1 | 8/2009 | Hellberg et al. |
| 2009/0307864 A1 | 12/2009 | Dyson |
| 2010/0005611 A1 | 1/2010 | Hong et al. |
| 2010/0095476 A1 | 4/2010 | Kim et al. |
| 2010/0162515 A1 | 7/2010 | Stephens |
| 2010/0236014 A1 | 9/2010 | Fester et al. |
| 2010/0293745 A1 | 11/2010 | Coburn |
| 2011/0219574 A1* | 9/2011 | Conrad ................ 15/347 |
| 2011/0219575 A1 | 9/2011 | Conrad |
| 2012/0047682 A1 | 3/2012 | Makarov et al. |
| 2012/0180662 A1 | 7/2012 | Missalla et al. |
| 2013/0145575 A1 | 6/2013 | Conrad |

FOREIGN PATENT DOCUMENTS

| | | |
|---|---|---|
| CA | 1218962 A | 3/1987 |
| CA | 2241644 C | 12/2007 |
| CA | 2438079 C | 8/2009 |
| CN | 2524655 Y | 12/2002 |
| CN | 1493244 A | 5/2004 |
| CN | 1887437 A | 1/2007 |
| DE | 875134 C | 4/1953 |
| DE | 3734355 C2 | 6/1989 |
| DE | 9216071.9 U1 | 2/1993 |
| DE | 4232382 C1 | 3/1994 |
| EP | 0489468 A1 | 6/1992 |
| EP | 493950 A2 | 7/1992 |
| EP | 1200196 B1 | 6/2005 |
| EP | 1779761 A2 | 2/2007 |
| EP | 1676516 B1 | 1/2010 |
| EP | 966912 A1 | 3/2010 |
| EP | 1629758 A3 | 10/2013 |
| EP | 2471429 A3 | 11/2013 |

(56) References Cited

FOREIGN PATENT DOCUMENTS

| | | | |
|---|---|---|---|
| FR | 2812531 | B1 | 11/2004 |
| GB | 700791 | A | 12/1953 |
| GB | 1111074 | A | 4/1968 |
| GB | 2163703 | B | 1/1988 |
| GB | 2282979 | B | 10/1997 |
| GB | 2365324 | B | 7/2002 |
| JP | 2000140533 | A | 5/2000 |
| KR | 100471142 | B1 | 3/2005 |
| WO | 8002561 | A1 | 11/1980 |
| WO | 94/00046 | A1 | 1/1994 |
| WO | 9619294 | A1 | 6/1996 |
| WO | 9627446 | A1 | 9/1996 |
| WO | 9640840 | A1 | 12/1996 |
| WO | 9809121 | A1 | 3/1998 |
| WO | 9843721 | A1 | 10/1998 |
| WO | 00/04816 | A1 | 2/2000 |
| WO | 00/78546 | A1 | 12/2000 |
| WO | 01/07168 | A1 | 2/2001 |
| WO | 2007021043 | A1 | 2/2007 |
| WO | 2006026414 | A3 | 8/2007 |
| WO | 2007104138 | A1 | 9/2007 |
| WO | 2008009883 | A1 | 1/2008 |
| WO | 2008009888 | A1 | 1/2008 |
| WO | 2007084699 | A3 | 2/2008 |
| WO | 2008070966 | A1 | 6/2008 |
| WO | 2009026709 | A1 | 3/2009 |
| WO | 2009076773 | A1 | 6/2009 |
| WO | 2009076774 | A1 | 6/2009 |

OTHER PUBLICATIONS

International Preliminary Report on Patentability received on the corresponding international application No. PCT/CA20008/002258 issued Jun. 22, 2010.
International Preliminary Report on Patentability received on the corresponding international application No. PCT/CA2010/000342 mailed Jun. 17, 2010.
The Office Action received in connection to the corresponding Chinese Patent Application No. CN200880113799.8 issued Jul. 23, 2012.
International Preliminary Report on Patentability received on the corresponding international application No. PCT/CA2007/000380 mailed Sep. 16, 2008.
The Office Action which issued in connection to the corresponding U.S. Appl. No. 12/338,007 Dated Dec. 22, 2011.
The Office Action which issued in connection to the corresponding U.S. Appl. No. 12/338,021 Dated Dec. 21, 2010.
The Office Action which issued in connection to the corresponding U.S. Appl. No. 12/338,022 Dated Jan. 27, 2012.
The Office Action which issued in connection to the corresponding U.S. Appl. No. 12/338,022 Dated Aug. 10, 2011.
The Office Action which issued in connection to the corresponding U.S. Appl. No. 12/338,022 Dated May 4, 2011.
The Office Action received in connection to the related Chinese Patent Application No. 00813438.3 issued Jul. 11, 2003.
The Office Action which issued in connection to the corresponding U.S. Appl. No. 12/338,035 Dated Jun. 29, 2010.
The Office Action received in connection to the corresponding Chinese Patent Application No. CN200880113799.8 issued Nov. 9, 2011.
The Office Action received in connection to the corresponding Chinese Patent Application No. 200880126486.6 Dated Mar. 23, 2012.
International Search Report received on the corresponding international application No. PCT/CA2008/002257 mailed Apr. 14, 2009.
International Search Report received on the corresponding international application No. PCT/CA2008/002258 mailed Apr. 9, 2009.
International Search Report received on the corresponding international application No. PCT/CA2010/000366 mailed Jun. 16, 2010.
The Office Action which issued in connection to the corresponding U.S. Appl. No. 11/683,751 mailed Sep. 8, 2009.
The Office Communication issued in connection to the corresponding U.S. Appl. No. 12/338,021 Dated Jul. 18, 2011.
Supplementary Search Report in European Patent Application No. 07719394.4 Dated Jun. 16, 2009.
European Communication pursuant to Rules 161(2) and 162 on European Patent Application No. 08862927.4, dated Aug. 16, 2010.
Extended Search Report in European Patent Application No. 08862927.4 dated Sep. 13, 2011.
Henry Hong, Notice of Allowance and Fee(s) Due mailed Oct. 3, 2013 in U.S. Appl. No. 13/723,138.
Handbook of Air Pollution Prevention and Control, Cheremisinoff, N. P., pp. 397-404, USA, 2002.
European Communication pursuant to Article 94(3) on European Patent Application No. 04078261.7, dated Apr. 24, 2012.
European Communication pursuant to Article 94(3) on European Patent Application No. 04078261.7, dated Feb. 26, 2010.
International Preliminary Examination Report on International application No. PCT/CA00/00873, dated Oct. 26, 2001.

* cited by examiner

CYCLONE SUCH AS FOR USE IN A SURFACE CLEANING APPARATUS

FIELD

This specification relates to cyclones having improved efficiency. In a preferred embodiment, a surface cleaning apparatus, such as a vacuum cleaner, is provided which utilizes one or more improved cyclones.

INTRODUCTION

The following is not an admission that anything discussed below is part of the prior art or part of the common general knowledge of a person skilled in the art.

Various types of surface cleaning apparatus are known. Typically, an upright vacuum cleaner includes an upper section, including an air treatment member such as one or more cyclones and/or filters, drivingly mounted to a surface cleaning head. An up flow conduit is typically provided between the surface cleaning head and the upper section. In some such vacuum cleaners, a spine, casing or backbone extends between the surface cleaning head and the upper section for supporting the air treatment member. The suction motor may be provided in the upper section or in the surface cleaning head.

Currently, many vacuum cleaners utilize one or more cyclonic stages to remove particulate matter from an air stream. Typically, the cyclones which are utilized comprise a cyclone chamber defined by an upper wall which is planar, a lower wall which is planar and the side wall which is cylindrical. Typically, an air inlet is provided at one end and an air outlet is provided at the opposed end. Alternate cyclone designs have been disclosed. For example, U.S. Pat. No. 8,250,702 discloses a cyclone having an air inlet and an air outlet at one end and a dirt outlet at the opposed end. The opposed end with the dirt outlet has a rounded transition member extending between the end wall facing the air outlet and the side wall of the cyclone chamber.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to a broad aspect, a cyclone, such as may be used in a vacuum cleaner or other surface cleaning apparatus, is provided. Turbulence or eddy currents which develop in a cyclone chamber may reduce the efficiency of the cyclone chamber. For example, the eddy currents may result in mixing of different layers of air and accordingly, air which has had particulate matter removed therefrom could be mixed with air which still contains particulate matter. In addition, the back pressure created by the passage of air through a cyclone chamber may be increased by turbulence and eddy currents which are created in a cyclone chamber. The cleaning efficiency of a surface cleaning apparatus, such as a vacuum cleaner, depends upon the velocity of air flow at the air inlet. All other factors remaining the same, an increase in the rate of air flow at the dirty air inlet of a vacuum cleaner will increase the cleaning efficiency of the vacuum cleaner. Accordingly, reducing the back pressure through a cyclone chamber may increase the cleaning efficiency of a vacuum cleaner.

In one embodiment, a cyclone chamber is provided wherein the portion of the cyclone chamber at the cyclone air inlet is configured to have a shape that is at least preferably proximate the shape of the air exiting the cyclone air inlet and entering the cyclone chamber. For example, the cyclone air inlet may be provided at a position where the sidewall of a cyclone chamber meets an end wall of the cyclone chamber. Typically, the sidewall and end wall of cyclone chambers meet at a 90° angle. In accordance with this embodiment, the juncture of the sidewall and the end wall are preferably configured to at least approximate a portion of the shape of the air inlet adjacent this juncture. For example, the juncture of the end wall and side wall of the cyclone chamber may be angled and, preferably, rounded and, most preferably, radiused so as to have the same shape as the outlet end of the cyclone chamber inlet. Accordingly, the air which travels through the cyclone air inlet into the cyclone chamber may maintain its same cross-sectional shape as it enters the cyclone chamber. The airstream may expand increasing its cross-sectional area as it travels through the cyclone chamber. However, the air will have a smoother transition to the cyclonic flow in the cyclone chamber than if the juncture of the sidewall and end walls is at a 90° angle. An advantage of this design is that the back pressure created by the cyclone chamber may be reduced and turbulence or eddy currents may be reduced or eliminated by smoothing the transition from the air inlet to the cyclone chamber at the air inlet end.

In some embodiments, the air inlet may be at the same end as the air outlet. In such a case, a vortex finder may extend inwardly into the cyclone chamber from the same end wall at which the cyclone air inlet is provided. In such a case, it is preferred that the vortex finder is positioned such that the air entering the cyclone chamber from the outlet end of the cyclone air inlet is spaced from the vortex finder. The distance between the sidewall and the vortex finder is preferably greater than the diameter of the outlet end of the cyclone air inlet. Accordingly, as air enters the cyclone chamber from the cyclone air inlet, it will be spaced from the vortex finder. In accordance with this embodiment, a portion of the end wall will extend from a position that is equivalent to the diameter of the outlet end of the air inlet and the vortex finder. This portion of the end wall may be of various configurations. For example, it may be rounded or angled. Preferably, this portion of the end wall is flat.

It will be appreciated by a person skilled in the art that the spacing of the vortex finder from the sidewall disclosed herein need not be utilized with the contouring of the juncture of the end wall and side wall at the cyclone air inlet, but may be used by itself, or in combination with any other feature disclosed herein.

Alternately or in addition, the juncture of the sidewall of the vortex finder and the end wall of the cyclone chamber may also be rounded. An advantage of this design is that the back pressure through the cyclone chamber may be reduced. It will be appreciated that the juncture of the sidewall of the vortex finder and the end wall of the cyclone chamber may be angled, but is preferably rounded and, more preferably has a radius that is proximate the radius of the juncture of the sidewall and end wall at the cyclone air inlet. It will be appreciated by a person skilled in the art that any of the features of the rounding of the juncture of the vortex finder and the end wall of the cyclone chamber discussed herein need not be utilized with the contouring of the juncture of the end wall and side wall at the cyclone air inlet, but may be used by itself, or in combination with any other feature disclosed herein.

In some embodiments, the air inlet and the air outlet of the cyclone chamber may be at the same end. An insert may be provided on the opposed wall of the cyclone chamber and extend into the cyclone chamber. For example, the insert may be aligned with the vortex finder but at the opposed wall. In such a case, the sidewall of the insert and the opposed end wall may meet at the juncture which is shaped similar to that of any of the junctures disclosed herein. For example, the juncture of the sidewall of the insert in the opposed end wall of the cyclone chamber may be angled and is preferably rounded and, more preferably, has a radius which is proximate to that of the radius of the juncture of the sidewall and the end wall at the air inlet. It will be appreciated by a person skilled in the art that any of the features of the shaping of the juncture of the sidewall and the opposed end wall need not be utilized with the contouring of the juncture of the end wall and side wall at the cyclone air inlet, but may be used by itself, or in combination with any other feature disclosed herein.

In another embodiment, a vacuum cleaner may have a pre-motor filter. A header may be provided upstream and/or downstream of the pre-motor filter. For example, the cyclone air outlet may extend to a header upstream of the pre-motor filter. The header enables the air exiting the air outlet to extend across the entire pre-motor filter upstream surface thereby allowing the entire pre-motor upstream surface to be used as a filtration mechanism. A header may be provided on the downstream side of the pre-motor filter. The header allows air to exit the pre-motor filter from all portions of the downstream side of the pre-motor filter and to be directed towards, e.g. as central outlet so as to convey the air to a suction motor inlet. The walls of the upstream and/or downstream header may be configured to reduce back pressure through such a pre-motor filter housing. For example, the juncture of the cyclone air outlet and the wall of the pre-motor filter header facing the upstream side of the pre-motor filter may be shaped similar to that of any of the junctures disclosed herein and may be angled or radiused. Alternately, or in addition, the juncture of the wall of the pre-motor filter header facing the upstream side of the pre-motor filter where it meets a sidewall of the pre-motor filter housing may be shaped similar to that of any of the junctures disclosed herein and may be angled or radiused. The wall of the header opposed to the upstream surface of the pre-motor filter may itself be continuously curved or angled as it extends outwardly to the sidewall of the filter housing and need not be parallel to the pre-motor filter. In a particularly preferred embodiment, the air outlet of the cyclone chamber may be trumpet shaped (e.g., flared) and accordingly the transition to the wall opposed to the upstream end of the pre-motor filter may be smooth (i.e., there may be no discontinuities). It will be appreciated that such a design may permit the air exiting the cyclone chamber to transition with less turbulence into the header thereby reducing the back pressure of the air travelling through the upstream header of a pre-motor filter.

Alternately, or in addition, the juncture of the downstream header air outlet and the wall of the pre-motor filter header facing the downstream side of the pre-motor filter may be shaped similar to that of any of the junctures disclosed herein and may be angled or radiused. Alternately, or in addition, the juncture of the wall of the pre-motor filter header facing the downstream side of the pre-motor filter where it meets a sidewall of the pre-motor filter housing may be shaped similar to that of any of the junctures disclosed herein and may be angled or radiused. The wall of the header opposed to the downstream surface of the pre-motor filter may itself be continuously curved or angled as it extends outwardly to the sidewall of the filter housing and need not be parallel to the pre-motor filter. In a particularly preferred embodiment, the air outlet of the downstream header may be trumpet shaped (e.g., flared) and accordingly the transition from the wall opposed to the downstream end of the pre-motor filter to the header outlet may be smooth (i.e., there may be no discontinuities). It will be appreciated that such a design may permit the air exiting the pre-motor filter to transition with less turbulence into the downstream header outlet thereby reducing the back pressure of the air travelling through the downstream header of a pre-motor filter.

It will be appreciated by a person skilled in the art that any of the features relating to the shaping of the upstream and/or downstream pre-motor filter header need not be utilized with the contouring of the juncture of the end wall and side wall at the cyclone air inlet, but may be used by itself, or in combination with any other feature disclosed herein.

In accordance with another embodiment, the pre-motor filter may be supported on a plurality of ribs which are provided on the end wall of the downstream header facing the pre-motor filter. The ribs are preferably configured so as to impart a flow of air in the same direction as the direction of rotating fan blade of the suction motor. Accordingly, the ribs may be rounded and extend towards a center of the suction motor air inlet.

In a preferred embodiment, the suction motor inlet may be trumpet shaped (e.g. flared) and the ribs may extend along a portion of the trumpet shaped section of the air inlet to the suction motor. In such a case, the upstream side of the ribs preferably is at the same height so as to provide a flat surface to support the pre-motor filter. Accordingly, the height of the ribs may increase as the ribs extend into the trumpet shaped portion of the suction motor inlet. It will be appreciated by a person skilled in the art that any of the features of the ribs of the suction motor inlet need not be utilized with the contouring of the juncture of the end wall and side wall at the cyclone air inlet, but may be used by itself, or in combination with any other feature disclosed herein.

In accordance with another embodiment, the vortex finder may be provided with a screen. The screen may surround a portion of the sidewall of the vortex finder and extend further into the cyclone chamber further than the vortex finder. Alternately, the screen may be mounted on the innermost end of the vortex finder and extend further into the cyclone chamber. Preferably, the inner end of the screen (i.e. the end of the screen that is inner most of the cyclone chamber) has a diameter that is less than the diameter of the vortex finder and/or a diameter that is less than the diameter of the outlet end of the cyclone air inlet. The screen may be conical in shape and may extend from the innermost end of the screen to a position adjacent the sidewall of a vortex finder or it may abut the innermost end of the vortex finder. Alternately, the screen may be cylindrical or any other shape. Preferably, the outermost end of the screen (e.g. the screen adjacent the inlet end of the vortex finder) has a diameter approximate the diameter of the vortex finder. An advantage of this design is that the distance between the screen and the sidewall of the cyclone chamber is increased and provides additional room to allow the air travelling in the cyclone chamber to reverse direction and enter the vortex finder. The additional room reduces, for example, the likelihood of the treated air mixing with the air entering the cyclone chamber and transferring particulate matter from the air entering the cyclone chamber to the treated air.

It will be appreciated by a person skilled in the art that any of the features of the shaping of the screen discussed herein may not be utilized with the contouring of the juncture of the end wall and side wall at the cyclone air inlet, but may be used by itself, or in combination with any other feature disclosed herein.

In accordance with another embodiment, the cyclone chamber may have a sidewall outlet. For example, a dirt collection chamber may be provided adjacent one side of or may surround all of the cyclone chamber. The dirt outlet may be provided at an upper end of the sidewall and comprise a gap between all or a portion of the sidewall and the end wall of the cyclone chamber and preferably a portion of the sidewall and the end wall of the cyclone chamber (e.g., a slot provided in the sidewall at the end wall of the cyclone chamber). The slot may be of various shapes. For example, the walls of the slot may be rounded and one end of the slot may be taller than the other, preferably the downstream side in the direction of rotation of air in a cyclone chamber.

Alternately, or in addition, a barrier wall may be provided spaced from the dirt outlet and accordingly extend between the dirt outlet and the sidewall of the dirt collection chamber facing the dirt outlet. The barrier wall may be parallel to the cyclone chamber wall or the downstream end of the barrier wall may be spaced further from the cyclone chamber wall than the upstream end of the barrier wall. The barrier wall may be affixed to an end wall of the dirt collection chamber, a sidewall of the dirt collection chamber and/or the sidewall of the cyclone chamber. If the barrier wall is connected to the sidewall of the cyclone chamber, the barrier wall is preferably connected to the sidewall of the dirt collection chamber upstream of the dirt outlet. The height of the barrier wall may be the same as the dirt outlet but it may be shorter or longer. In addition, the height may vary in the downstream direction.

It will be appreciated by a person skilled in the art that any of the features of the dirt outlet and/or barrier wall discussed here need not be utilized with the contouring of the juncture of the end wall and side wall at the cyclone air inlet, but may be used by itself, or in combination with any other feature disclosed herein.

In another embodiment, the suction motor housing may have an inner wall which is scalloped. For example, the end wall of the motor housing facing the suction motor may be scalloped. Alternately, the sidewall generally parallel to the cyclone motor axis may be scalloped. Preferably, the sidewall which is scalloped is opposed to a sidewall air outlet from the suction motor housing. An advantage of this design is that the scalloped shape reflects noise back towards the suction motor thereby reducing the sound of the suction motor of a vacuum cleaner. The reduction in noise can also result in a reduction in the back pressure through the vacuum cleaner, and, accordingly, an increase in the cleaning efficiency of the vacuum cleaner. It will be appreciated by a person skilled in the art that any of the features of the shaping of the suction motor housing discussed herein may not be utilized with the contouring of the juncture of the end wall and side wall at the cyclone air inlet, but may be used by itself, or in combination with any other feature disclosed herein.

The vacuum cleaner which uses the cyclone and/or pre-motor filter housing and/or suction motor housing that is disclosed herein may be provided with a turbo brush. For example, this vacuum cleaner may have an above-floor cleaning wand and a turbo brush may be attachable thereto. Due to the reduced back pressure which may be achieved utilizing one of more of the features disclosed herein, a turbo brush may be used while still obtaining good cleaning efficiency. Accordingly, by reducing the back pressure through the cyclone chamber and/or pre-motor filter housing and/or motor housing, the saving in the reduction of the back pressure may be utilized to power or assist in powering a turbo brush thereby providing good cleaning efficiency while enabling a turbo brush to be utilized.

In accordance with another embodiment, the suction motor housing may incorporate a sound absorbing material or structure. For example, a sound absorbing material may be provided in the suction motor housing which is constructed from a plurality of different sound absorbing materials. For example, a sound absorbing sheet may be produced using small pieces of different sound absorbing material such as polyurethane, silicon and the like. Each material will typically absorb sound in a particular frequency range. The use of a combination of different materials will allow a single piece of sound absorbing material to absorb a greater frequency range of sounds. Further, the sheet may be made utilizing different sized pieces of the different materials. Alternately, or in addition, a sound shield may be provided which has a plurality of layers with different sized openings. For example, a plurality of screens having different sized openings may be spaced apart and may have foam provided therebetween. The different sized openings will restrict the transmission of sound therethrough in a different way. Preferably, the screens are made of one or more of a metallic material, glass or carbon fiber. The combination enables a vacuum cleaner to have a quieter sound by reducing the transmission of sound through the multiple layers without unduly impeding the flow of air therethrough. It will be appreciated by a person skilled in the art that any of the features of the sound absorbing material or shield disclose herein may not be utilized with the contouring of the juncture of the end wall and side wall at the cyclone air inlet, but may be used by itself, or in combination with any other feature disclosed herein.

In one embodiment, there is provided a cyclone comprising a cyclone chamber having an air inlet, an air outlet, a first end wall, a second end wall and a sidewall. The air inlet may have an inlet end having a shape and a cross sectional area in a plane transverse to a direction of airflow through the air inlet. The air inlet may be provided at a first juncture of the sidewall and the first end wall. The first end wall may have a vortex finder having a wall that meets the first end wall at a second juncture. The air inlet may be spaced from the vortex finder.

In some embodiments, the cyclone chamber may have a diameter and the air inlet may be spaced from the vortex finder by a distance that is up to 10% of the diameter.

In some embodiments, a portion of the first end wall may extend between the air inlet and the vortex finder and the portion may be rounded.

In some embodiments, a portion of the first end wall may extend between the air inlet and the vortex finder and the portion may be flat.

In some embodiments, the vortex finder may extend into the cyclone chamber a first distance and the air inlet may have an inner end that extends into the cyclone chamber a distance less than the first distance.

In some embodiments, at least one of the first and second junctures may extend at an angle to the walls between which it is positioned.

In some embodiments, at least one of the first and second junctures may be rounded.

In some embodiments, at least one of the first and second junctures may have a radius that is proximate a radius of the air inlet.

In some embodiments, the first end wall may be openable and at least a portion of one of the first and second junctures may be part of the openable first end wall.

In some embodiments, the first juncture downstream on of the air inlet may be configured to at least approximate a portion of the shape of the air inlet end that is adjacent the first juncture.

In some embodiments, the first juncture may extend at an angle to both the sidewall and the first end wall.

In some embodiments, the first juncture may be rounded.

In some embodiments, the second juncture may be rounded.

In some embodiments, the first juncture may have a radius that is proximate a radius of the air inlet and the second juncture may have a radius that is proximate the radius of the first juncture.

In some embodiments, the cyclone may further comprise a central insert member extending away from a center of the second end wall into the cyclone chamber. The central insert member may comprise a central member wall extending away from the second end wall and the central member wall and the second end wall may meet at a third juncture that extends at an angle to both the central member wall and the second end wall.

In some embodiments, the third juncture may be rounded.

In some embodiments, the cyclone may further comprise a dirt collection chamber external to the cyclone chamber and in communication with the cyclone chamber via a dirt outlet.

In some embodiments, the sidewall may extend to the second end wall and the dirt outlet may be provided in the sidewall adjacent the second end wall.

In some embodiments, each of the vortex finder and the central insert member may have an inner end and a screen may extend between the inner ends.

In some embodiments, the vortex finder may comprise a screen. The screen may have an inner end. The inner end may have a cross sectional area in a plane transverse to a direction of airflow through the vortex finder. The cross sectional area of the inner end may be less than the cross sectional area of the air inlet.

It will be appreciated by a person skilled in the art that a surface cleaning apparatus may embody any one or more of the features contained herein and that the features may be used in any particular combination or sub-combination.

DRAWINGS

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

General Description of an Upright Vacuum Cleaner

Figure 1:
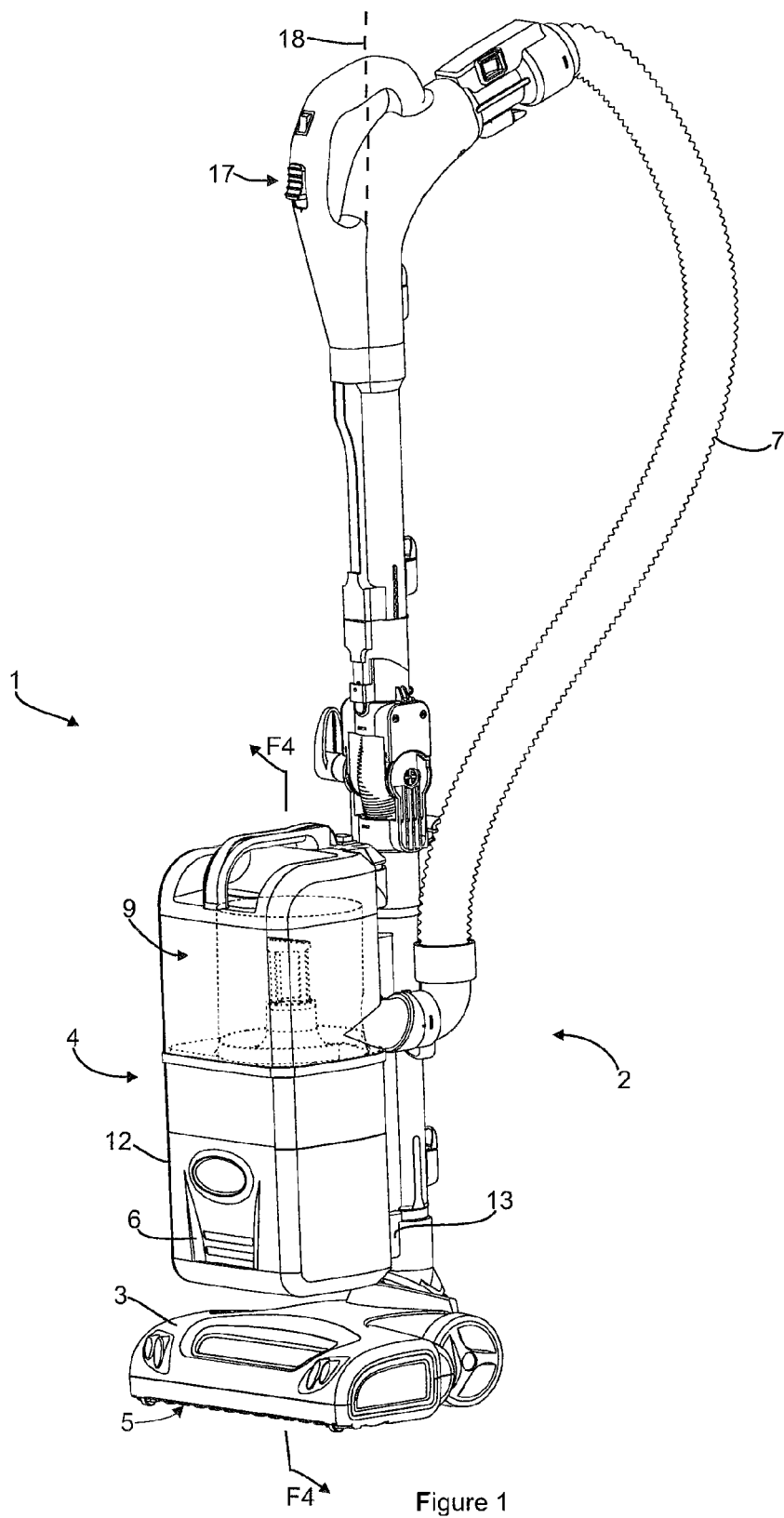
FIG. 1 is a perspective view of a surface cleaning apparatus in a storage position.
Figure 2:
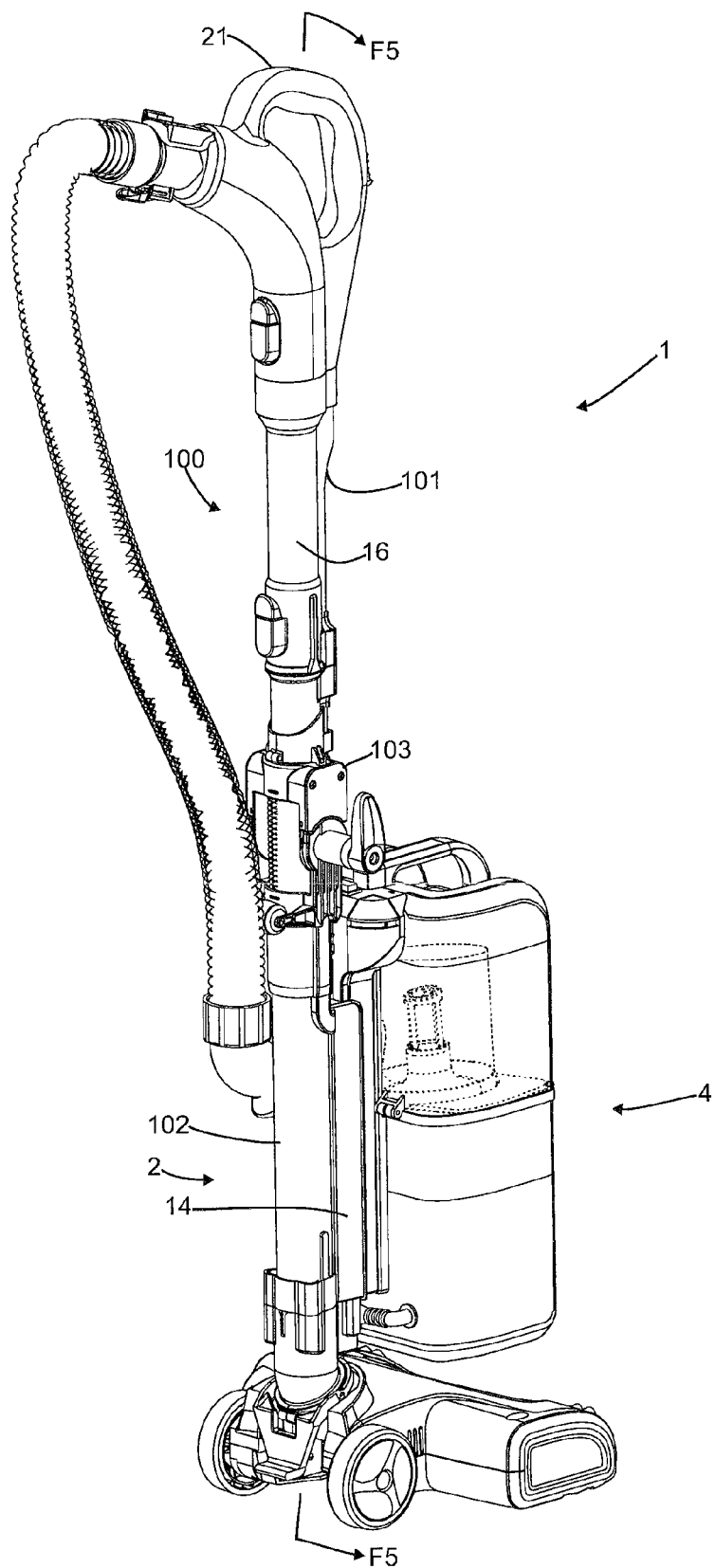
FIG. 2 is a rear perspective view of the surface cleaning apparatus of FIG. 1.
Figure 3:
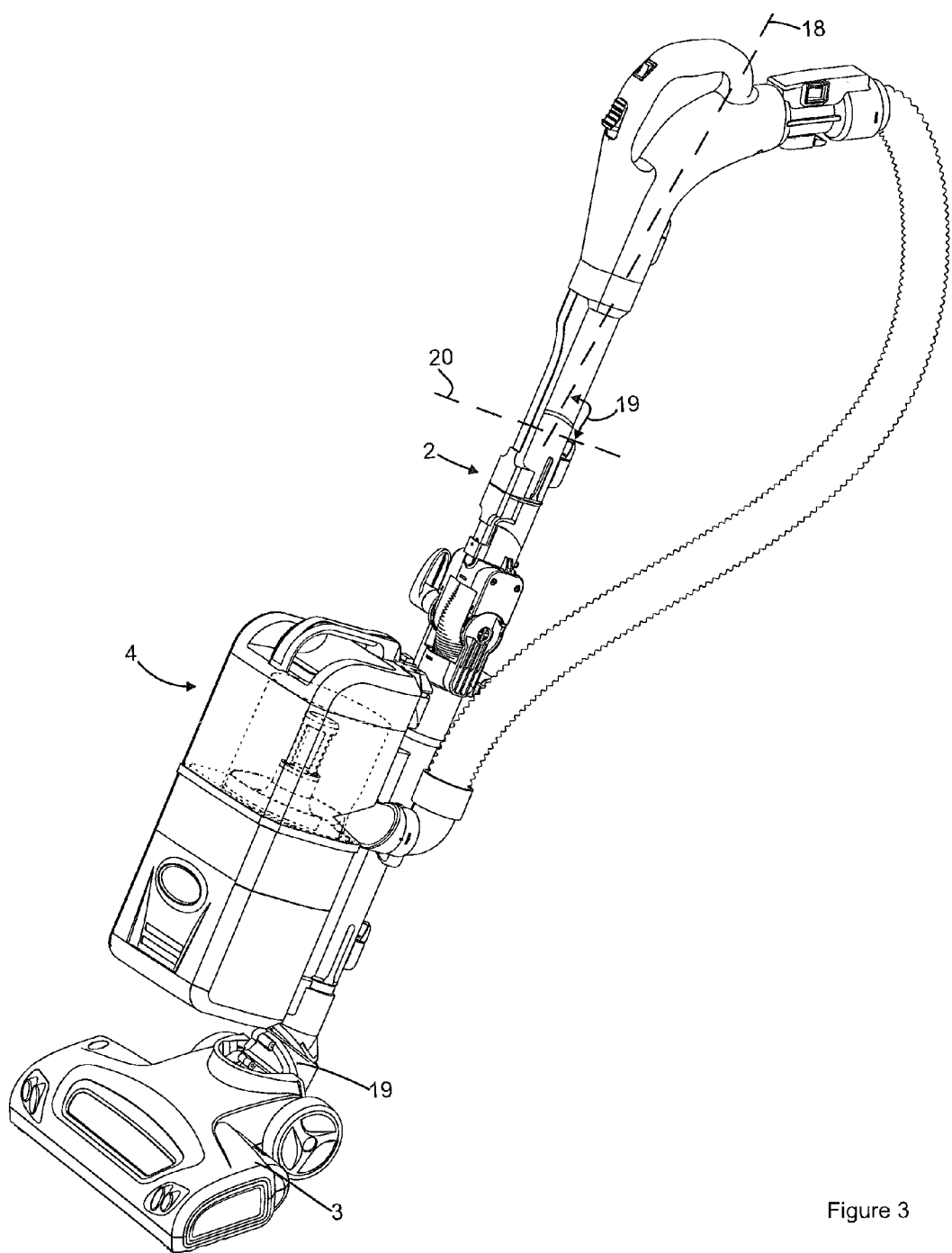
FIG. 3 is a perspective view of the surface cleaning apparatus of FIG. 1 in a floor cleaning position.

Referring to FIGS. 1-3, a first embodiment of a surface cleaning apparatus 1 is shown. In the embodiment shown, the surface cleaning apparatus is an upright vacuum cleaner. In alternate embodiments, the surface cleaning apparatus may be another suitable type of surface cleaning apparatus, such as a canister type vacuum cleaner, and hand vacuum cleaner, a stick vac, a wet-dry type vacuum cleaner or a carpet extractor.

In the illustrated example, the surface cleaning apparatus 1 includes an upper portion or support structure 2 that is movably and drivingly connected to a surface cleaning head 3. A surface cleaning unit 4 is mounted on the upper portion 2. The surface cleaning apparatus 1 also has at least one dirty air inlet 5, at least one clean air outlet 6, and an air flow path or passage extending therebetween. In the illustrated example, the air flow path includes at least one flexible air flow conduit member (such as a hose 7 or other flexible conduit). Alternatively, the air flow path may be formed from rigid members.

At least one suction motor and at least one air treatment member are positioned in the air flow path to separate dirt and other debris from the airflow. The suction motor and the air treatment member may be provided in the upper portion and/or the surface cleaning head of an upright surface cleaning apparatus. Preferably, the suction motor and the air treatment member are provided in a removable surface cleaning unit. The air treatment member may be any suitable air treatment member, including, for example, one or more cyclones, filters, and bags, and preferably the at least one air treatment member is provided upstream from the suction motor. Preferably, as exemplified in FIG. 4, the surface cleaning unit includes both the suction motor 8, in a motor housing 12 and an air treatment member in form of a cyclone bin assembly 9. The motor housing can include at least one removable or openable door 13 which may allow a user to access the interior of the motor housing 12, for example to access the motor 8, a filter or any other component within the housing 12. The cyclone bin assembly 9 includes a cyclone chamber 10 and a dirt collection chamber 11.

Figure 5:
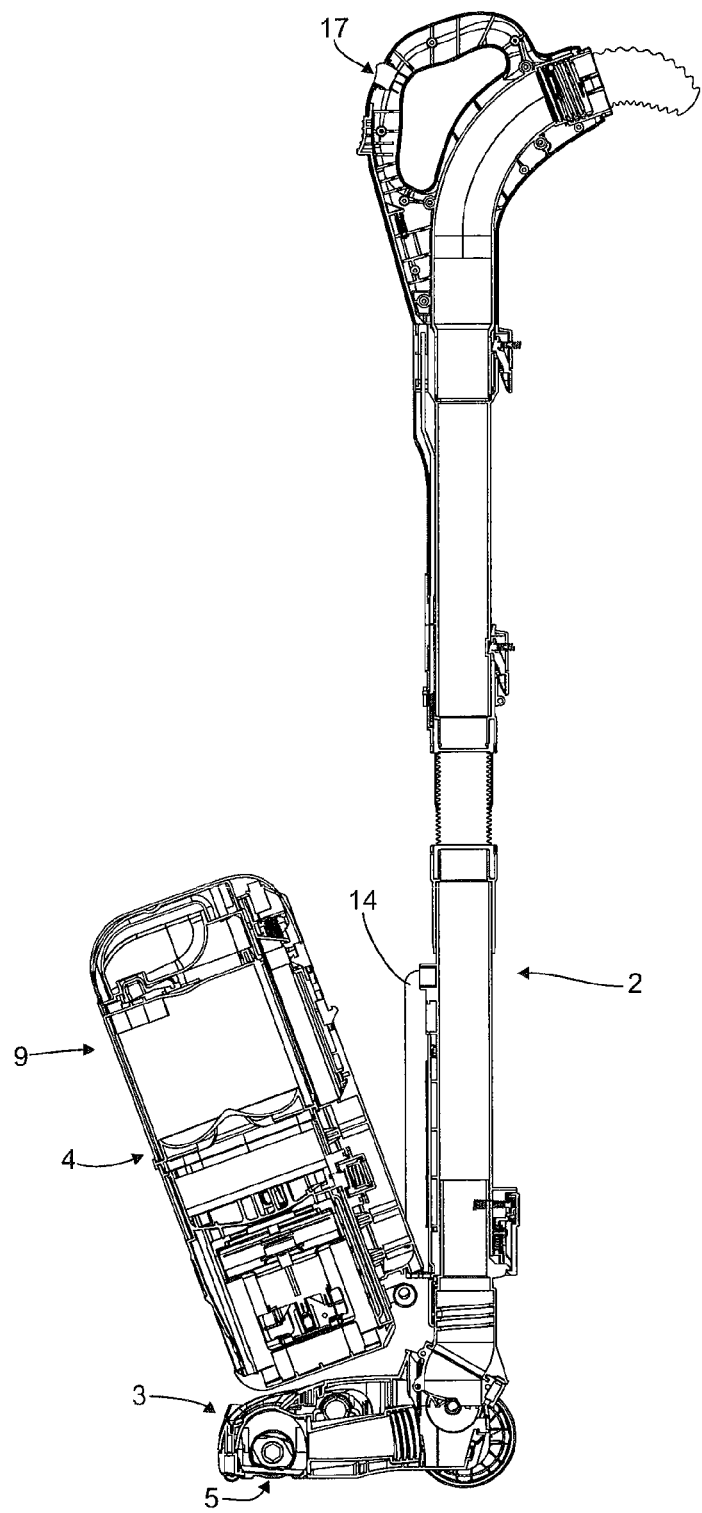
FIG. 5 is cross sectional view taken along line F5-F5 in FIG. 2.

Optionally, the surface cleaning unit 4 may be a portable surface cleaning unit and may be detachable from the upper portion (FIG. 5). In such embodiments, the surface cleaning unit 4 may be connected to the upper portion 2 by a mount apparatus 14 that allows the surface cleaning unit 4 to be detached from the upper section 2. It will be appreciated that a portable surface cleaning unit 4 could be carried by a hand of a user, a shoulder strap or the like and could be in the form of a pod or other portable surface cleaning apparatus. All such surface cleaning apparatus are referred to herein as a hand carriable surface cleaning apparatus.

In the embodiment shown, the surface cleaning head 3 includes the dirty air inlet 5 in the form of a slot or opening 15 (FIG. 4) formed in a generally downward facing surface of the surface cleaning head 3. From the dirty air inlet 5, the air flow path extends through the surface cleaning head 3, and through an up flow conduit 16 (FIG. 2) in the upper portion 2 to the surface cleaning unit 4. In the illustrated example, the clean air outlet 6 is provided in the front of the surface cleaning unit 4, and is configured to direct the clear air in a generally lateral direction, toward the front of the apparatus 1.

A handle 17 is provided on the upper portion 2 to allow a user to manipulate the surface cleaning apparatus 1. Referring to FIGS. 1 and 3, the upper portion extends along an upper axis 18 and is moveably mounted to the surface cleaning head 3. In the illustrated example, the upper portion 2 is pivotally mounted to the surface cleaning head via a pivot joint 19. The pivot joint 19 may be any suitable pivot joint. In this embodiment, the upper portion 2 is movable, relative to the surface cleaning head 3, between a storage position (FIG. 1), and a use or floor cleaning position (FIG. 3). In the floor cleaning position the upper portion 2 may be inclined relative to the surface being cleaned, and an angle 19 between a plane 20 parallel to the surface and the upper axis 18 may be between about 20 and about 85°.

Alternatively, or in addition to being pivotally coupled to the surface cleaning head, the upper portion may also be rotatably mounted to the surface cleaning head. In this configuration, the upper portion, and the surface cleaning unit supported thereon, may be rotatable about the upper axis. In this configuration, rotation of the upper portion about the upper axis may help steer the surface cleaning head across the floor (or other surface being cleaned). It will be appreciated that the forgoing discussion is exemplary and that an upright vacuum cleaner may use a surface cleaning head and upper portion of any design and they may be moveably connected together by any means known in the art.

Handle/Cleaning Wand Construction

In accordance with one aspect of the teachings described herein, which may be used in combination with any one or more other aspects, the air flow path between the surface cleaning head 3 and the surface cleaning unit 4 includes a bendable hollow conduit or wand member 100, which may be used in combination with a flexible hose portion 7. Preferably, the hose 7 is extensible and more preferably is elastically or resiliently extensible.

Referring to FIG. 2, the wand member 100 includes an upper wand portion 101 and a lower wand portion 102. The upper and lower wand portions 101, 102 are connected to each other via a connection, e.g., a hinge 103 member, which allows relative movement between the upper and lower wand portions 102, 103. Optionally, the hinge member 103 can be configured to form part of the air flow path and to provide fluid communication between the upper and lower wand portions 101, 102, as well as provide a pivoting, mechanical linkage. For example, upper and lower wand portions 101, 102 may be moveably connected to each other by providing a pivot join that permits the upper and lower wand portions 101, 102 to be connected in air flow communication or by each wand portion having projections that are pivotally connected to each other and with a flexible hose to provide the air flow communication between the wand portions. Alternatively, the air flow path can be external to the hinge. The handle 17 is provided toward the top of the upper portion 2 and is attached to the upper or downstream end of the upper wand portion 101. In the illustrated embodiment, the handle 17 includes a hand grip portion 21 that is configured to be grasped by a user. The hinge member 103 can be locked in a straight configuration (FIG. 9) and can be unlocked to allow the upper wand portion 101 to pivot relative to the lower wand member 102 (FIG. 10).

In the illustrated example, the upper and lower wand portions 101, 102 and the handle 17 are hollow tube-like conduit members that form part of the air flow path and can carry at least some of the weight of the surface cleaning apparatus 4. The wand 100 is also configured to transfer driving and steering forces between the handle 17 and the surface cleaning head 3.

The upper and lower wand portions 101, 102 may be made of any suitable material that can withstand the weight of the surface cleaning apparatus 4 and the driving and steering forces, including, for example, plastic, metal and the like. Optionally, upper and lower wand portions 101, 102 may be formed from the same material. Alternatively, they may be formed from different materials.

Figure 9:
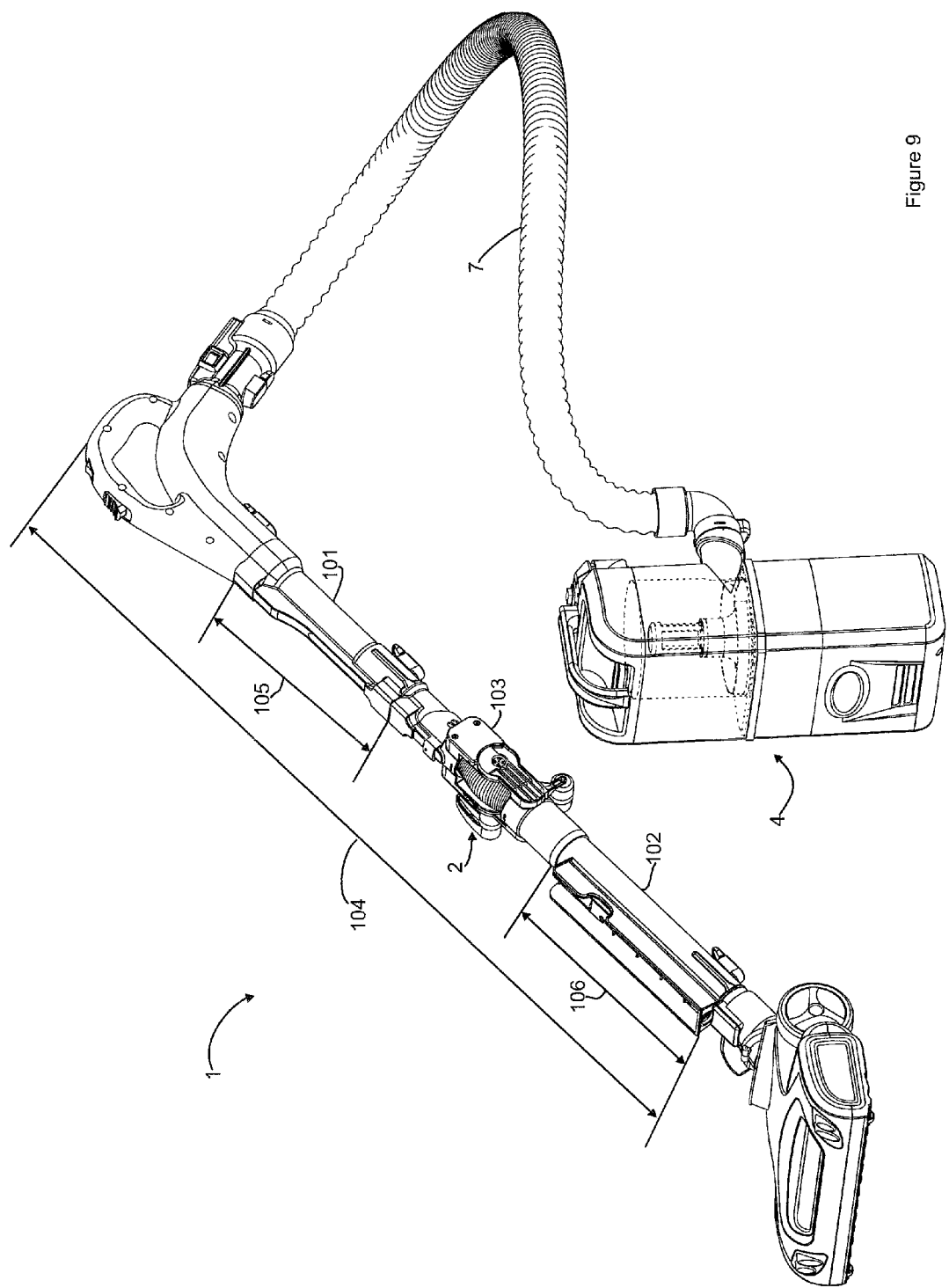
FIG. 9 is a perspective view of the surface cleaning apparatus of FIG. 1 in another cleaning configuration.
Figure 10:
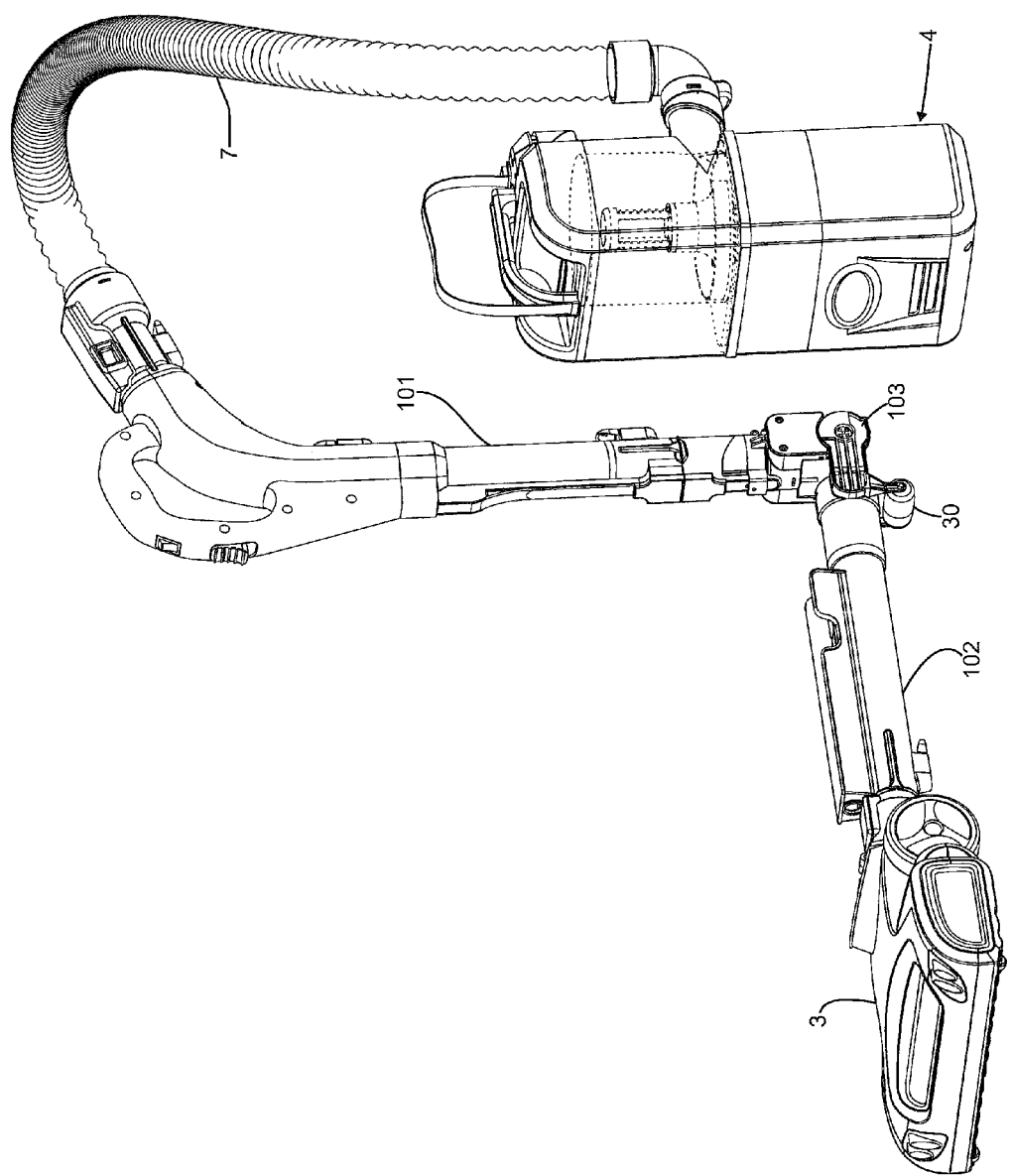
FIG. 10 is a perspective view of the surface cleaning apparatus of FIG. 1 in another cleaning configuration.

Referring to FIG. 9 the distance 104 between the surface cleaning head 3 and the upper end of the handle 17 defines an upper portion height. Preferably, the upper portion height 104 can be selected so that the handle 17 is positioned so to be grasped by users of varying heights. The upper portion height 104 may be between, for example, about 35 inches and about 60 inches, and preferably is between about 40 inches and about 50 inches. In the illustrated example, the upper portion height 104 is between about 41 inches and about 45 inches.

The upper wand portion 101 defines an upper wand length 105 and the lower wand portion 102 defines a lower wand length 106. The upper and lower wand lengths 105, 106 may be the same, or may be different. Preferably, each of the upper and lower wand lengths 105, 106 are between about 15% and about 80% of the upper portion height 104. Altering the relative lengths of the upper and lower wand portions may change the position of the hinge 103 relative to the surface cleaning head 3.

In one aspect of the teachings described herein, which may be used in combination with any one or more other aspects, the upright vacuum cleaner 1 may be operable in a variety different functional configurations or operating modes. The versatility of operating in different operating modes may be achieved by permitting the surface cleaning unit to be detachable from the upper portion. Alternatively, or in addition, further versatility may be achieved by permitting portions of the vacuum cleaner to be detachable from each other at a plurality of locations in the upper portion, and re-connectable to each other in a variety of combinations and configurations.

In the example illustrated, mounting the surface cleaning unit 4 on the upper portion 2 increases the weight of the upper portion 2 and can affect the maneuverability and ease of use of the surface cleaning apparatus. With the surface cleaning unit 4 attached, the vacuum cleaner 1 may be operated like a traditional upright style vacuum cleaner, as illustrated in FIGS. 1-3.

Alternatively, in some cleaning situations the user may preferably detach the surface cleaning unit 4 from the upper portion 2 and choose to carry the surface cleaning unit 4 (e.g. by hand or by a strap) separately from the upper portion 2, while still using the upper portion 2 to drivingly maneuver the surface cleaning head 3. When the surface cleaning unit 4 is detached, a user may more easily maneuver the surface cleaning head 3 around or under obstacles, like furniture and stairs.

To enable the vacuum suction generated by the surface cleaning unit 4 to reach the surface cleaning head 3 when the surface cleaning unit 4 is detached from the support structure 2, the airflow connection between the surface cleaning head 3 and the cleaning unit 4 is preferably at least partially formed by a flexible conduit, such as the flexible hose 7. The use of a flexible conduit allows a user to detach the surface cleaning unit 4 and maintain a flow connection between the portable surface cleaning unit 4 and the surface cleaning head 3 without having to reconfigure or reconnect any portions of the airflow conduit 16 (FIG. 6).

Figure 6:
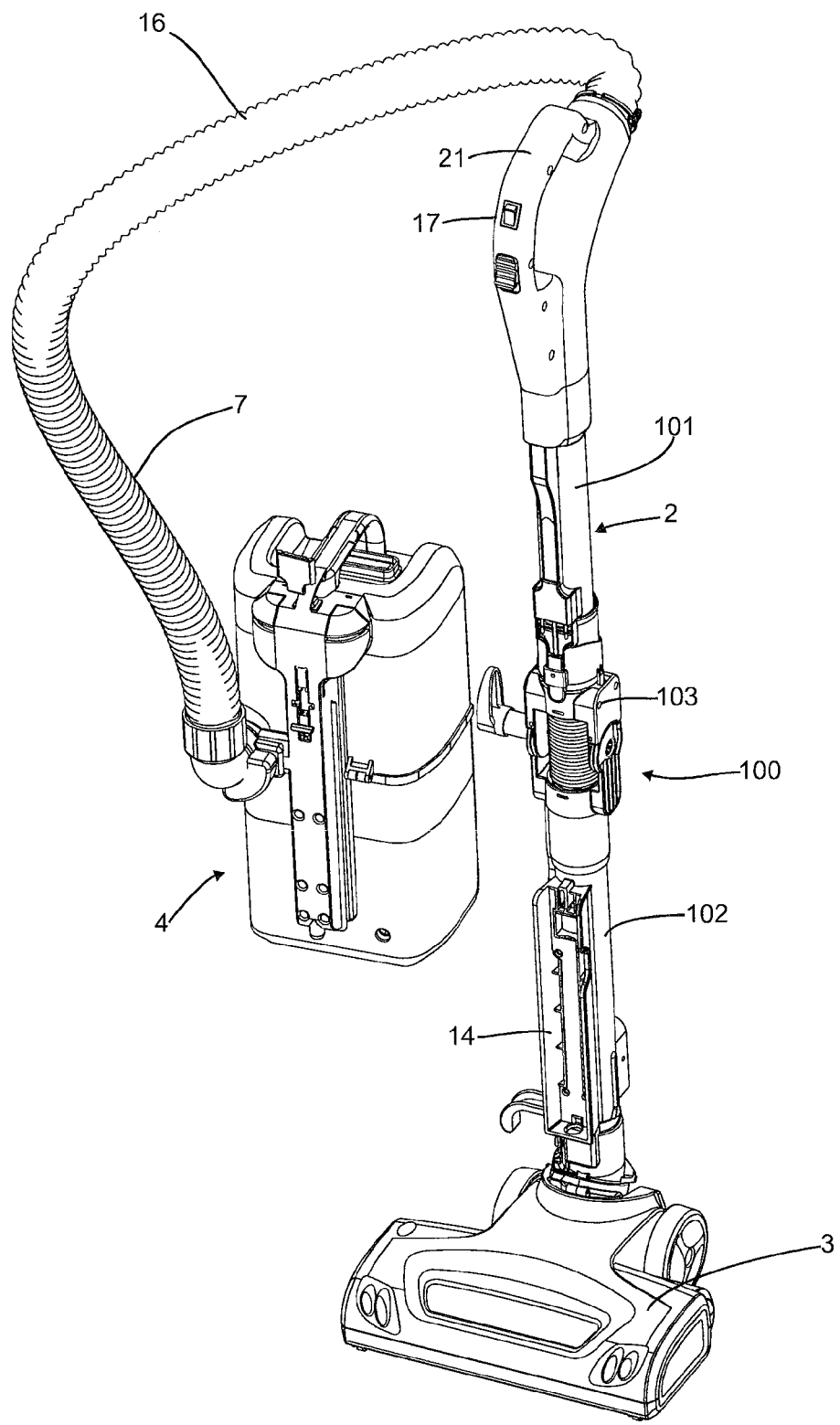
FIG. 6 is a perspective view of the surface cleaning apparatus of FIG. 1 in a cleaning configuration.

Referring to FIG. 6, when the surface cleaning apparatus 1 is in use, a user may detach the surface cleaning unit 4 from the upper portion 2 without interrupting the airflow communication between the cleaning unit 4 and the surface cleaning head 3. This allows a user to selectively detach and re-attach the cleaning unit 4 to the support structure 2 during use without having to stop and reconfigure the connecting hoses 7 or other portions of the airflow conduit 16.

FIGS. 6, 9 and 10 and illustrate a configuration in which the vacuum cleaner 1 can be operated with the surface cleaning unit 4 detached from the upper portion 2 and the air flow path between the surface cleaning unit 4 and the surface cleaning head 3 remains intact. FIG. 9 shows the upper portion 2 in a straight configuration. FIG. 10 shows the upper portion 2 in an optional bent configuration. In both configurations, the surface cleaning head 3 is operable to clean the floor.

Figure 8:
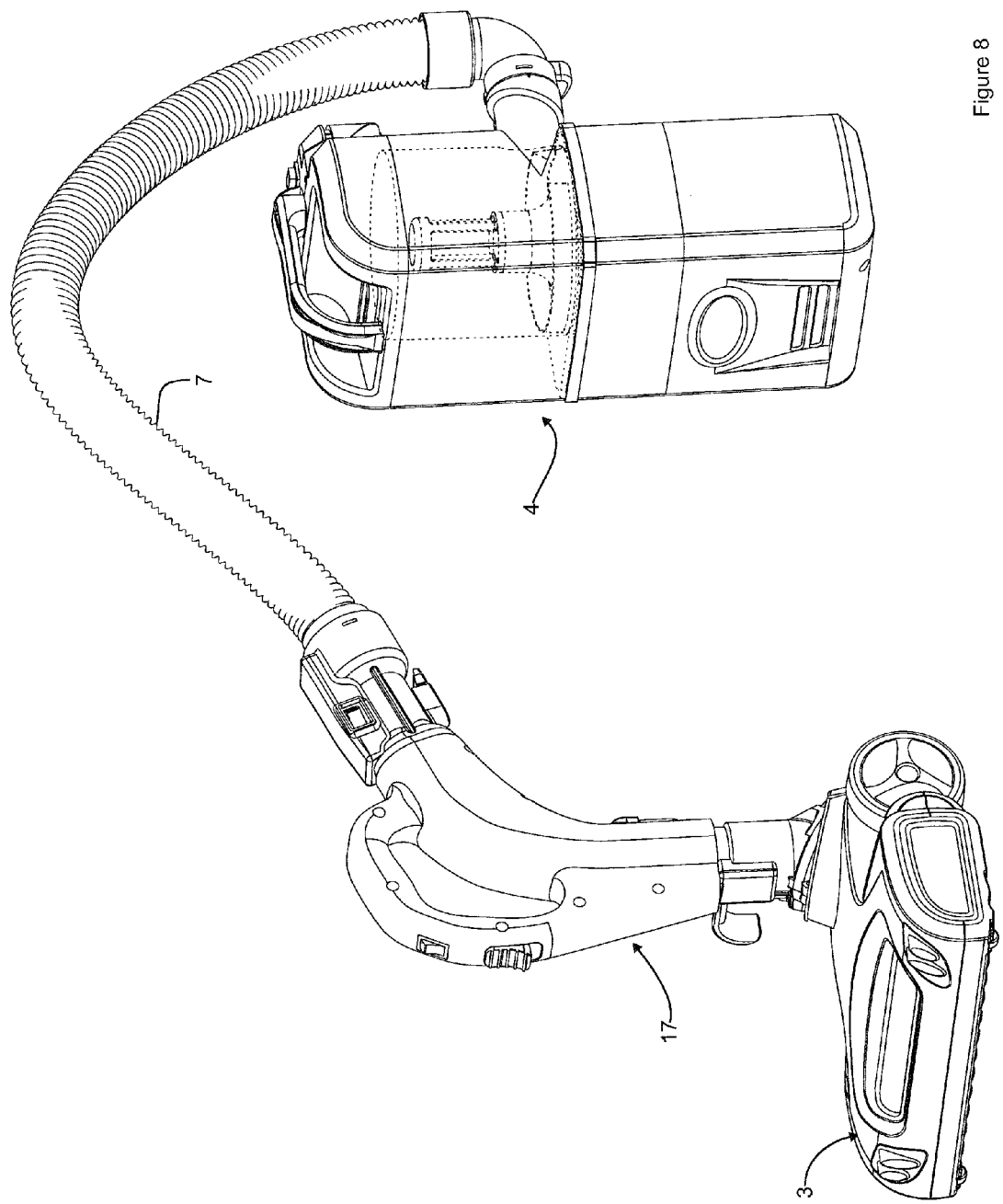
FIG. 8 is a perspective view of the surface cleaning apparatus of FIG. 1 in another cleaning configuration.

Alternatively, in some cleaning operations the user may wish to reconfigure portions of the air flow path to provide a surface cleaning apparatus with a desired configuration. For example, in another configuration, as exemplified in FIG. 8, the wand portion of the upper section 2 is removed and the upstream end of the handle 17 is coupled directly to the surface cleaning head 3. This configuration may be useful when cleaning stairs or other surfaces that are elevated. This is another example of a floor or surface cleaning operating mode.

In addition to being operable to clean floors or surfaces, the vacuum cleaner may be operated in a variety of cleaning modes that do not include use of the surface cleaning head, and may be generally described as above floor cleaning modes. This can generally include cleaning furniture, walls, drapes and other objects as opposed to cleaning a large, planar surface.

Figure 7:
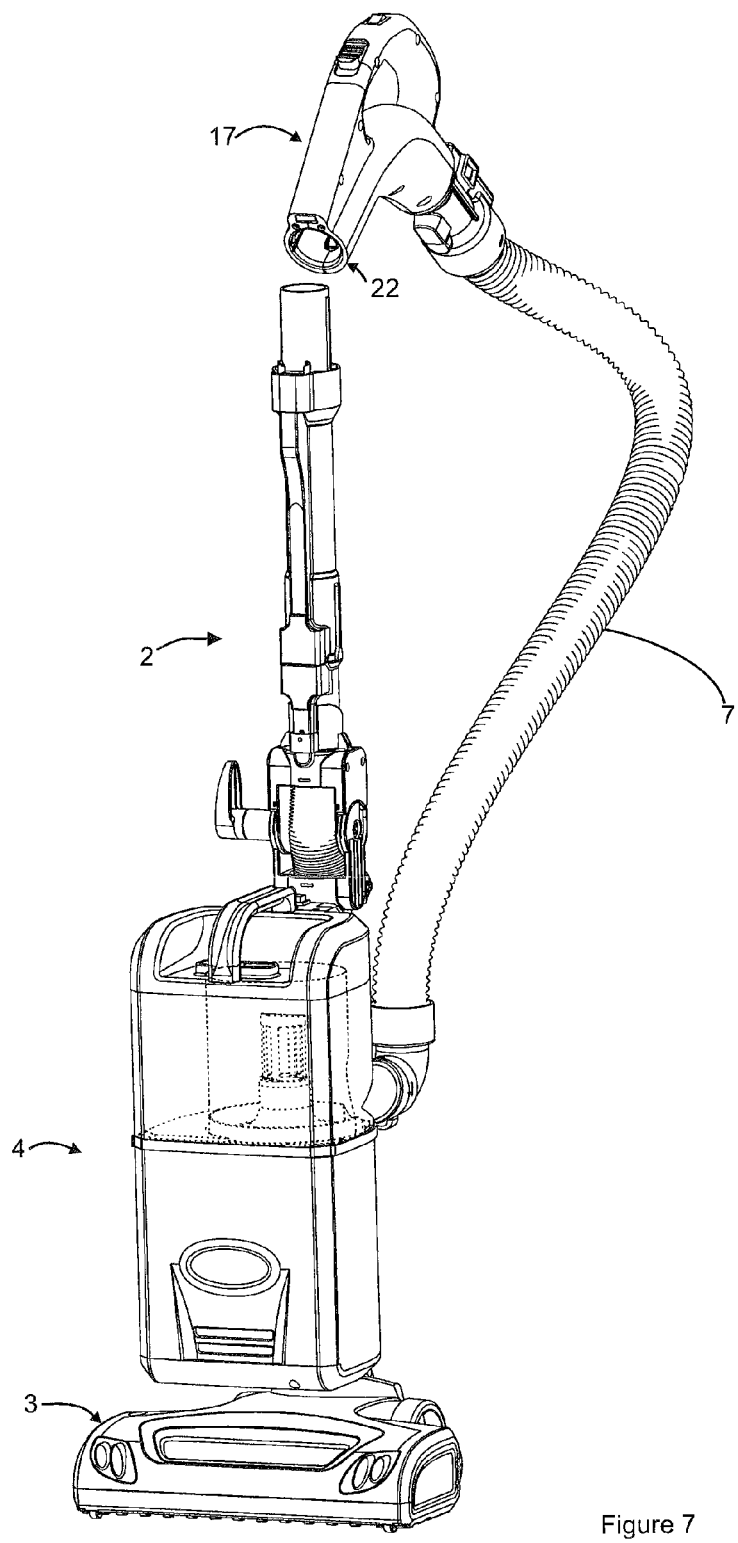
FIG. 7 is a perspective view of the surface cleaning apparatus of FIG. 1 in another cleaning configuration.

In one example of an above floor cleaning mode, as exemplified in FIG. 7, the surface cleaning unit 4 can remain mounted on the upper portion 2. This eliminates the need for the user to separately support the weight of the surface cleaning unit 4. In the illustrated configuration, the upstream end of the handle 17 is separated from the downstream end of the upper wand portion 100. In this configuration the upstream end 22 of the handle 17 can function as the dirty air inlet for the vacuum cleaner 1. Optionally, accessory tools, such as wands, crevasse tools, turbo brushes, hoses or other devices may be coupled to the upstream end 22 of the handle 17.

Figure 11:
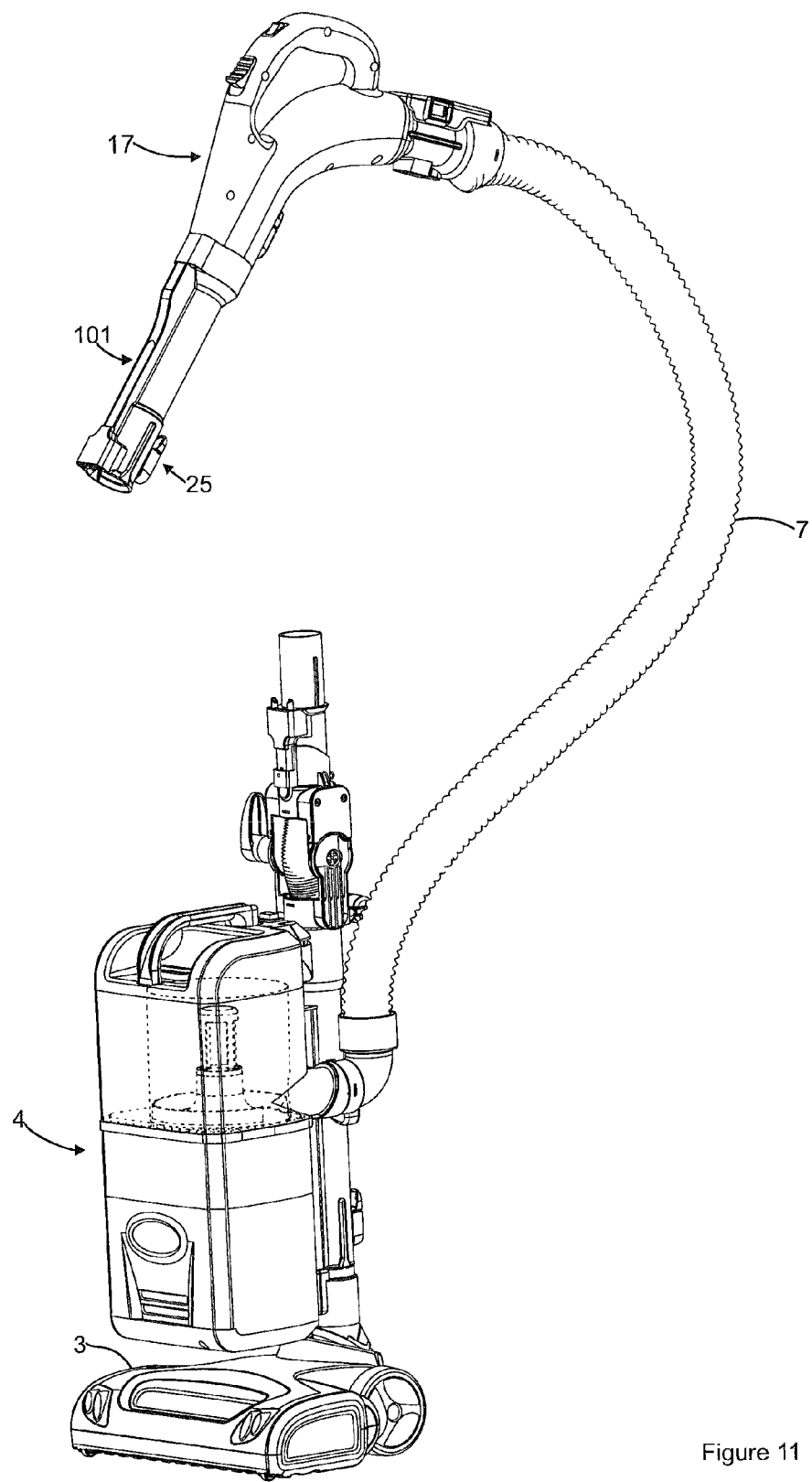
FIG. 11 is a perspective view of the surface cleaning apparatus of FIG. 1 in another cleaning configuration.
Figure 14:
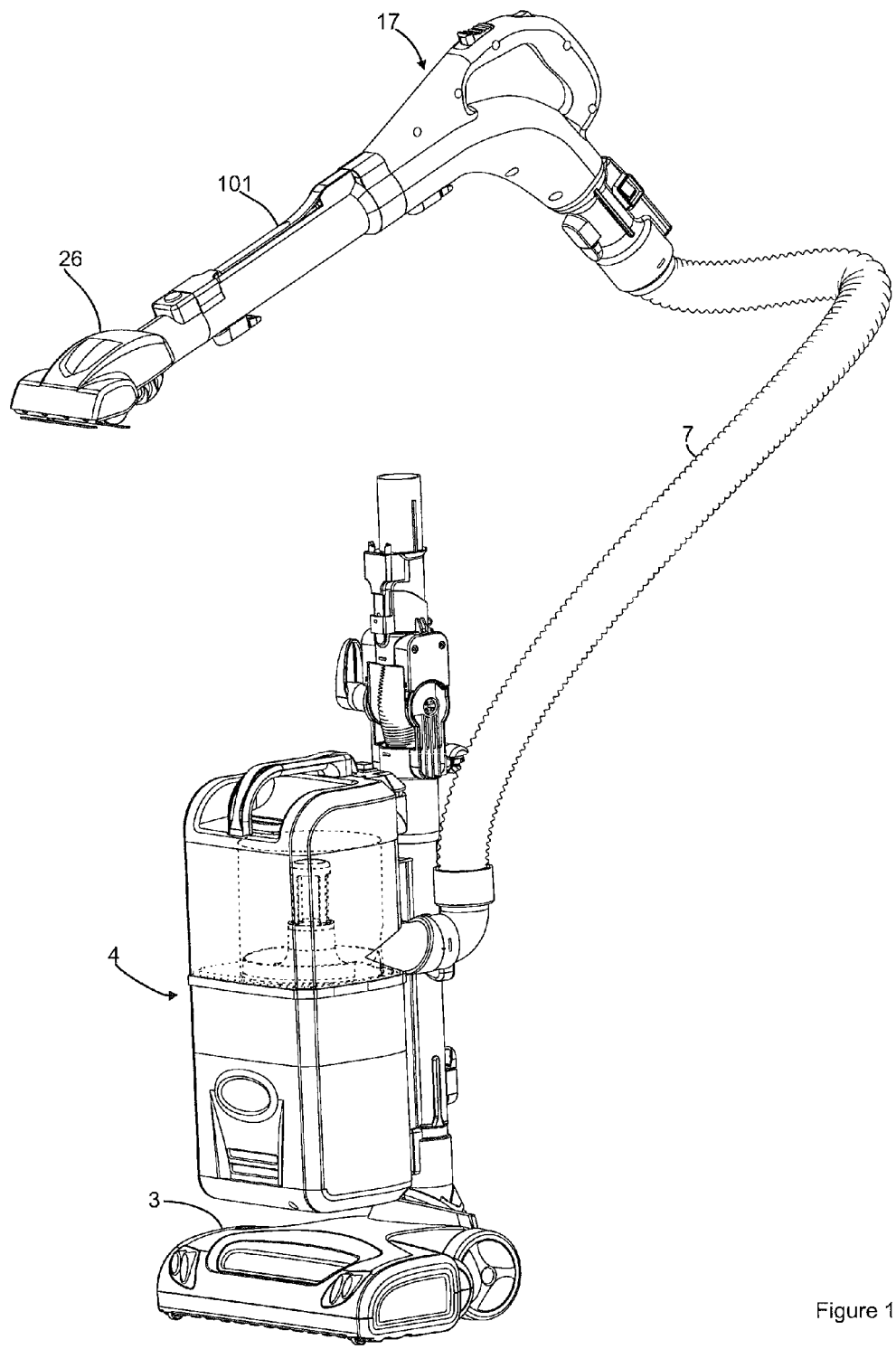
FIG. 14 is a perspective view of the surface cleaning apparatus of FIG. 1 in another cleaning configuration.
Figure 15:
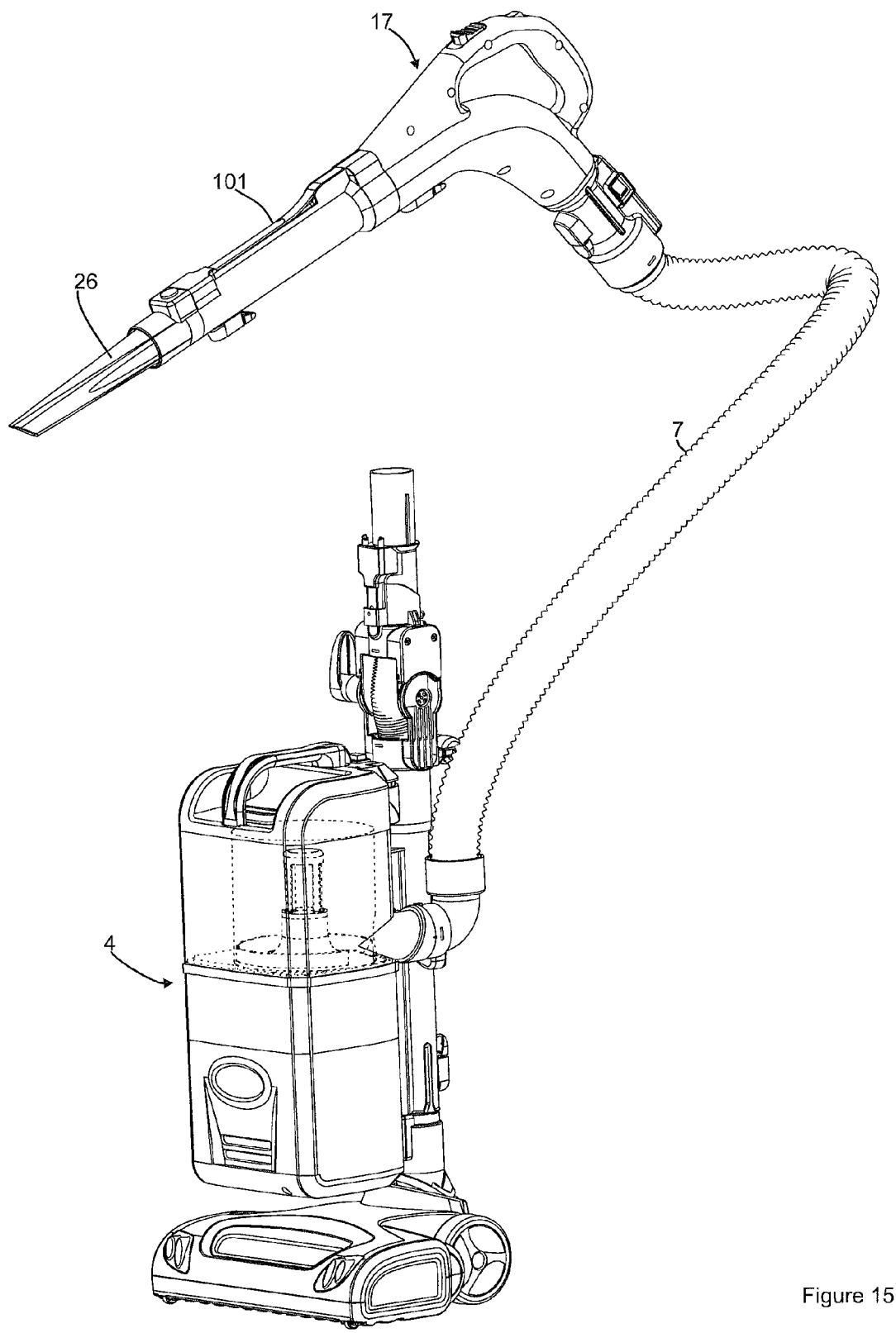
FIG. 15 is a perspective view of the surface cleaning apparatus of FIG. 1 in another cleaning configuration.
Figure 16:
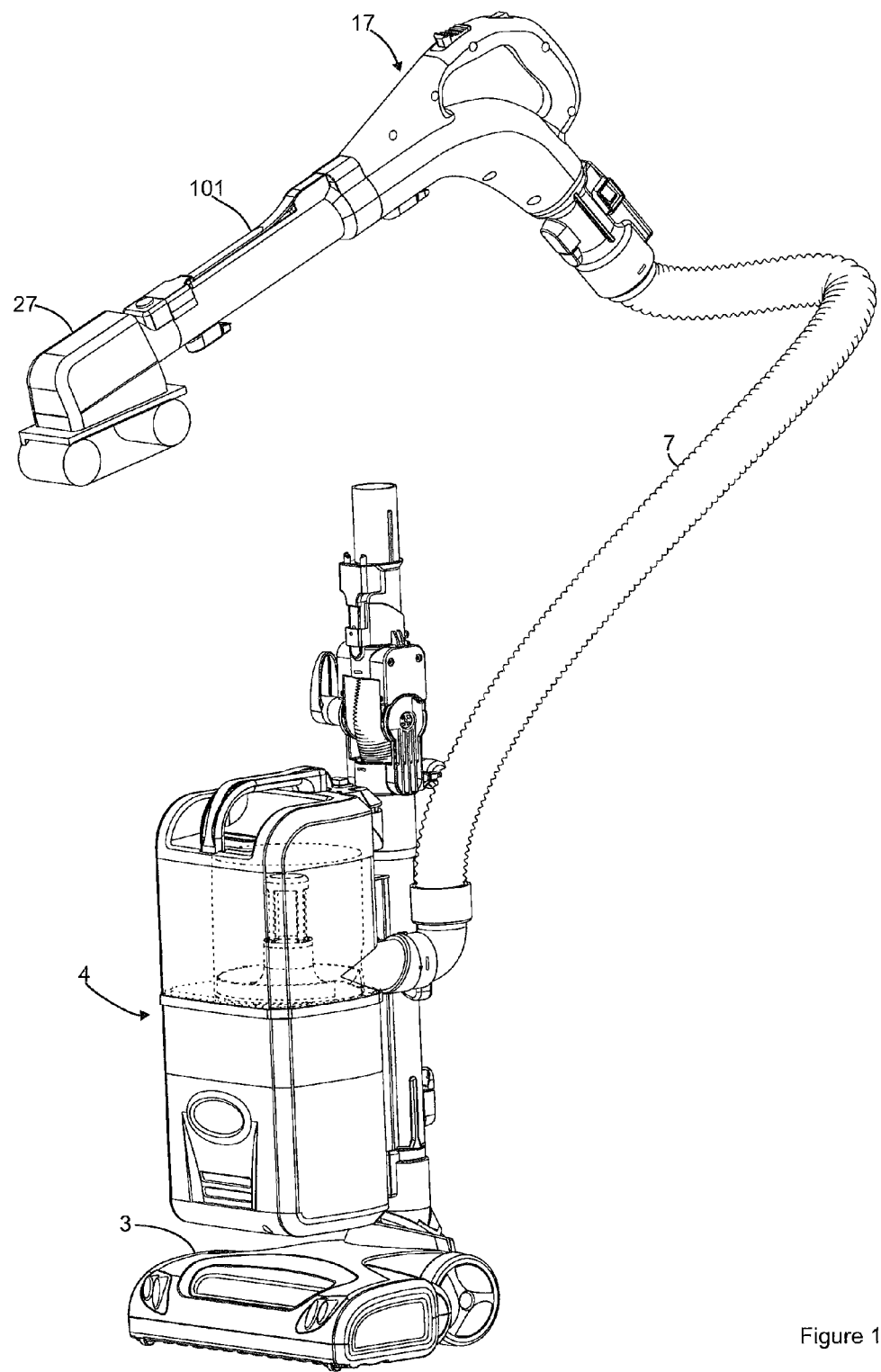
FIG. 16 is a perspective view of the surface cleaning apparatus of FIG. 1 in another cleaning configuration.

In another example of an above floor cleaning mode, as exemplified in FIG. 11, the surface cleaning unit 4 can remain mounted on the upper portion 2 and the upper wand portion 101 can be detached from the hinge 103 to provide an extended wand for above floor cleaning. This configuration may help extend the reach of a user, as compared to the configuration of FIG. 7. Optionally, additional accessory tools may be coupled to the upstream end 25 of the upper wand portion 101, including for example a crevice tool (FIG. 15), a cleaning brush 26 (optionally an electrically powered brush or an air driven turbo brush, see FIG. 14) and any other type of accessory including a power tool such as a sander 27 (FIG. 16).

Figure 12:
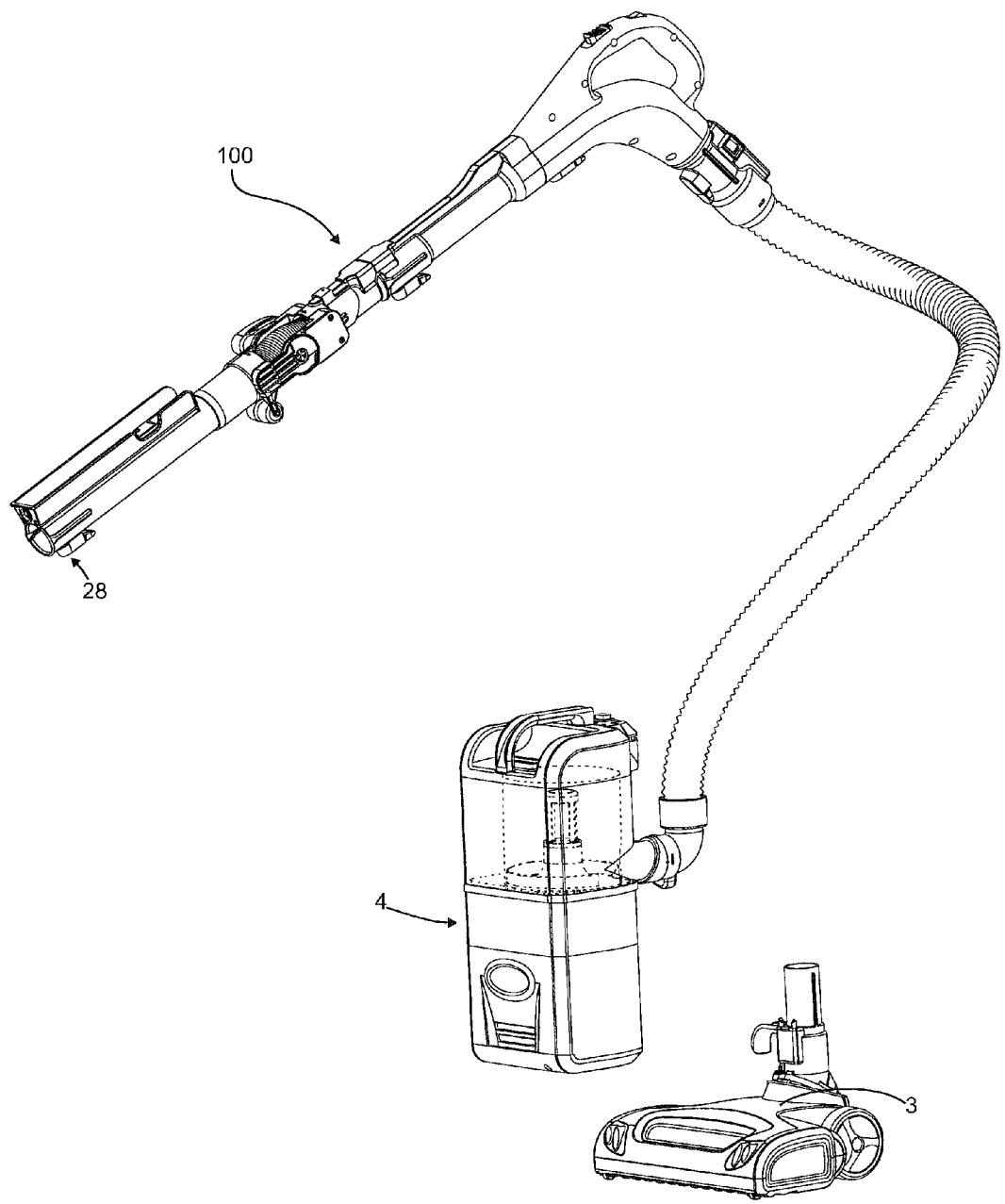
FIG. 12 is a perspective view of the surface cleaning apparatus of FIG. 1 in another cleaning configuration.

In another example of an above floor cleaning mode, as exemplified in FIG. 12, the surface cleaning unit 4 can be detached from the upper portion 2, and substantially all of the upper portion 2 can be detached from the surface cleaning head 3. In this configuration, both the upper and lower wand portions 101, 102 co-operate to further extend the user's reach, as compared to the configurations of FIGS. 7 and 11. Optionally, additional accessory tools may be coupled to the upstream end 28 of the upper portion 2.

Figure 13:
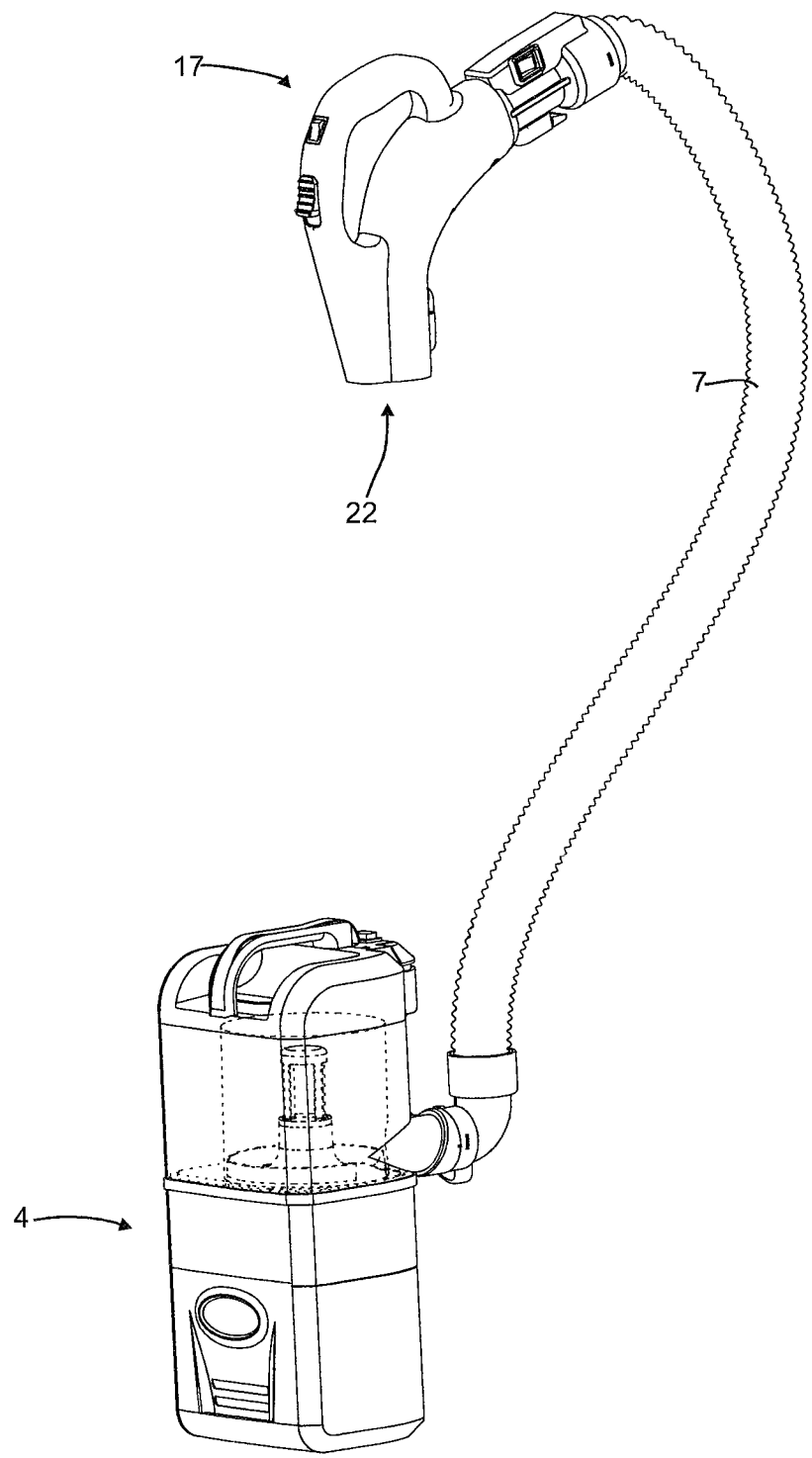
FIG. 13 is a perspective view of the surface cleaning apparatus of FIG. 1 in another cleaning configuration.

In another example of an above floor cleaning mode, as exemplified in FIG. 13, the surface cleaning unit 4 can be detached from the upper portion 2 and the handle 17 can be detached from the upper portion 2.

Optionally, one or more auxiliary support members, including for example a wheel and a roller, can be provided on the rear of the surface cleaning apparatus and/or the upper portion and configured to contact the floor (or other surface) when the upper portion is inclined or placed close to the surface (see FIG. 10). Providing an auxiliary support member may help carry some of the weight of the surface cleaning unit and/or upper portion when in a generally horizontal configuration. The auxiliary support member may also help the upper portion 2 and/or surface cleaning unit 4 to roll relatively easily over the floor when in the horizontal position. This may help a user to more easily maneuver the upper portion and/or surface cleaning unit under obstacles, such as a bed, cabinet or other piece of furniture. In the illustrated embodiment the auxiliary support member is a roller 30 provided on the back side of the lower wand portion 102.

Removable Cyclone

The following is a description of a removable cyclone that may be used by itself in any surface cleaning apparatus or in any combination or sub-combination with any other feature or features disclosed herein.

Figure 17:
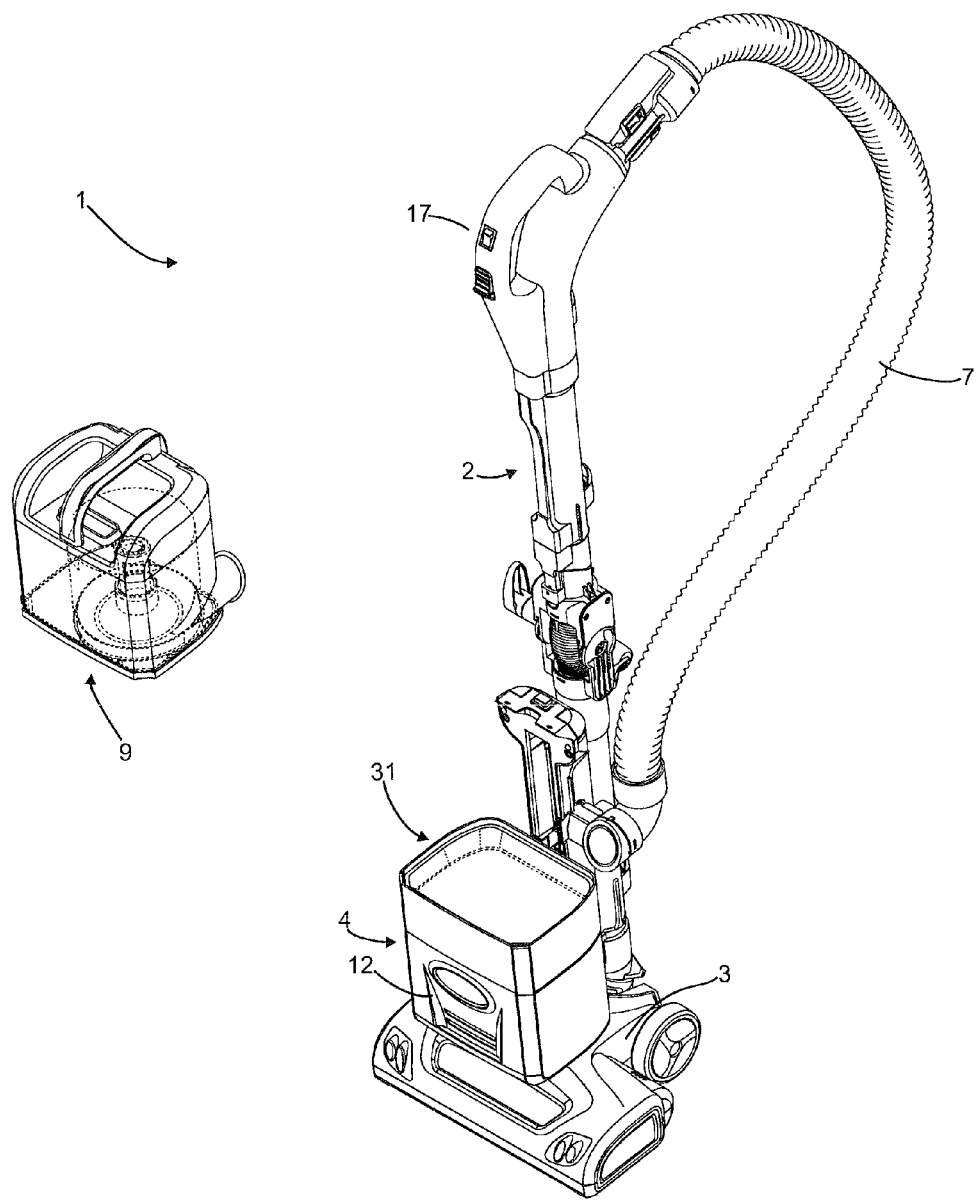
FIG. 17 is a partially exploded perspective view of the surface cleaning apparatus of FIG. 1 wherein the cyclone bin assembly is removed for emptying.

Optionally, the cyclone bin assembly 9 can be detachable from the motor housing 12. Providing a detachable cyclone bin assembly 9 may allow a user to carry the cyclone bin assembly 9 to a garbage can for emptying, without needing to carry or move the rest of the surface cleaning apparatus 1. Preferably, the cyclone bin assembly 9 can be separated from the motor housing 12 while the surface cleaning unit 4 is mounted on the upper portion 2 and also when the surface cleaning unit 4 is separated from the upper portion 2. Referring to FIG. 17, in the illustrated embodiment the cyclone bin assembly 9 is removable as a closed module, which may help prevent dirt and debris from spilling out of the cyclone bin assembly 9 during transport.

Figure 4:
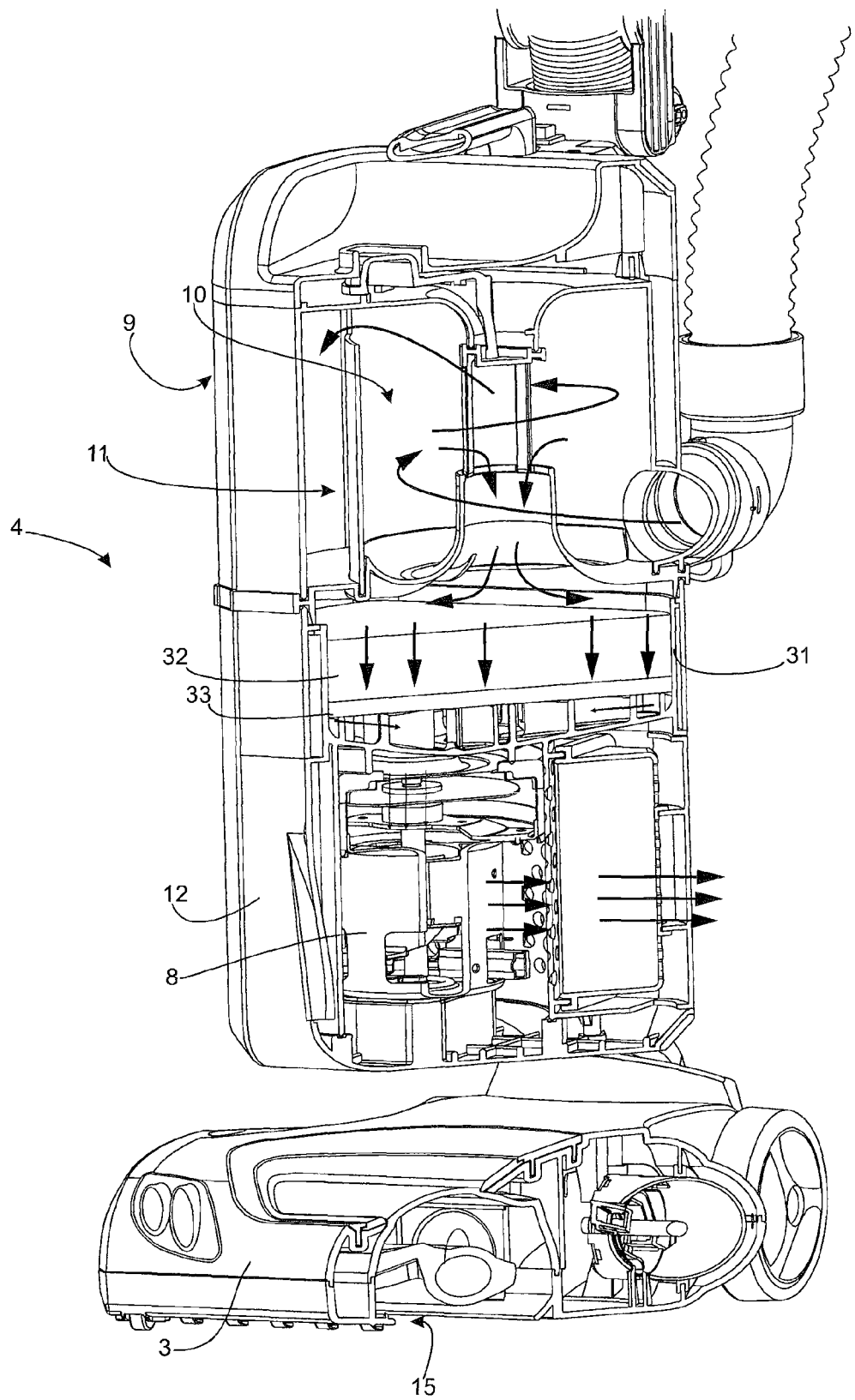
FIG. 4 is a cross sectional perspective view taken along line F4-F4 in FIG. 1.
Figure 18:
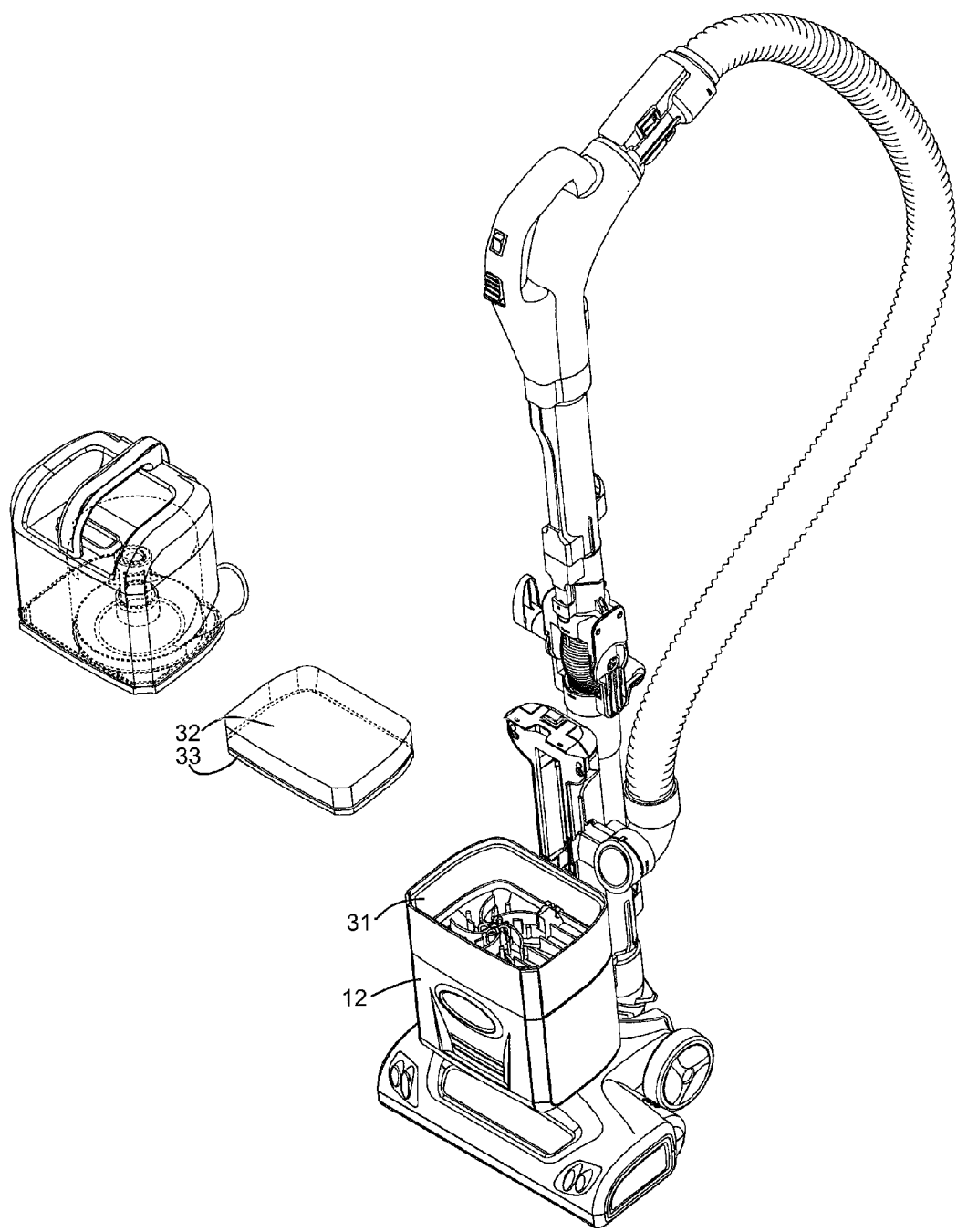
FIG. 18 is a partially exploded perspective view of the surface cleaning apparatus of FIG. 1 wherein the cyclone bin assembly is removed for emptying and the pre-motor filers are removed for cleaning.

In the illustrated embodiment, removing the cyclone bin assembly 9 reveals a pre-motor filter chamber 31 that is positioned in the air flow path between the cyclone bin assembly 9 and the suction motor 8 (see also FIG. 4). One or more filters can be provided in the pre-motor filter chamber 31 to filter the air exiting the cyclone bin assembly 9 before it reaches the motor 8. In the illustrated example, the pre-motor filter includes a foam filter 32 and a downstream felt layer 33 positioned within the pre-motor filter chamber 31. Preferably, the filters 32, 33 are removable (FIG. 18) to allow a user to clean and/or replace them when they are dirty. Optionally, part or all of the sidewalls 34 of the pre-motor filter chamber or housing 31 can be at least partially transparent so that a user can visually inspect the condition of the filters 32, 33 without having to remove the cyclone bin assembly 9.

Figure 19:
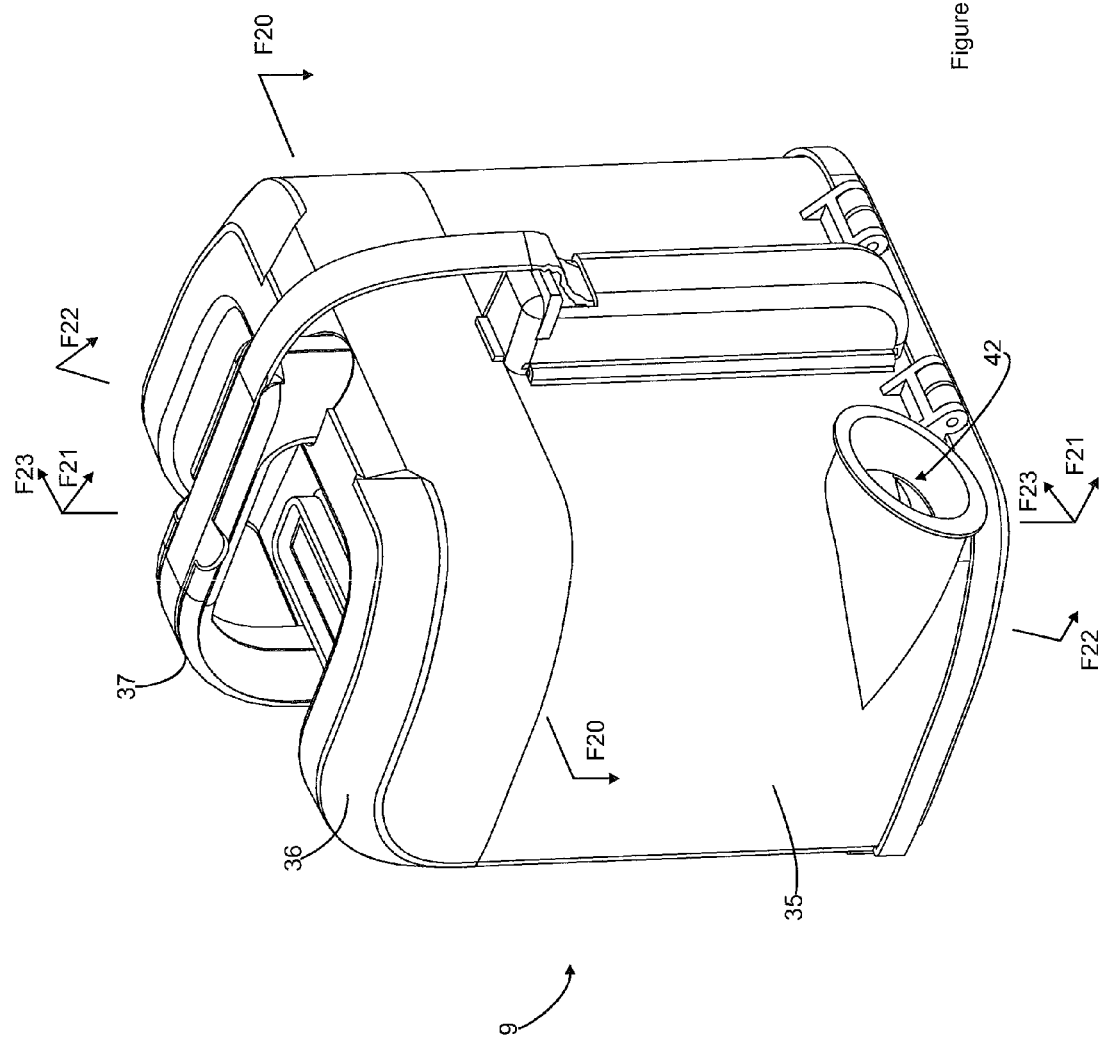
FIG. 19 is a perspective view of a cyclone bin assembly from the surface cleaning apparatus of FIG. 1.

Referring to FIG. 19, the cyclone bin assembly 9 includes an outer sidewall 35 and a lid 36. Preferably, as illustrated, a bin handle 37 is provided on the lid 36. The bin handle 37 may allow a user to carry the surface cleaning unit 4 when it is detached from the upper portion 2, and preferably is removable from the suction motor housing 12 with the cyclone bin assembly 9 so that it can also be used to carry the cyclone bin assembly for emptying.

Figure 20:
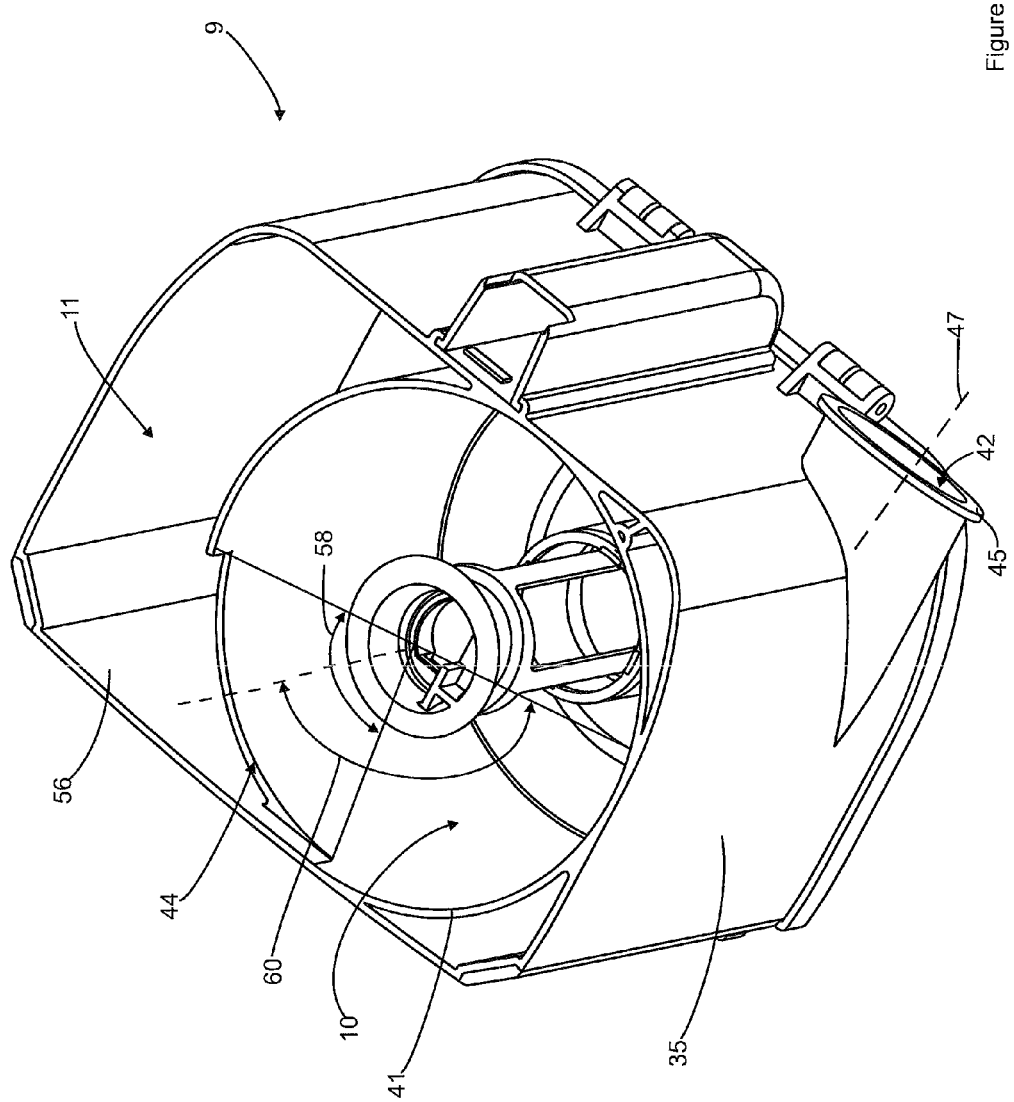
FIG. 20 is a sectional view of the cyclone bin assembly of FIG. 19, taken along line F20-F20 in FIG. 19.
Figure 21:
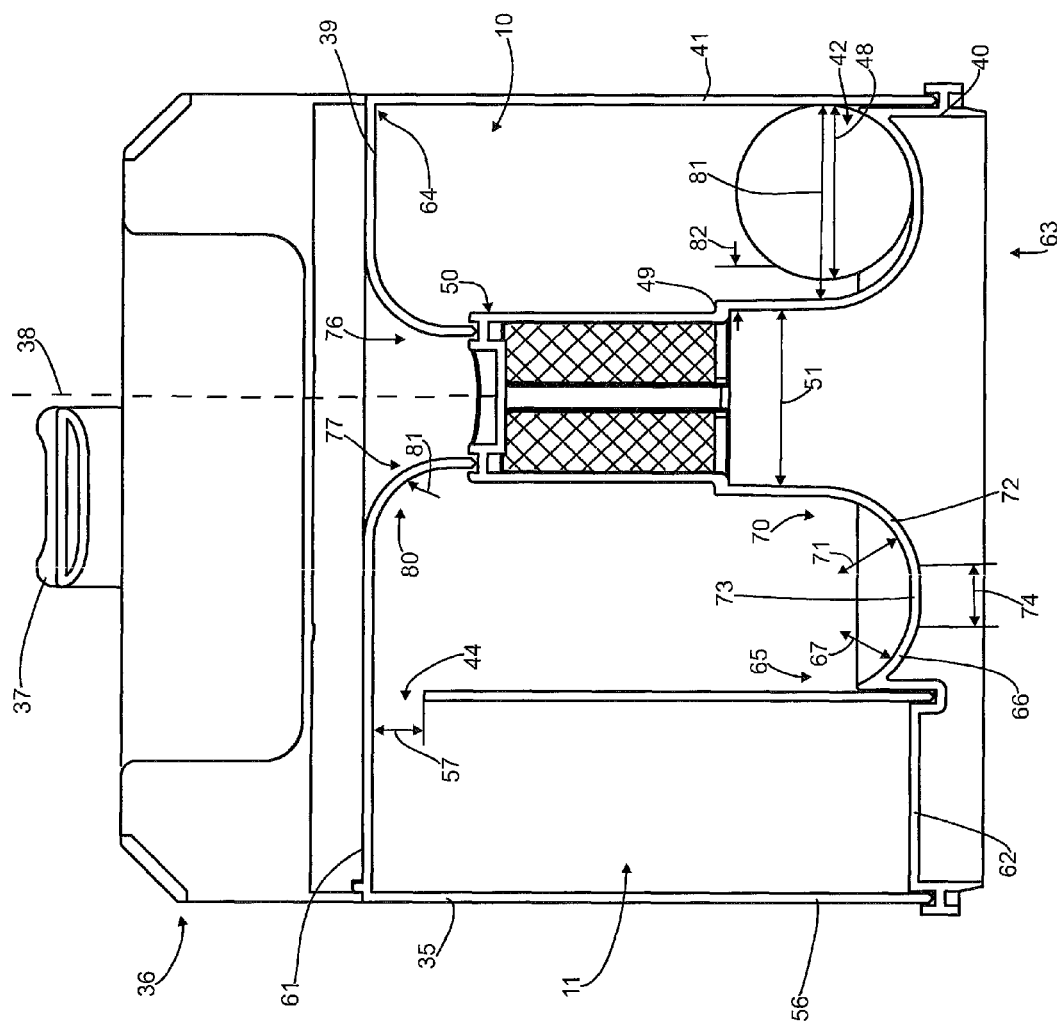
FIG. 21 is a sectional view of the cyclone bin assembly of FIG. 19, taken along line F21-F21 in FIG. 19

Referring to FIGS. 20 and 21 in the illustrated embodiment the cyclone chamber 10 extends along a cyclone axis 38 and includes a second end wall 39, a first end wall 40 axially spaced apart from the second end wall 39 and a generally cylindrical sidewall 41 extending between the second and first end walls 39, 40. Optionally, some or all of the cyclone walls can coincide with portions of the dirt collection chamber walls, suction motor housing walls and/or may form portions of the outer surface of surface cleaning unit. Alternatively, in some examples some or all of the cyclone walls can be distinct from other portions of the surface cleaning unit. In the illustrated embodiment, the cyclone chamber 10 is arranged in a generally vertical, inverted cyclone configuration. Alternatively, the cyclone chamber can be provided in another configuration, including, having at least one or both of the air inlet and air outlet positioned toward the top of the cyclone chamber, or as a horizontal or inclined cyclone.

In the illustrated embodiment, the cyclone chamber 10 includes a cyclone air inlet 42 and a cyclone air outlet 43. The cyclone chamber 10 preferably also includes at least one dirt outlet 44, through which dirt and debris that is separated from the air flow can exit the cyclone chamber 10. While it is preferred that most or all of the dirt exit the cyclone chamber via the dirt outlet, some dirt may settle on the bottom end wall 40 of the cyclone chamber 10 and/or may be carried with the air exiting the cyclone chamber via the air outlet 43.

Preferably the cyclone air inlet 42 is located toward one end of the cyclone chamber 10 (the lower end in the example illustrated) and may be positioned adjacent the corresponding cyclone chamber end wall 40. Alternatively, the cyclone air inlet 42 may be provided at another location within the cyclone chamber 10.

Referring to FIG. 20, in the illustrated embodiment the air inlet 42 includes an upstream or inlet end 45, which may be coupled to the hose 7 or other suitable conduit, and a downstream end 46 (FIG. 22) that is spaced apart from the upstream end 45. In the illustrated configuration, the cyclone bin assembly 9 can be removed from the surface cleaning unit 4, for example for cleaning or emptying, while the hose 7 remains with the upper portion 2. This may allow a user to remove the cyclone bin assembly 9 without having to detach or decouple the hose 7. Alternatively, the downstream end of the hose 7 may be coupled to the cyclone bin assembly 9 such that the downstream end of the hose travels with the cyclone bin assembly when it is removed.

The air inlet 42 defines an inlet axis 47 and has an inlet diameter 48 (FIG. 21). The cross-sectional area of the air inlet 42 taken in a plane orthogonal to the inlet axis 47 can be referred to as the cross-sectional area or flow area of the air inlet 42. Preferably, the air inlet 42 is positioned so that air flowing out of the downstream end is travelling generally tangentially relative to, and preferably adjacent, the sidewall 41 of the cyclone chamber 10.

The perimeter of the air inlet 42 defines a cross-sectional shape of the air inlet. The cross-sectional shape of the air inlet can be any suitable shape. In the illustrated example the air inlet has a generally round or circular cross-sectional shape with a diameter 48. Optionally, the diameter 48 may be between about 0.25 inches and about 5 inches or more, preferably between about 1 inch and about 5 inches, more preferably is between about 0.75 and 2 inches or between about 1.5 inches and about 3 inches, and most preferably is about 2 to 2.5 inches or between about 1 to 1.5 inches. Alternatively, instead of being circular, the cross-sectional shape of the air inlet may be another shape, including, for example, oval, square and rectangle.

Air can exit the cyclone chamber 10 via the air outlet 43. Optionally, the cyclone air outlet may be positioned in one of the cyclone chamber end walls and, in the example illustrated, is positioned in the same end as the air inlet 42 and air inlet 42 may be positioned adjacent or at the end wall 40. In the illustrated example, the cyclone air outlet 43 comprises a vortex finder 49. In the example illustrated, the longitudinal cyclone axis 38 is aligned with the orientation of the vortex finder. Alternatively, the cyclone air outlet 43 may be spaced apart from the cyclone air inlet 42, and may be located toward the other end of the cyclone chamber 10.

In the illustrated embodiment the air outlet 43 is generally circular in cross-sectional shape and defines an air outlet diameter 51 (FIG. 21). Optionally, the cross-sectional or flow area of the cyclone air outlet 43 may be between about 50% and about 150% and between about 60%-90% and about 70%-80% of the cross-sectional area of the cyclone air inlet 42, and preferable is generally equal to the cyclone air inlet area. In this configuration, the air outlet diameter 51 may be about the same as the air inlet diameter 48.

When combined with any other embodiment, the cyclone bin assembly 9 may be of any particular design and may use any number of cyclone chambers and dirt collection chambers. The following is a description of exemplified features of a cyclone bin assembly any of which may be used either individually or in any combination or sub-combination with any other feature disclosed herein.

Screen

The following is a description of a cyclone and a screen that may be used by itself in any surface cleaning apparatus or in any combination or sub-combination with any other feature or features disclosed herein.

Optionally, a screen or other type of filter member may be provided on the cyclone air 43 outlet to help prevent fluff, lint and other debris from exiting via the air outlet. Referring to FIG. 21, in the illustrated example a screen 50 is positioned at the air outlet 43 and connected to the vortex finder 49. In FIG. 21 the screen is illustrated with mesh in place, however for clarity the mesh has been omitted from the other Figures. The screen 50 is generally cylindrical in the illustrated embodiment, but may be of any suitable shape in other embodiments. Optionally, the screen 50 can be removable from the vortex finder 49.

Figure 23:
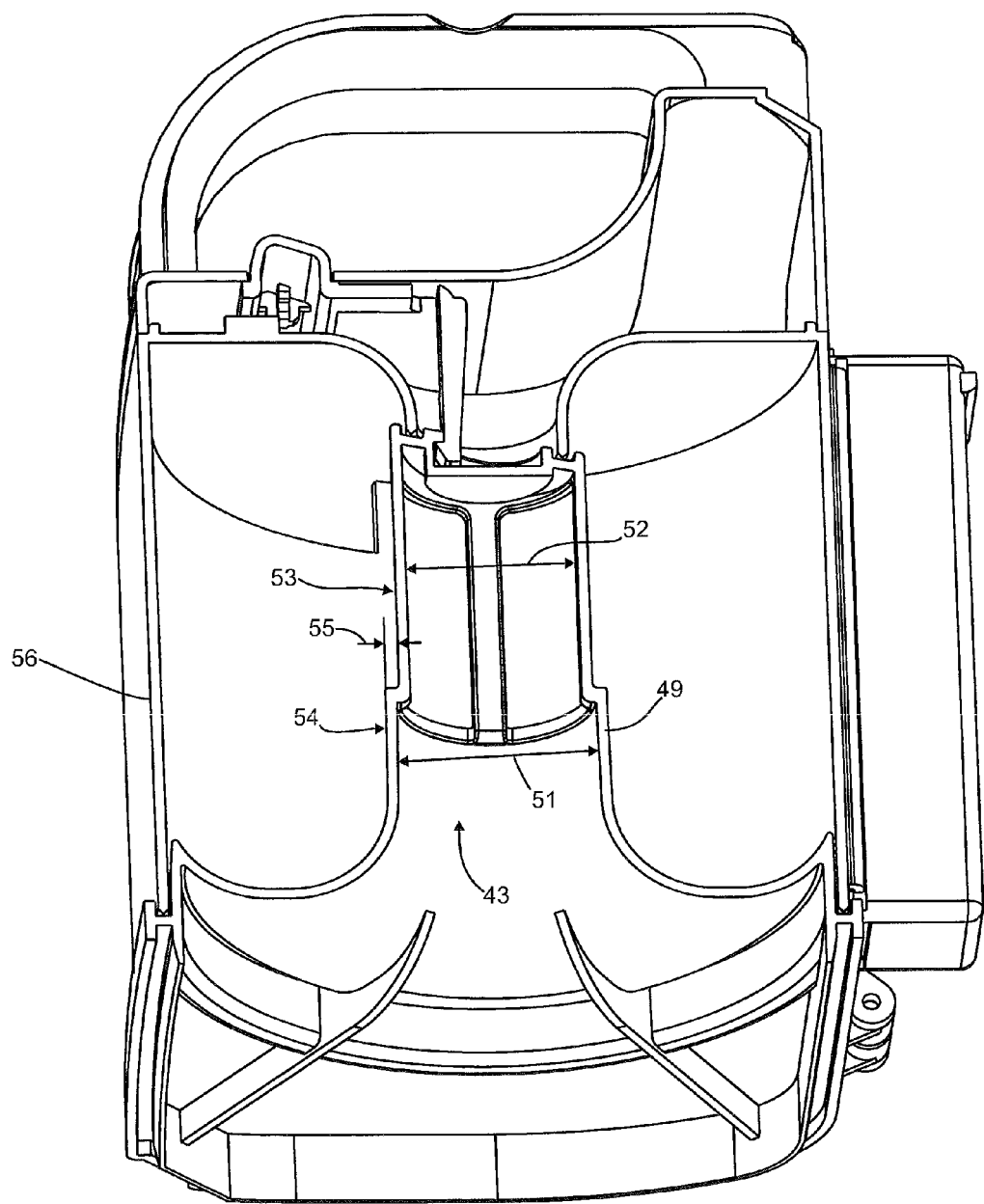
FIG. 23 is a sectional view of the cyclone bin assembly of FIG. 19, taken along line F23-F23 in FIG. 19.

Optionally, the screen 50 may be sized to have a cross-section area that is larger than, smaller than or generally equal to the air outlet 43 cross-sectional area. Referring to FIG. 23, in the illustrated example, the diameter 52 of the screen 43 is less than the diameter 51 of the vortex finder 49 conduit providing the cyclone air outlet 43. In this configuration, the radial surface 53 of the screen 50 is radially offset inwardly from the surface 54 of the vortex finder 49 by an offset distance 55. Providing the offset gap 55 between the surfaces 53, 54 of the screen 50 and vortex finder 49 may help provide a relatively calmer region (i.e. a region of reduced air flow turbulence and/or laminar air flow) within the cyclone chamber 10. It may also assist the air that has been treated in the cyclone chamber to travel towards the vortex finder while mixing less with the air entering the cyclone chamber via the air inlet and thereby reduce the likelihood of dirt bypassing treatment in the cyclone chamber and travelling directly to the air outlet. Providing a relatively calmer air flow region adjacent the surface 53 of the screen 50 may help enable air to more easily flow through the screen 50 and into the vortex finder 49, which may help reduce backpressure in the air flow path. Reducing back pressure may help improve the efficiency of the cyclone chamber and/or may help reduce power requirements for generating and/or maintaining a desired level of suction.

In the illustrated embodiment the screen 50 is of generally constant diameter. Alternatively, the diameter of the screen 50 may vary along its length. For example, the screen may be generally tapered and may narrow toward its upper end (i.e. the end that is spaced apart from the vortex finder 49). The cross sectional area of the inner end of the screen may be 60-90% the cross sectional area of the air inlet and preferably is 70-80% the cross sectional area of the air inlet.

Figure 25:
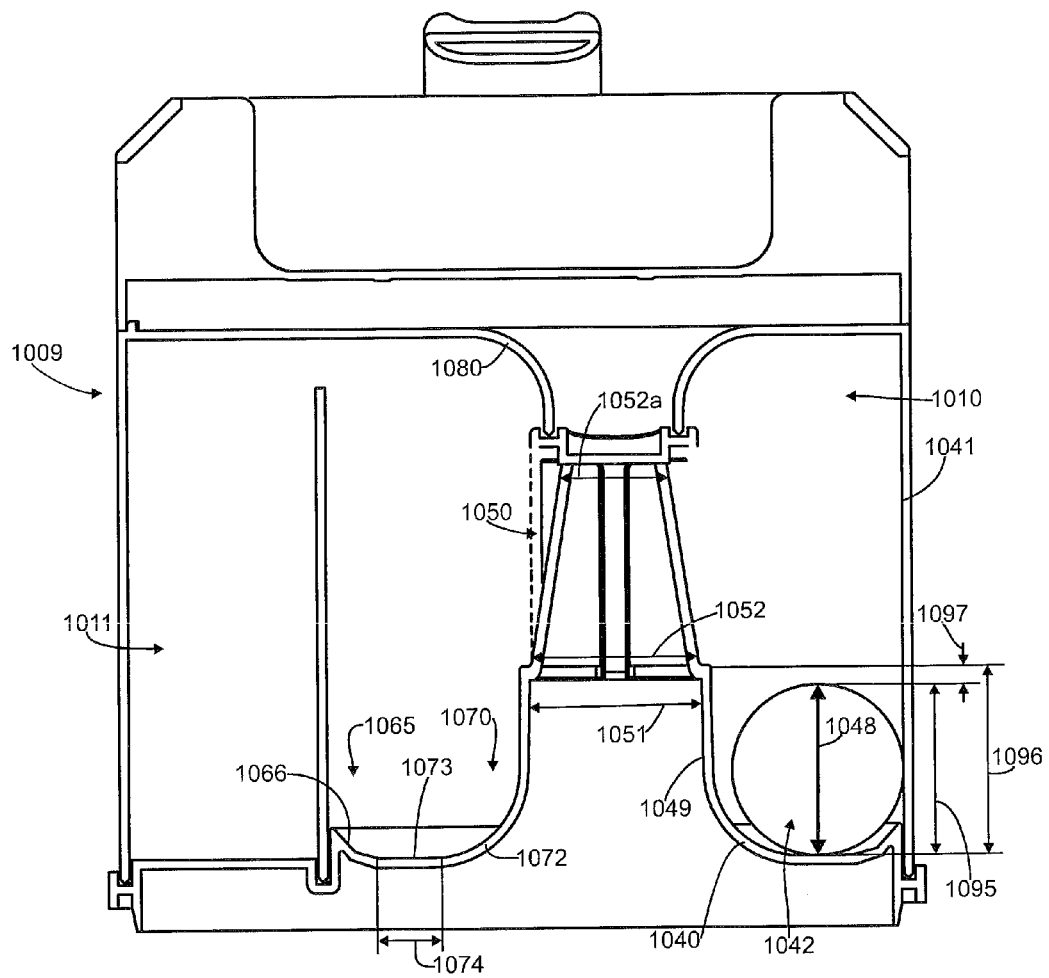
FIG. 25 is a cross sectional view of another embodiment of a cyclone bin assembly.

Referring to FIG. 25, another embodiment of a cyclone bin assembly 1009 is shown. Cyclone bin assembly 1009 is similar to cyclone bin assembly 9, and analogous elements are identified using like reference characters indexed by 1000. In this embodiment, the screen 1050 is tapered such that the width 1052 at the base of the screen 1050 (adjacent the vortex finder 1049) is greater than the width 1052a at the upper end of the screen 1050. In this configuration the cross-sectional area of the screen 1050 (in a plane that is generally perpendicular to the screen 50) is greater at the base of the screen 1050 than at its upper end. The amount of taper on the screen 1050 may any suitable amount, and for example may be selected so that the cross-sectional area at the upper end of the screen 1050 is between about 60% and 90%, between about 70% and 80% and may be about 63%-67% of the cross-sectional area of the base of the screen 1050.

Dirt Outlet

The following is a description of a cyclone dirt outlet that may be used by itself in any surface cleaning apparatus or in any combination or sub-combination with any other feature or features disclosed herein.

Cyclone chamber 10 may be in communication with a dirt collection chamber by any suitable means. Preferably, as exemplified, the dirt collection chamber 11 is exterior to cyclone chamber 10, and preferably has a sidewall 56 that at least partially or completely laterally surrounds the cyclone chamber 10. At least partially nesting the cyclone chamber 10 within the dirt collection chamber 11 may help reduce the overall size of the cyclone bin assembly. As exemplified in FIG. 20, the cyclone chamber sidewall 41 may be coincident with the sidewall 56 at one or more (e.g., three locations) around its perimeter.

In the illustrated embodiment, the dirt outlet 44 is in communication the cyclone chamber 10 and the dirt collection chamber 11. Optionally, the dirt outlet 44 can be axially and/or angularly spaced from the cyclone air inlet. Preferably, the cyclone dirt outlet 44 is positioned toward the opposite end of the cyclone chamber 10 from the cyclone air inlet 42. The cyclone dirt outlet 44 may be any type of opening and may be in communication with the dirt collection chamber to allow dirt and debris to exit the cyclone chamber 10 and enter the dirt collection chamber 11.

In the illustrated example, the cyclone dirt outlet 44 is in the form of a slot bounded by the cyclone side wall 41 and the upper cyclone end wall 39, and is located toward the upper end of the cyclone chamber 10. Alternatively, in other embodiments, the dirt outlet may be of any other suitable configuration, and may be provided at another location in the cyclone chamber, including, for example as an annular gap between the sidewall and an end wall of the cyclone chamber or an arrestor plate or other suitable member.

Referring to FIG. 21, the dirt slot 44 may be of any suitable length 57, generally measured in the axial direction, and may be between about 0.1 inches and about 2 inches, or more. Optionally, the length 57 of the slot 44 may be constant along its width, or alternatively the length 57 may vary along the width of the slot 44, preferably in the downstream direction as measured by the direction of air rotation in the cyclone chamber.

Optionally, the slot may extend around the entire perimeter of the cyclone chamber (forming a generally continuous annular gap) or may extend around only a portion of the cyclone chamber perimeter. For example, the slot may subtend an angle (see angle 58 in FIG. 20) that is between about 30° and about 360°, and may be between about 30 and about 180°, between about 45 and about 90° and between about 60 and 80°. Similarly, the slot 44 may extend around about 10% to about 80% of the cyclone chamber perimeter, and preferably may extend around about 15% to about 40% of the cyclone chamber perimeter.

Optionally, the slot 44 may be positioned so that it is angularly aligned with the cyclone air inlet 42, or so that an angle 60 (FIG. 20) between the air inlet and the slot 44 (measured to a center line of the slot 44) is between about 0 and about 350° or more, and may be between about 90° and about 180°. In some embodiments, the slot 44 can be positioned so that an upstream end of the slot (i.e. the end of the slot that is upstream relative to the direction of the air circulating within the cyclone chamber) is between about 0° and about 350° from the air inlet, and may be between about 5° and 180° and between about 10° and about 50° downstream from the air inlet.

Referring to FIGS. 38-43, schematic representations of alternate embodiments of a cyclone chamber and a dirt collection chamber are shown. Each embodiment is generally similar to the cyclone chamber 10 and dirt collection chamber 11, and analogous elements are identified using like reference characters with a unique suffix (a, b, c, etc.). Each of the schematic embodiments illustrates one example of a possible angular arrangement between the air inlet 42, dirt outlet slot 44 (represented by angle 60) and dirt outlet slots 44 of varying widths, represented by different angles 58. For clarity, in these Figures portions of the air inlet 42 and the dirt outlet slot 44 are identified by cross-hatching.

Figure 38:
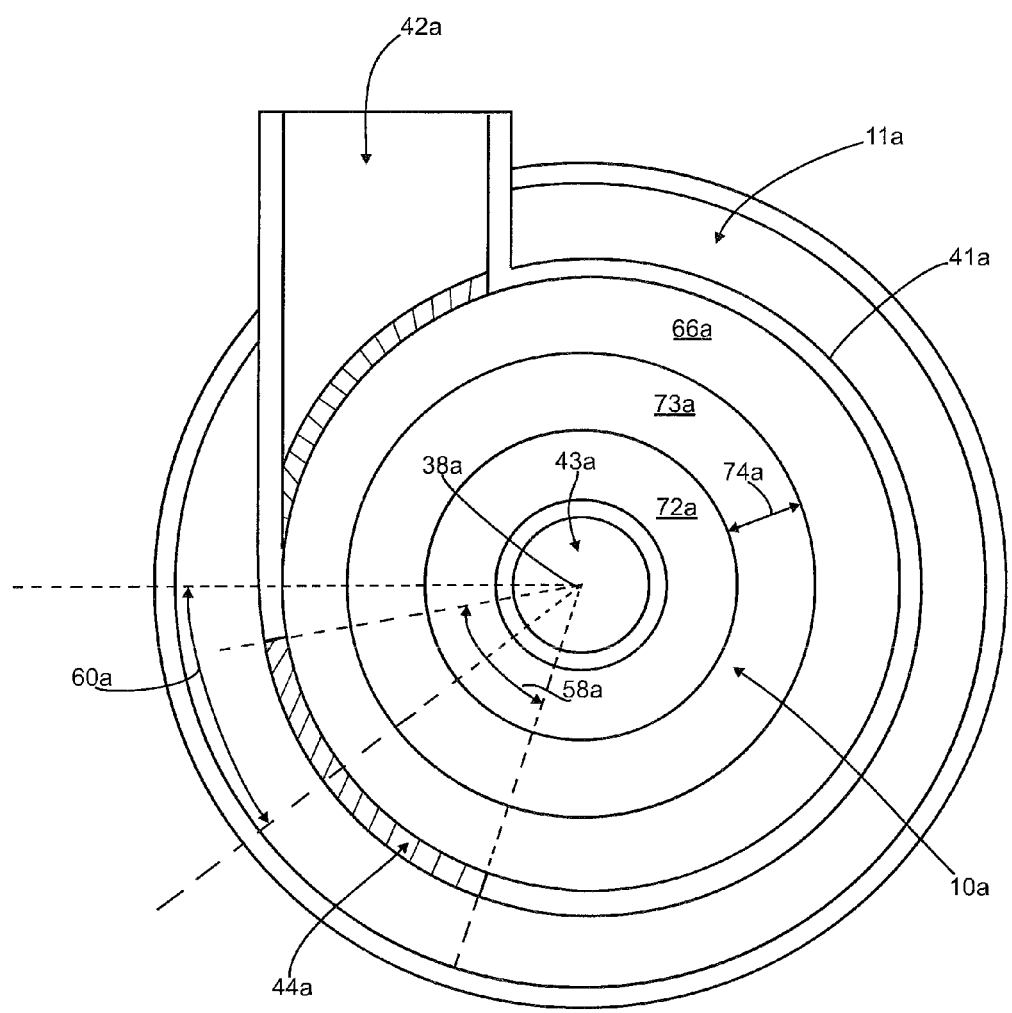
FIG. 38 is a schematic representation of another embodiment of a cyclone bin assembly.

Referring to FIG. 38, in this embodiment the angle 60a between the slot 44a and the air inlet 42a is about 45 degrees, and the dirt slot 44a subtends an angle 58a of about 60 degrees. In this configuration, the dirt slot 44a is 45 degrees downstream from the air inlet 42a and is located in a first quadrant of the cyclone chamber sidewall (i.e. in a quadrant where the angle 60 is between about 0 degrees and about 90 degrees).

Figure 39:
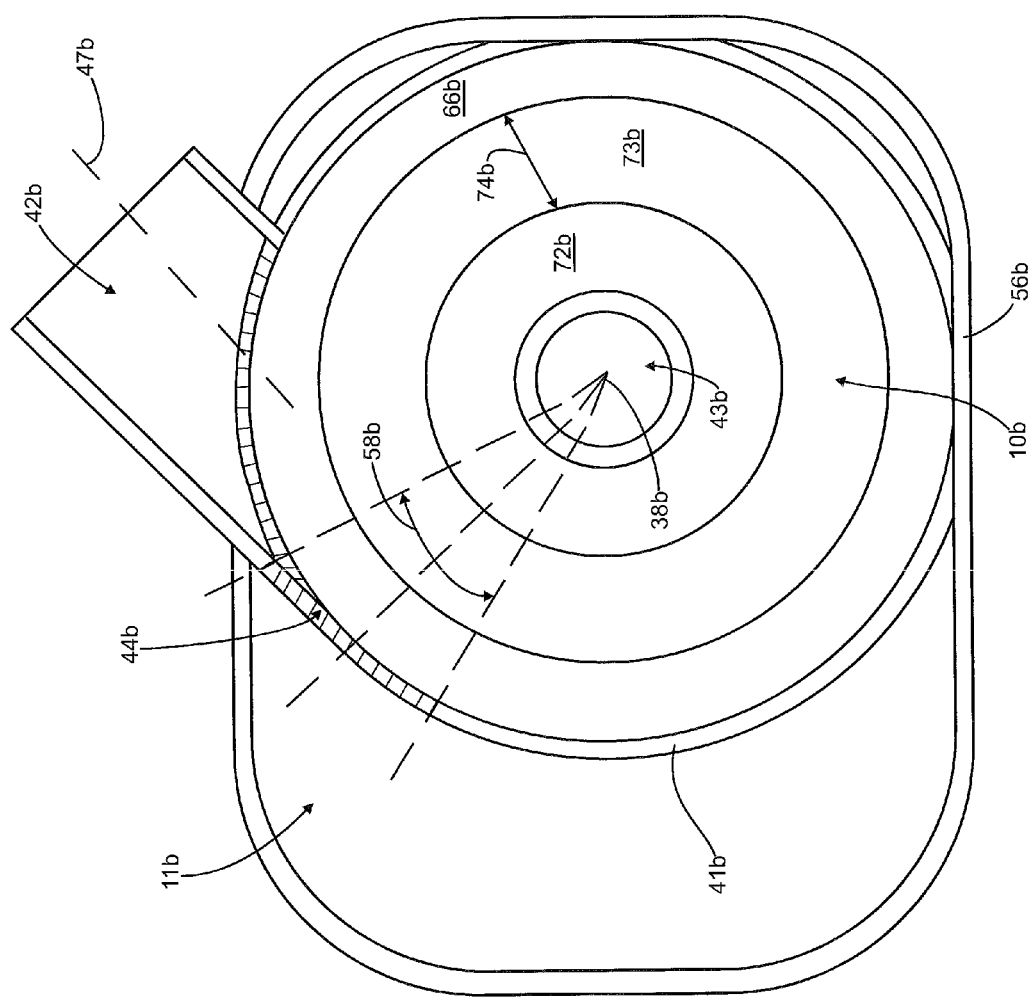
FIG. 39 is a schematic representation of another embodiment of a cyclone bin assembly.
Figure 40:
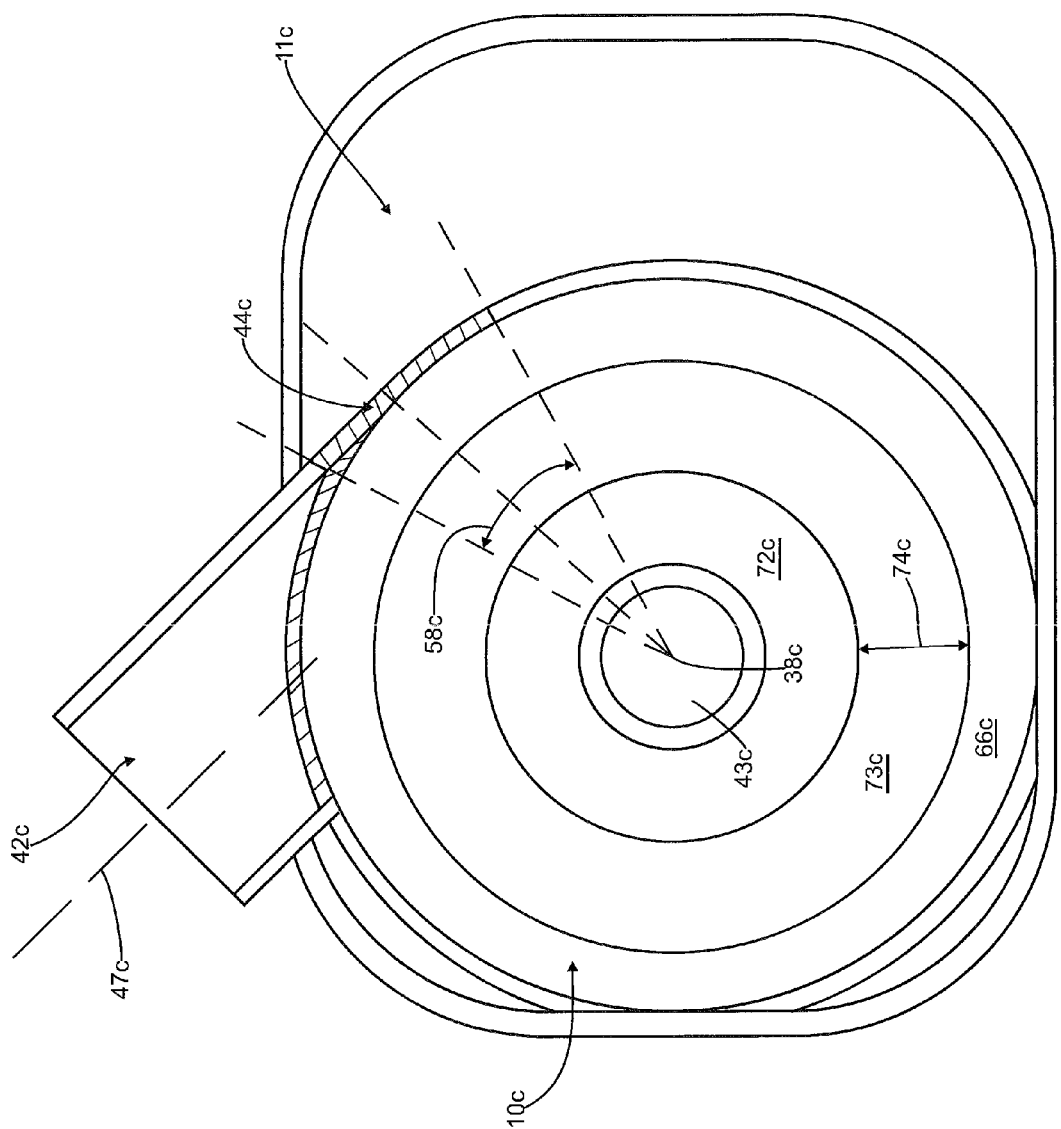
FIG. 40 is a schematic representation of another embodiment of a cyclone bin assembly.

Referring to FIG. 39, in this embodiment the angle 60b between the slot outlet 44b and the air inlet 42a is about 0 degrees. That is, the centre line of the slot 44b is generally aligned with the tangential edge of the air inlet 42b. In this configuration, a portion of the dirt slot 44b (located at one end of the cyclone chamber 10b) may overlap a portion of the air inlet 42b (located at the other end of the cyclone chamber 10b). In this embodiment, the angle 58b swept by the dirt slot 44b is about 35 degrees. Also in this embodiment, portions of the cyclone chamber sidewall 41b are integral with portions of the dirt collection chamber sidewall 56b, and the air inlet 42a is at an angle relative to the dirt collection chamber sidewall 56b. Referring to FIG. 40, this embodiment is similar to the embodiment of FIG. 39, but is configured so that air will circulate in the opposite direction. In both embodiments, the dirt slot partially overlaps the air inlet.

Figure 41:
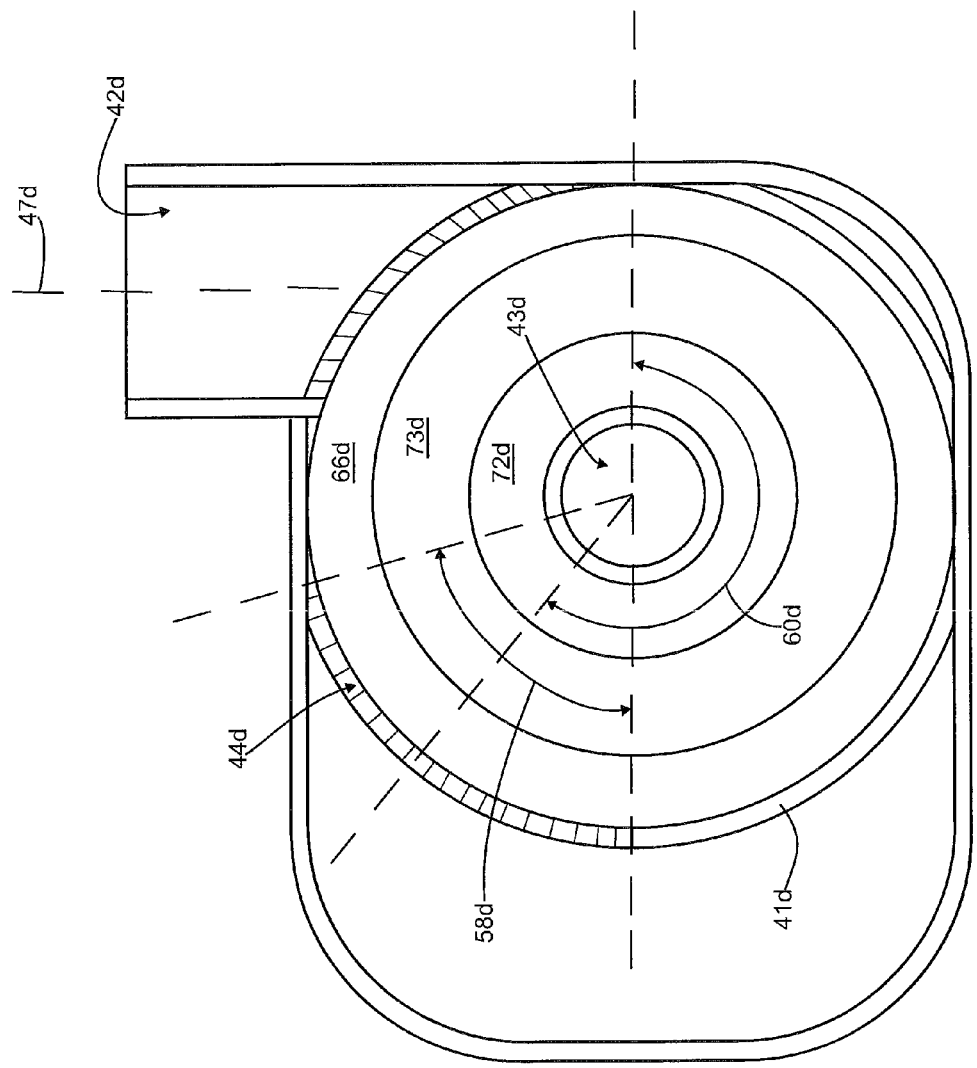
FIG. 41 is a schematic representation of another embodiment of a cyclone bin assembly.

Referring to FIG. 41, in this embodiment the dirt slot 44d is located in a third quadrant of the cyclone chamber, where the angle 60d is greater than 180 degrees. As illustrated, the angle 60d is about 130 degrees. In this embodiment the dirt slot 44d covers an angle 58d of about 80 degrees.

Figure 42:
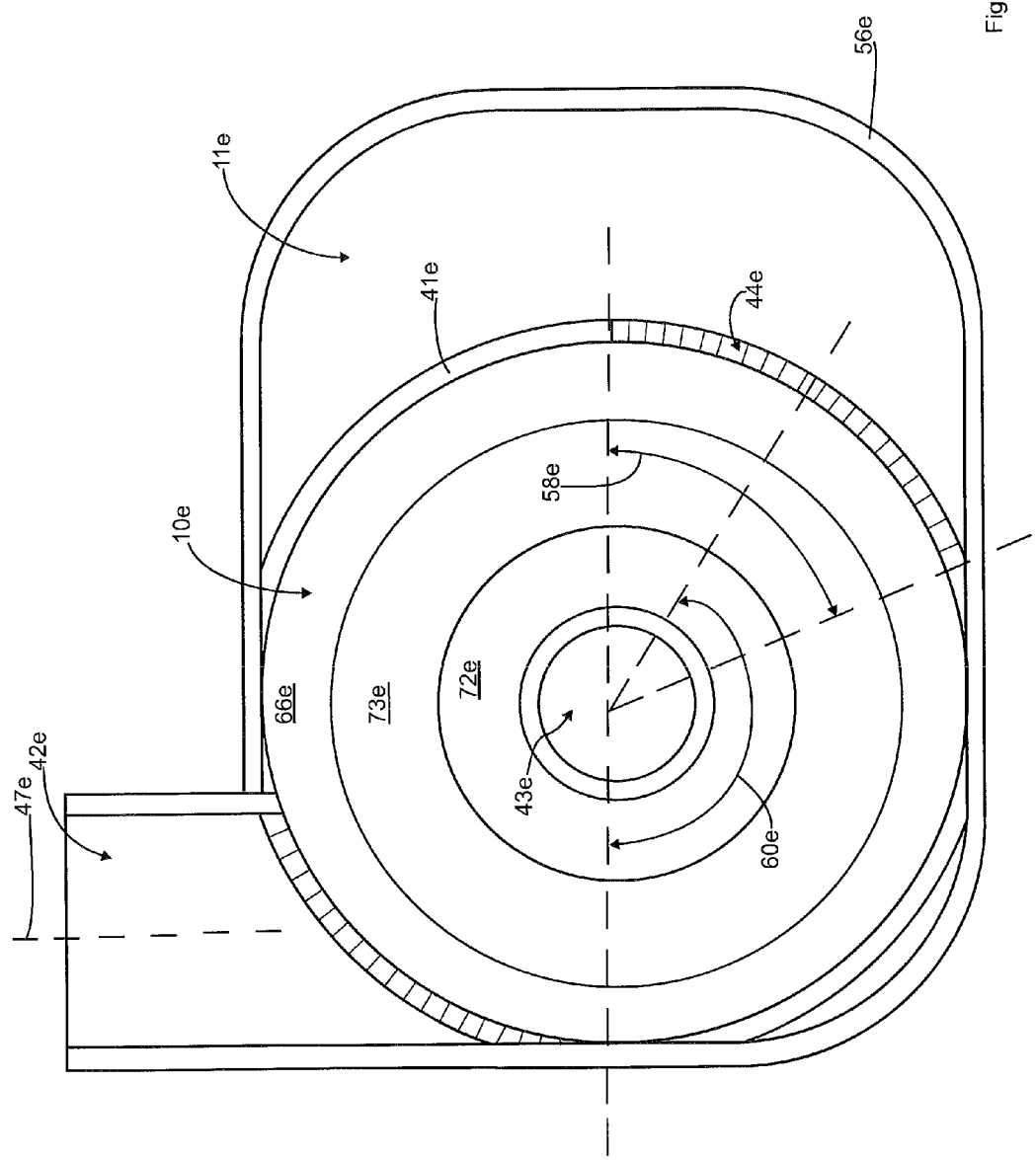
FIG. 42 is a schematic representation of another embodiment of a cyclone bin assembly.

Referring to FIG. 42, in this embodiment the dirt slot 44e is about 125 degrees downstream from the air inlet 42e (i.e. the angle 60e is about 125 degrees), and sweeps an angle 58e of about 70 degrees. In this embodiment the upstream end of the dirt slot 44e is located at the intersection of the cyclone chamber sidewall 41e and the dirt collection chamber sidewall 56e.

Figure 43:
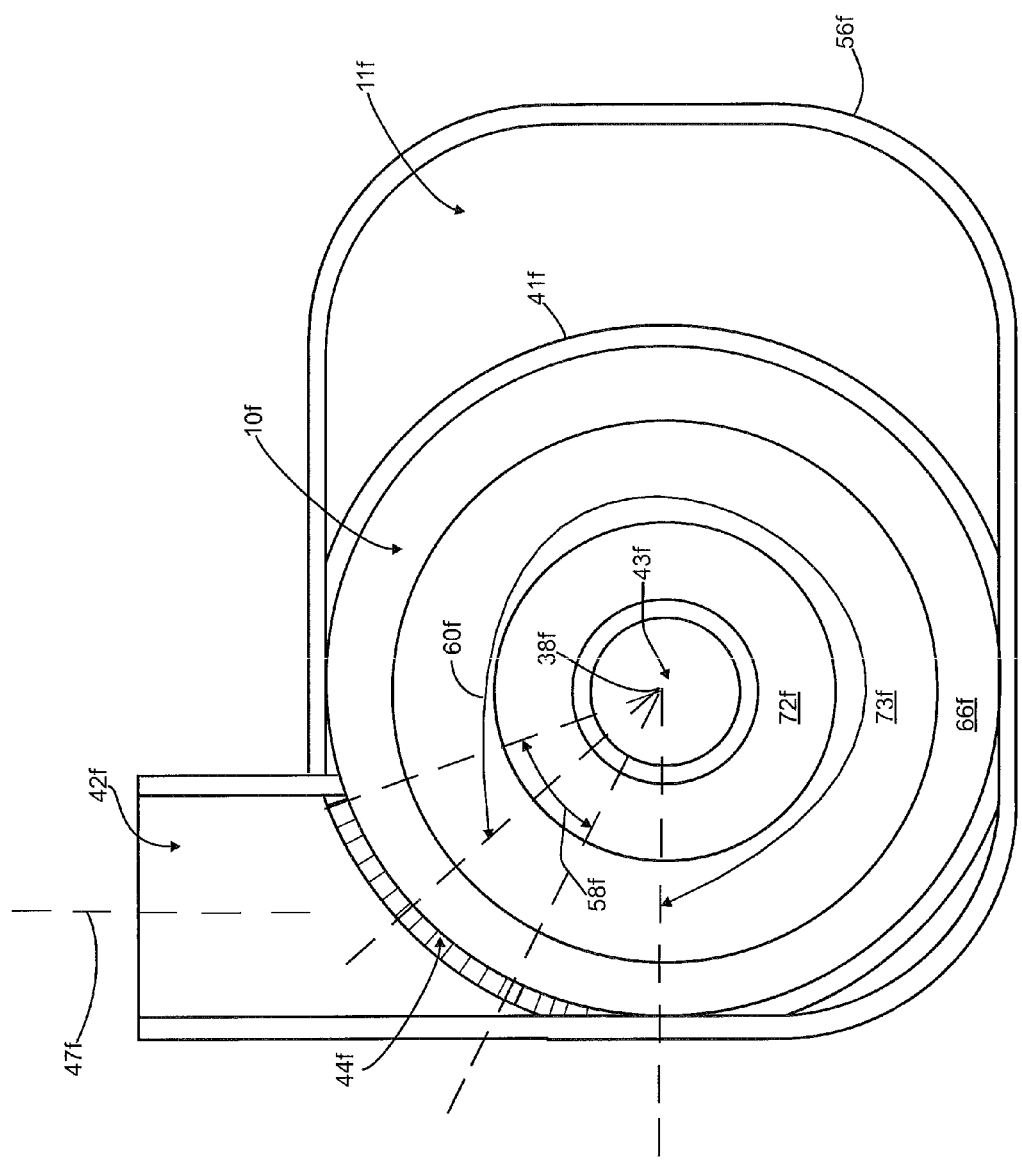
FIG. 43 is a schematic representation of another embodiment of a cyclone bin assembly.

Referring to FIG. 43, in this embodiment the dirt slot 44f overlies substantially all of the air inlet 42f and the angle 60f (measured in the direction of air flow) is about 325 degrees (i.e. the dirt slot 44f is located about 45 degrees upstream from the air outlet 42f). In this configuration, the downstream end of the dirt slot 44f is located at the intersection between the cyclone chamber sidewall 41f and the dirt collection chamber sidewall 56f.

The dirt collection chamber 11 may be of any suitable configuration. Referring to FIG. 21, in the illustrated example, the dirt collection chamber 11 includes a first end wall 61, a second end wall 62 and the sidewall 56 extending therebetween.

Figure 24:
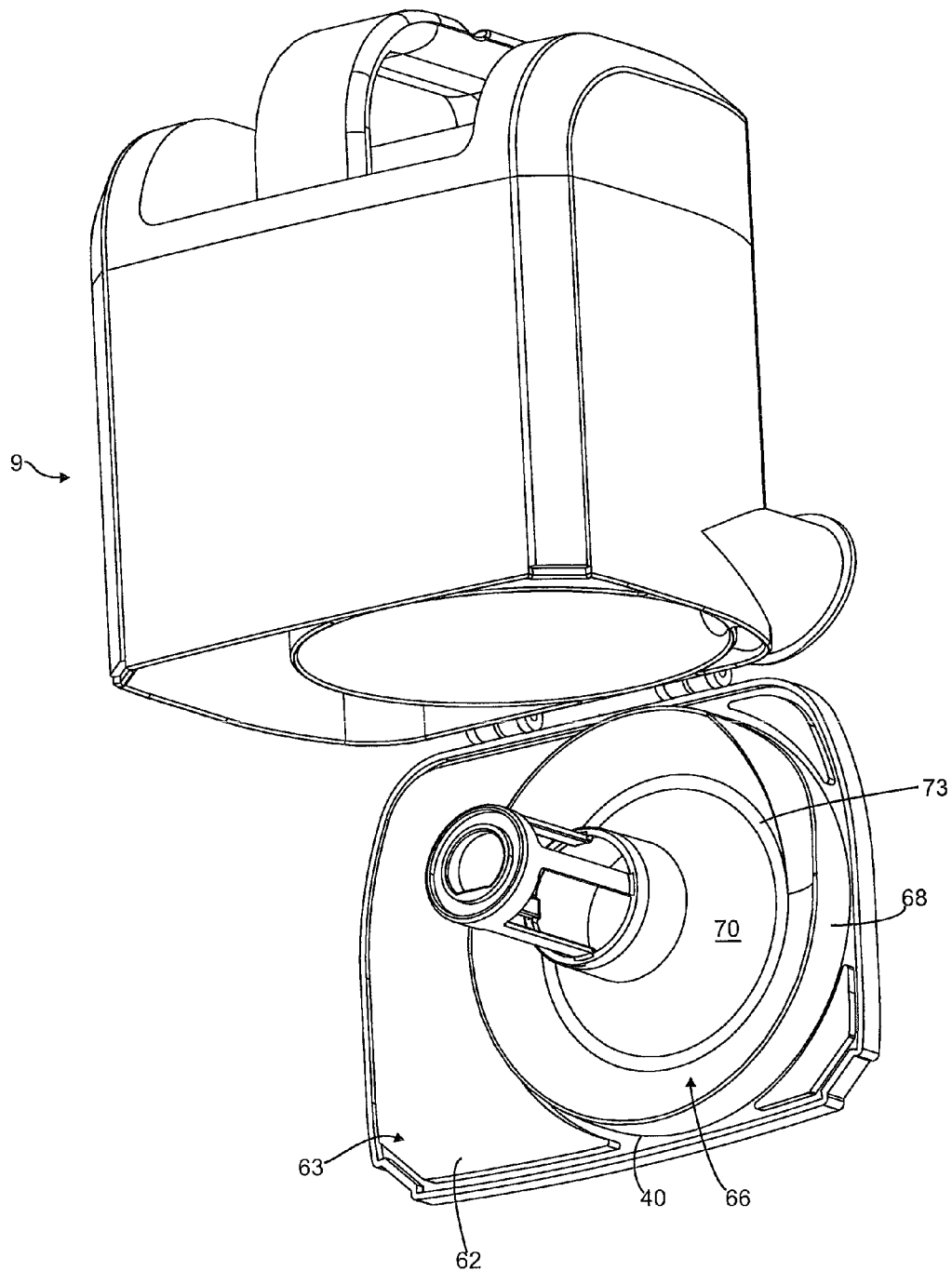
FIG. 24 is a perspective view of the cyclone bin assembly of FIG. 19 with the bottom door in an open position.

To help facilitate emptying the dirt collection chamber 11, at least one of or both of the end walls 61, 62 may be openable. Similarly, one or both of the cyclone chamber end walls 39 and 40 may be openable to allow a user to empty debris from the cyclone chamber. Referring to FIGS. 21 and 24, in the illustrated example, the upper dirt chamber end wall 61 is integral with the upper cyclone end wall 39 and the lower dirt collection chamber end wall 62 is integral with, and openable with, the lower cyclone chamber end wall 40 and both form part of the openable bottom door 63. The door 63 is moveable between a closed position (FIG. 21) and an open position (FIG. 24). When the door 63 is open, both the cyclone chamber 10 and the dirt collection chamber can be emptied concurrently. Alternatively, the end walls of the dirt collection chamber 11 and the cyclone chamber 10 need not be integral with each other, and the dirt collection chamber 11 may be openable independently of the cyclone chamber 10.

Cyclone with Curved or Angled Surfaces

The following is a description of a cyclone construction that may be used by itself in any surface cleaning apparatus or in any combination or sub-combination with any other feature or features disclosed herein.

Referring to FIG. 21, in the illustrated embodiment, the upper end wall 39 closes the upper end of the sidewall 41. In the illustrated example, the intersection or juncture 64 between the end wall 39 and the side wall 41 is a relatively sharp corner that does not include any type of angled or radiused surface. In contrast, the lower end wall 40 preferably meets the lower end of the cyclone sidewall 41 at a juncture 65 that may comprise an angled or a curved juncture surface 66 (see also FIG. 22). The radius 67 of the curved surface 66 may be selected based on the radius of the air inlet 42 (e.g. half of the diameter 48), and optionally may be the selected so that the juncture surface 66 has the same radius as the air inlet 42.

Optionally, the curved juncture surface 66 can be formed as a portion of the sidewall 41 or as a portion of the end wall 40. In the illustrated embodiment, the curved juncture surface 66 is provided as part of an insert member 68 (FIG. 24) that is provided on the bottom end wall 40 and extends upward into the interior of the cyclone chamber 10.

Alternately, or in addition, the juncture between the vortex finder 49 and the end wall 40 may also be provided with an angled or curved surface. In the illustrated embodiment, the juncture 70 between the end wall 40 and the vortex finder 49 may also include a curved surface 72. The curved surface 72 can be sized to have a radius 71 that is the same as the radius 67 of the juncture 66 between the end wall 40 and the sidewall 41. Providing curved surfaces 66, 72 at one or both of the junctures 65, 70 may help reduce backpressure and may help improve cyclone efficiency. In the illustrated embodiment, the radii 65 and 70 are equal to the radius of the air inlet 42. Alternatively, the radii 65 and 70 may be different.

In the illustrated example, member 68 provides the juncture surface 72. Optionally, the curved juncture surfaces within the cyclone chamber 10 (e.g., member 68) may be removable from the cyclone chamber 10 when the cyclone chamber is opened. In the illustrated embodiment, the member 68 is provided on the movable door 63, and is removed from the cyclone chamber 10 when the door 63 is opened. The vortex finder 49 and screen 50 are also mounted to the door 63 and are removed from the cyclone chamber 10 when the door opens. Removing some of all of the curved juncture surfaces 66, 72 from the cyclone chamber 10 when the door 63 is opened for emptying may help ensure dirt and debris can fall out of the cyclone chamber without settling on or otherwise becoming hung-up on the juncture surfaces 66, 72. Alternatively, the juncture surfaces may be formed as part of the sidewall 41, or otherwise fixed within the cyclone chamber 10 such that the juncture surfaces are not removable from the cyclone chamber 10 and do not move with the door 63. A further advantage is that member 68 may abut the inner surface of the sidewall of the cyclone chamber and the lower edge of the sidewall may engage a gasket or other sealing member provided in a recess on the door 63. Such a construction provides an enhanced seal when a curved openable door is provided.

Optionally, the juncture surfaces 66 and 72 may be positioned such that they abut each other to form a generally continuous curved or angled surface (or a combination of a curved surface and an angled or inclined surface). If the radii of curvature of the surfaces 66 and 72 are equal, the surfaces 66 and 72 may co-operate to form a surface with a generally consistent curvature (e.g., a half toroid shape) that may approximate the shape and curvature of the air inlet 42. Matching the curvature of the juncture surfaces 66 and 72 to the curvature to the air inlet 42 may help improve cyclone performance. Alternatively, the curvature of the junctures 66 and 72 need not match the curvature of the air inlet 42.

Alternatively, the juncture surfaces 66 and 72 may be radially spaced apart from each other such that they do not connect directly to each other. In such embodiments, a transition or bridge region may be defined between the juncture surfaces 66, 72. Referring to FIG. 24, in the illustrated embodiment the juncture surfaces 66 and 72 are radially separated from each other by a bridge surface 73 that has radial width 74 (FIG. 21). The width 74 may be any suitable width, including, for example, between and 3% and about 15% or more of the diameter 48 of the air inlet 42. Optionally, the width 74 may be greater than 0.5%, such as between about 0.5-12%, 3%-12%, 3%-7% and 3%-5% of the diameter 48. In this configuration, the juncture surfaces 66 and 72 are separate from each other, and from bridge surface 73.

Optionally, in addition to (or as an alternative to) the member 68 on the bottom wall 40, an additional insert member may be provided within the cyclone chamber 10, and may be located toward the upper end wall 39. In the illustrated embodiment, an upper insert member 76 is provided at the upper end of the cyclone chamber 10. The insert member 76 includes a downwardly extending central wall or projection member 77 that extends into the interior of the cyclone chamber 10 and may optionally engage the distal end 78 of the screen 50 (FIG. 21). Together, the vortex finder 49, screen 50 and projection member 77 may form a generally continuous internal column member that extends between the second and first end walls 39 and 40 of the cyclone chamber. Providing the projection member 77 may help direct air flow within the cyclone chamber, and may help support and/or stabilize the distal end 78 of the screen 50.

Figure 22:
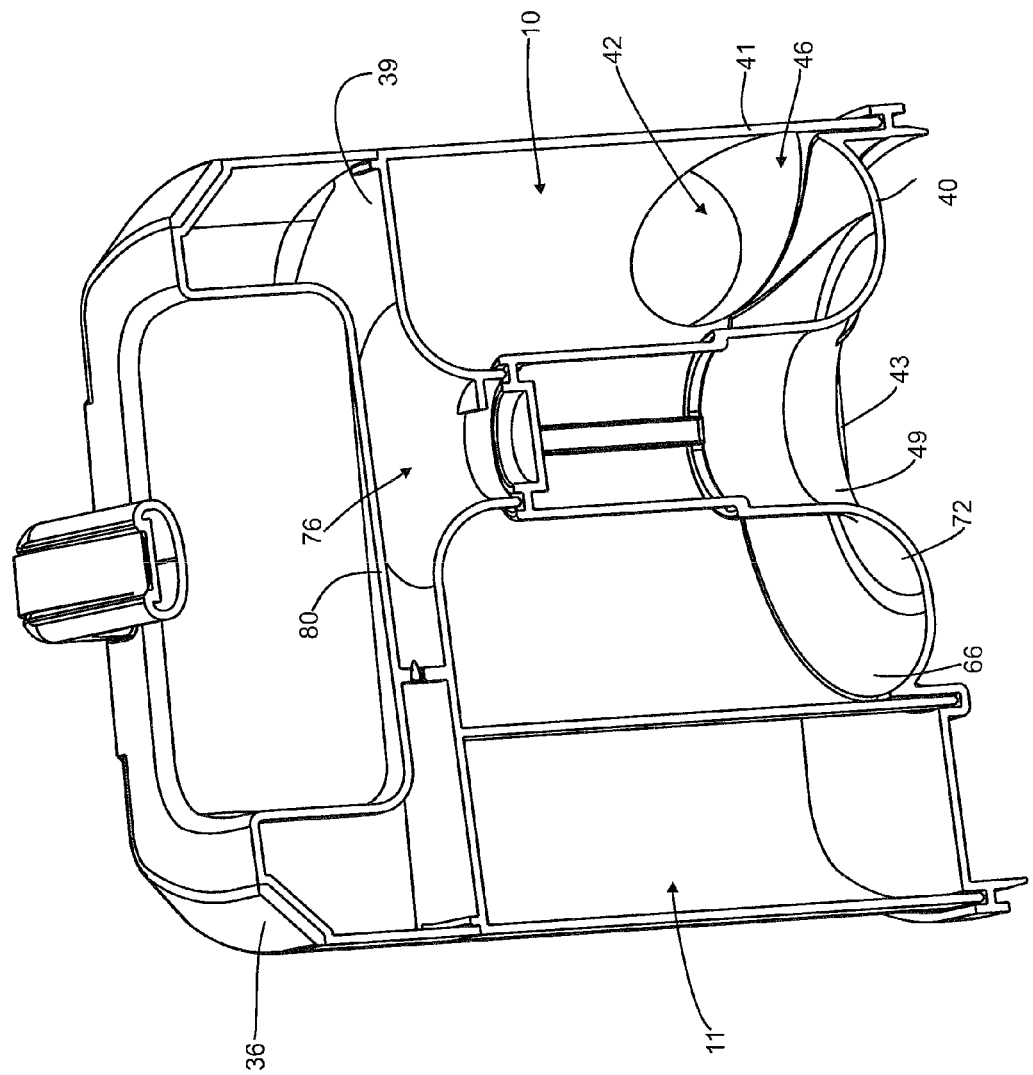
FIG. 22 is a sectional view of the cyclone bin assembly of FIG. 19, taken along line F22-F22 in FIG. 19.

Optionally, the juncture 79 between the end wall 39 and the projection member 77 may include a curved juncture surface 80 (see FIGS. 21 and 22). The surface 80 is curved and defines a radius 81. The radius 81 may be any suitable radius, and in the illustrated embodiment is the same as radii 66 and 72. Providing curved surfaces 80 at the junctures between the end wall 39 and the projection member 77, may help reduce backpressure and may help improve cyclone efficiency. Optionally, in some embodiments the juncture 64 may also include an angled or curved surface.

In the illustrated embodiment, the bottom of the air inlet 42 is generally aligned with the surface of the member 68, such that the air inlet 42 is positioned at the bottom of the cyclone chamber 10.

The radial distance 81 (FIG. 21) between the cyclone chamber sidewall 41 and the surface 54 of the vortex finder 49, which form an upstanding wall portion of the member 68, may be any suitable distance. Preferably, the distance 81 is greater than the air inlet width 48 such that the vortex finder 49 is radially offset from the edge of the air inlet 42 by an offset distance 82. The offset distance 82 may be any suitable distance, and may, for example, be between about 0% and about 100% or more of the air inlet width 48, between about 2% and about 25% of the width 48, between about 5% and about 15% of the width 48 and may be about 10% of the width 48. Altering the distance 81 may affect the efficiency and performance of the cyclone.

In the illustrated embodiment, the air inlet 42 is positioned at the juncture 65 between the sidewall 41 and the end wall 40 and is positioned such that the air inlet 42 is adjacent the sidewall 41 (i.e., there is no radial gap between the outer edge of the air inlet 42 and the sidewall 41). Alternatively, the air inlet 42 may be spaced radially inwardly from the sidewall 41 such that a gap is provided between the edge of the air inlet 42 and the sidewall 41.

It will be appreciated that if the air outlet is provided in wall 39, then insert member 76 may be configured as vortex finder 49 and vortex finder 49 may be configures as insert member 76.

In the embodiment FIG. 25, the juncture 1065 between the sidewall 1041 and the bottom wall 1040 is not rounded, but instead includes an angled surface 1066. The angle of the surface 1066 is selected so that the juncture surface 1066 is generally tangential to the air inlet 1042. In the illustrated example, the surface 1066 extends generally continuously from the sidewall 1041 to the bridge surface 1073. In this example the juncture surface 1072 is rounded, as described in detail above.

The air inlet and the vortex finder are preferably sized such that the top (upper inward extent) of the air inlet is below the innermost end of the vortex finder. For example, in the illustrated embodiment, the bottom of the air inlet 1042 is adjacent the bottom wall 1040 and the top of the air inlet 1042 is spaced apart from the bottom wall by a height 1094, which in the illustrated configuration is equal to the diameter 1048. The vortex finder 1049 also extends away from the bottom wall 1040 and has a height 1096 measured in the axial direction. In this embodiment, the height 1096 is greater than the height 1095 and the upper end of the vortex finder 1049 is offset above the top of the air inlet 1042 by a distance 1097. The distance 1097 can be any suitable distance, and may be, for example, between 0% and about 25% or more of the air inlet diameter 1048 (e.g., between about 0.05-1 inches, preferably between about 0.1-0.5 inches and more preferably about 0.25 inches). Alternatively, the top of the air inlet 1042 can be flush with, or extend above the top of the vortex finder 1049.

Referring to FIGS. 26-37, additional embodiments of a cyclone bin assembly are illustrated. Each embodiment is generally similar to cyclone bin assembly 9, and analogous features are identified using like reference numerals indexed by a given amount (2000, 3000, 4000, etc.). Features of any one embodiment of the cyclone bin assembly may be combined in combination or sub-combination with any compatible features from any of the other embodiments of the cyclone bin assembly.

Figure 26:
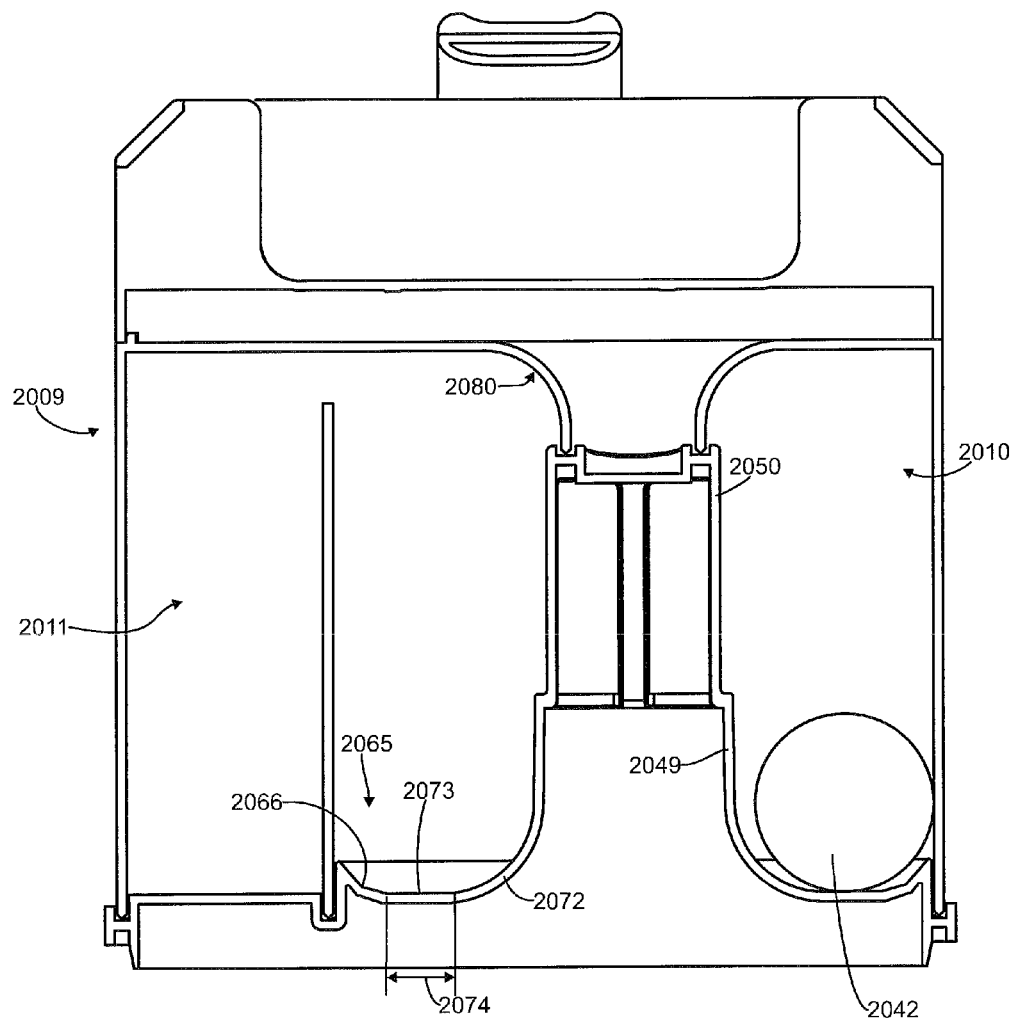
FIG. 26 is a cross sectional view of another embodiment of a cyclone bin assembly.

Referring to FIG. 26, in this embodiment the juncture surface 2066 is kinked as opposed to being a generally flat surface as shown in FIG. 25. In this embodiment, the juncture surface 2066 is not tangential to the sidewall of the air inlet 2042. In this illustrated example, the juncture surface 2072 is curved with a radius that generally matches the curvature of the air inlet 2042 and the bridge surface 2073 extends between surfaces 2072 and 2066 and has a width 2074. In this embodiment, the screen 2050 is generally cylindrical and has a constant width along its entire height.

Figure 27:
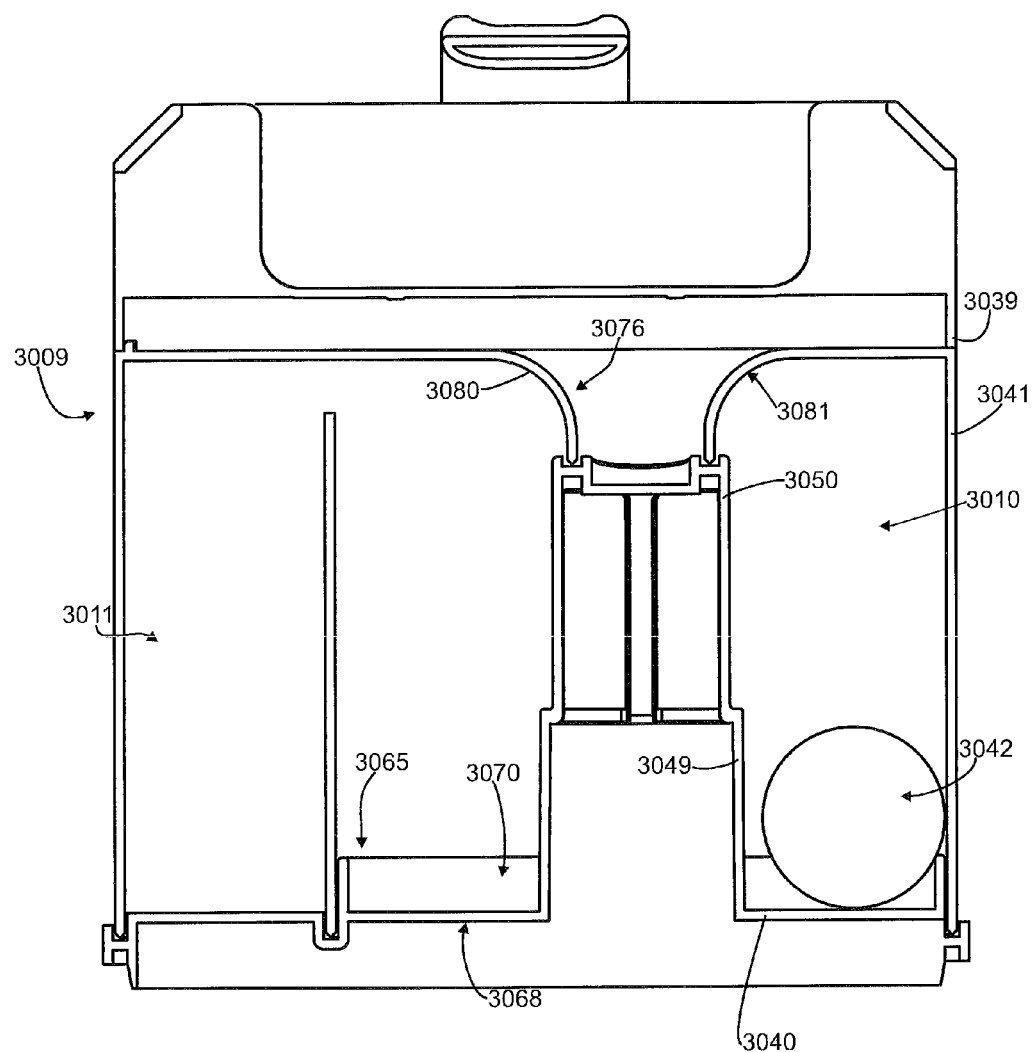
FIG. 27 is a cross sectional view of another embodiment of a cyclone bin assembly.

Referring to FIG. 27, in this embodiment, the juncture 3065 between the sidewall 3041 and the bottom wall 3040 forms a sharp corner and is not angled or radiused and the juncture 3070 between the bottom wall 3040 and the vortex finder 3049 is also formed as a sharp corner. While the lower junctures are both formed as sharp corners, the juncture surface 3080 extending between the upper wall 3039 and the insert 3076 remains a curved surface with radius 3081. In this configuration, the air inlet 3042 is positioned in juncture 3065 and is tangential to both the cyclone chamber sidewalls 3041 and the bottom wall 3040. Further, a bridge surface is provided.

Figure 28:
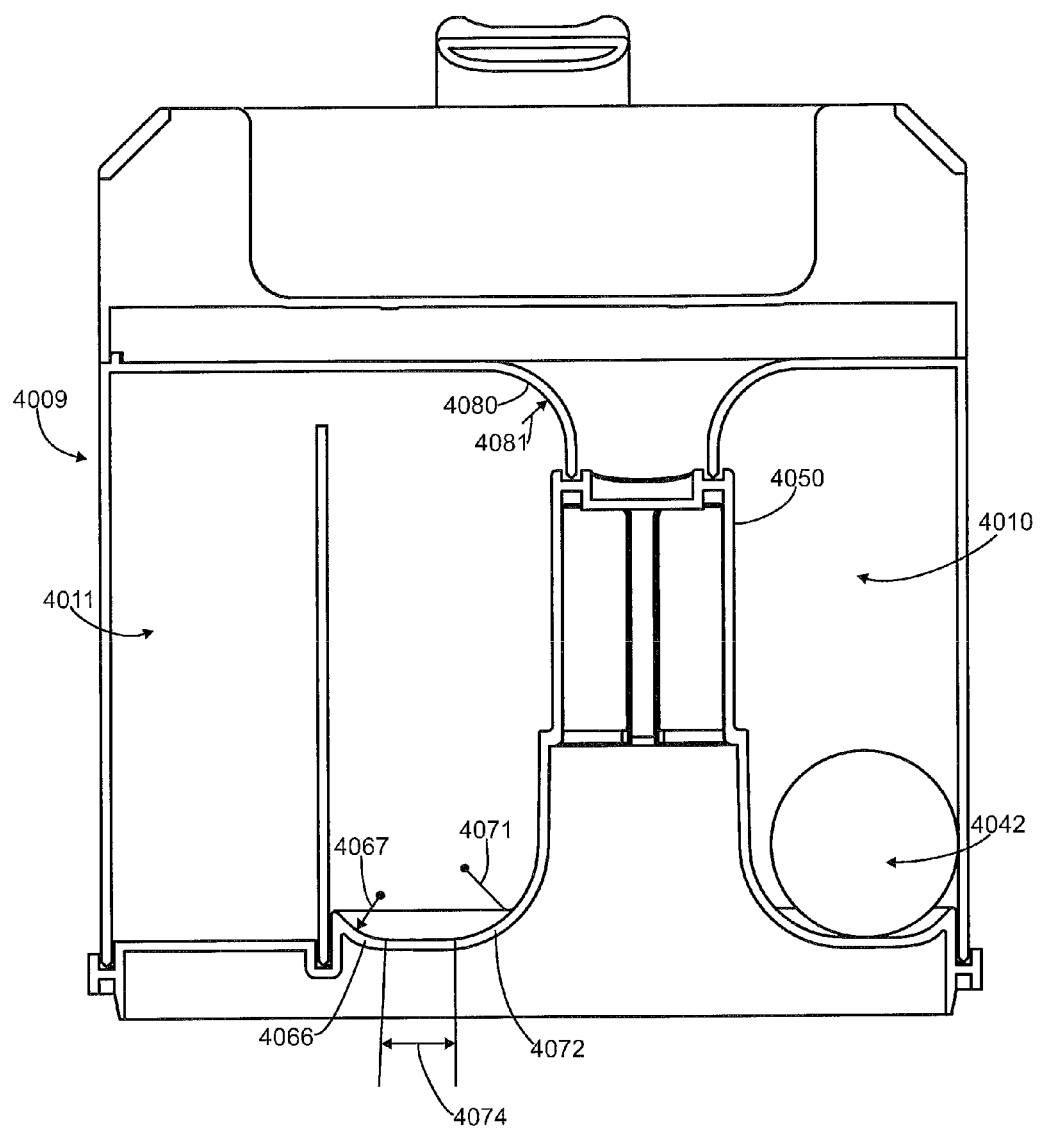
FIG. 28 is a cross sectional view of another embodiment of a cyclone bin assembly.

Referring to FIG. 28, in this embodiment, juncture surfaces 4066 and 4072 are both curved surfaces but radiuses 4067 and 4071 are different. In the illustrated example, radius 4067 is smaller than the curvature of the air inlet 4042 such that the surface 4066 is not aligned with the side of the air inlet 4042. Optionally, the radius 4071 can be selected to match the curvature of the air inlet 4042.

Figure 29:
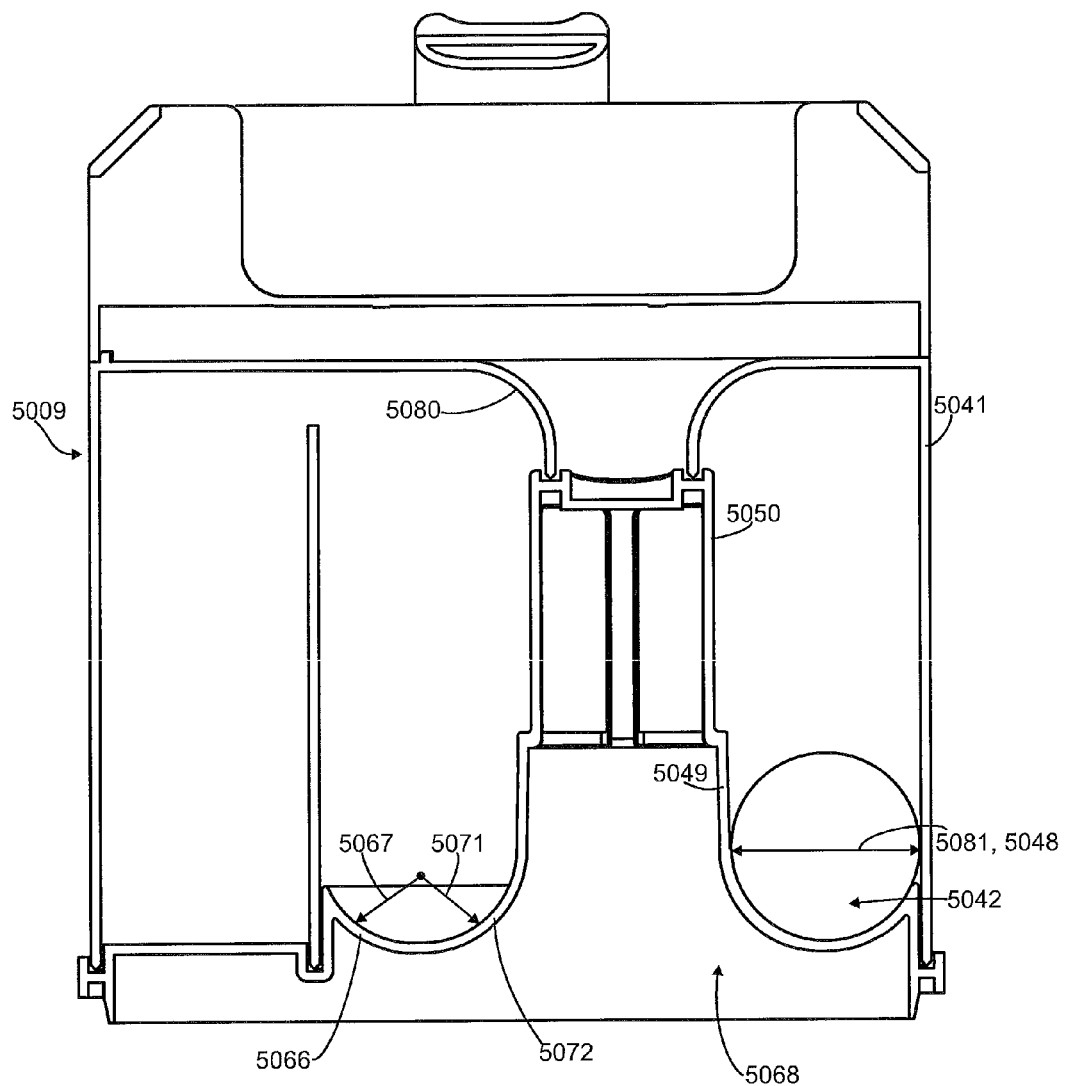
FIG. 29 is a cross sectional view of another embodiment of a cyclone bin assembly.

Referring to FIG. 29, in this embodiment, the member 5068 is configured such that the radial distance 5081 between the cyclone chamber sidewall 5041 and the vortex finder 5049 is the same as the diameter 5048 of the air inlet 5042. In this configuration, there is no gap between a radial distance in equal to the diameter of the air inlet 5042 and the vortex finder 5049. In the example illustrated, juncture surfaces 5066 and 5072 are both curved surfaces and are configured so that the radiuses 5067 and 5071 are the same and are selected to match the curvature of the air inlet 5042. In this configuration, substantially all of the lower half of the air inlet 5042 is aligned with the juncture surfaces 5066 and 5072. In this embodiment, the juncture surface 5080 is also curved. When configured in this matter, juncture surfaces 5066 and 5072 meet so as to form one generally continuous curve surface that extends from the cyclone chamber sidewall 5041 to vortex finder 5049.

Figure 30:
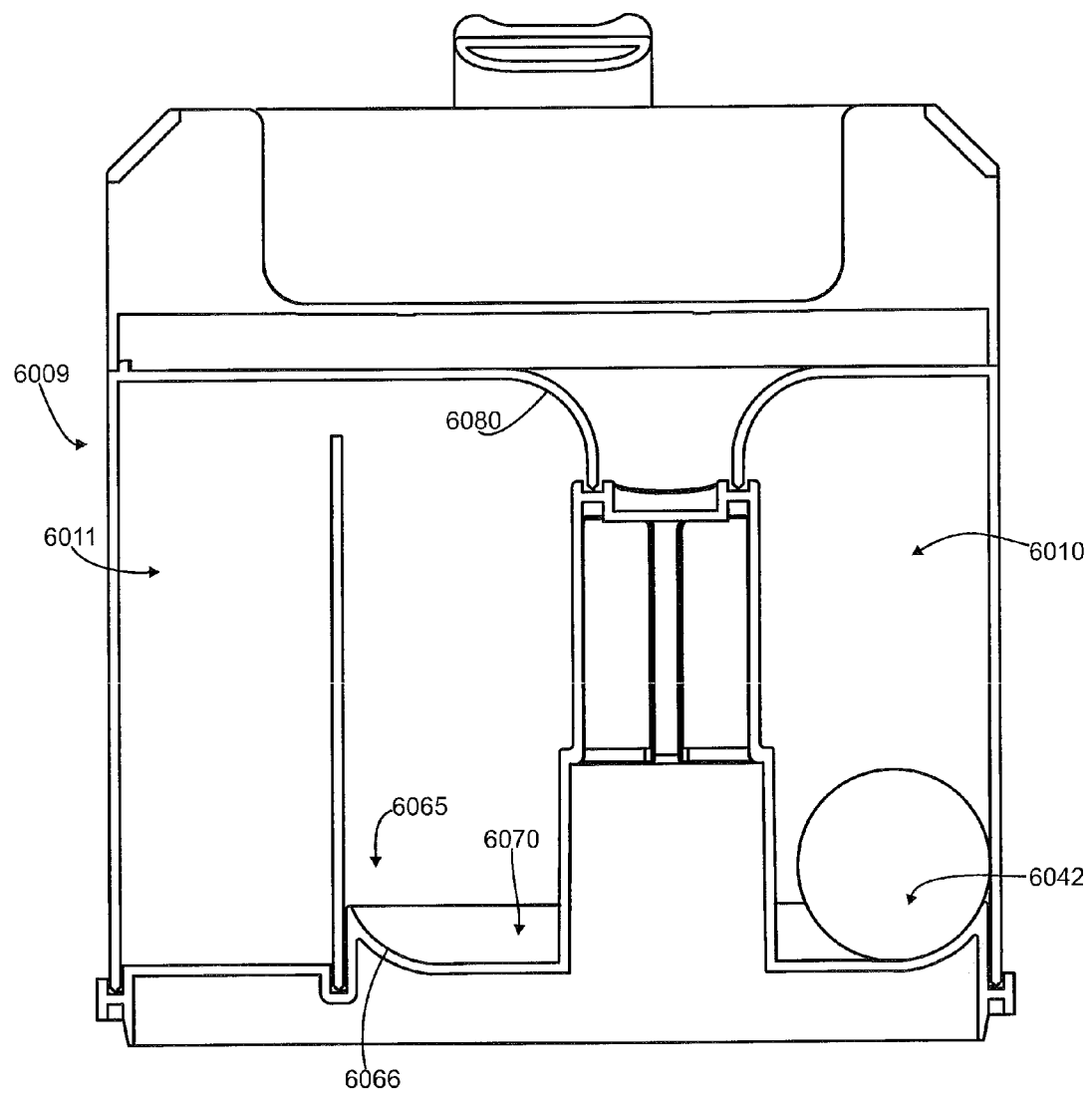
FIG. 30 is a cross sectional view of another embodiment of a cyclone bin assembly.

Referring to FIG. 30, in this embodiment, juncture surface 6066 is curved with a curvature that is selected to match the shape of air inlet 6042 whereas juncture 6070 is formed as a sharp corner.

Figure 31:
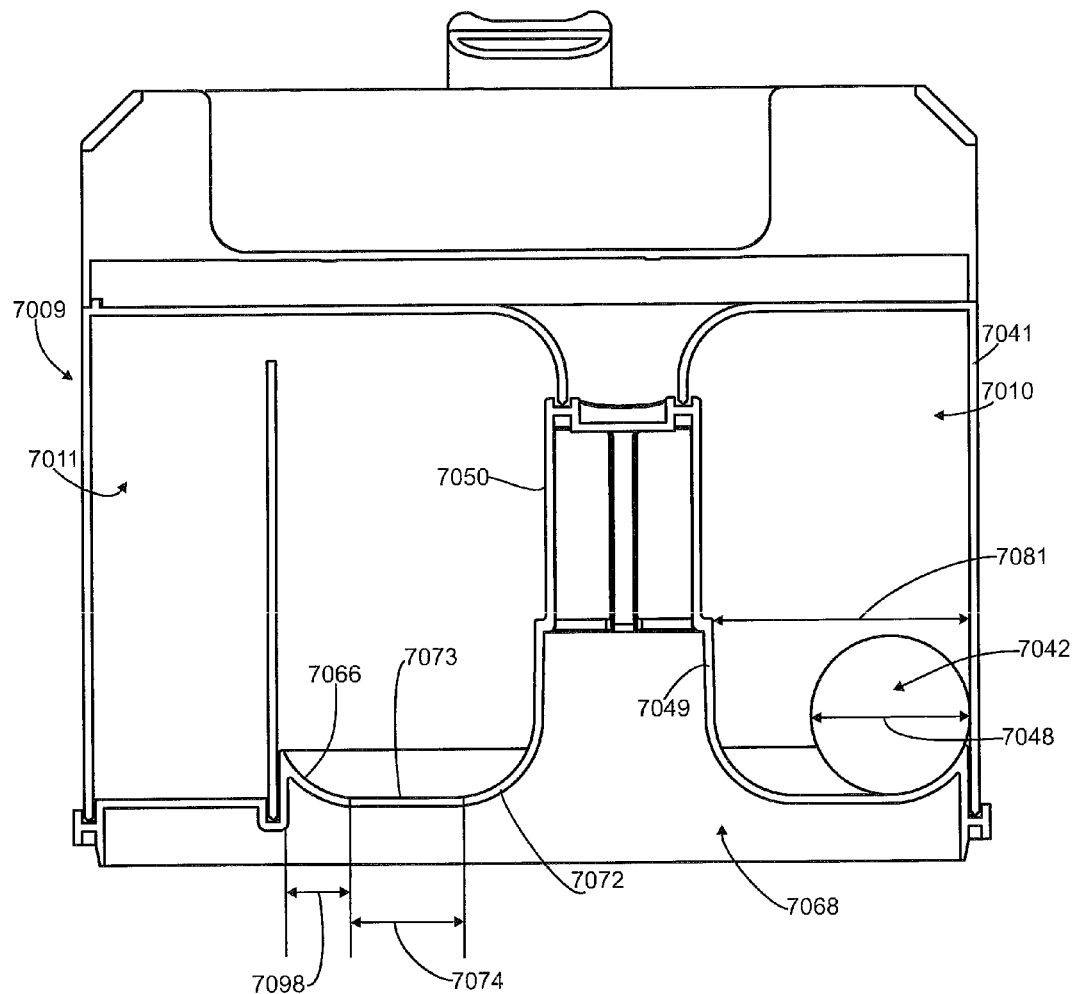
FIG. 31 is a cross sectional view of another embodiment of a cyclone bin assembly.

Referring to FIG. 31, in this embodiment, the cyclone chamber 7010 and member 7068 are configured such that the radial distance 7081 between the cyclone chamber sidewall 7041 and the vortex finder 7049 is substantially larger than the diameter 7048 of the air inlet 7042. In this configuration, the width 7074 of the bridge surface 7073 is relatively large and in the example illustrated, is greater than the radial width 7098 of juncture surface 7066. In this example, both juncture surfaces 7066 and 7072 are both curved surfaces and are configured such that their curvature generally matches the shape of air inlet 7042.

Figure 32:
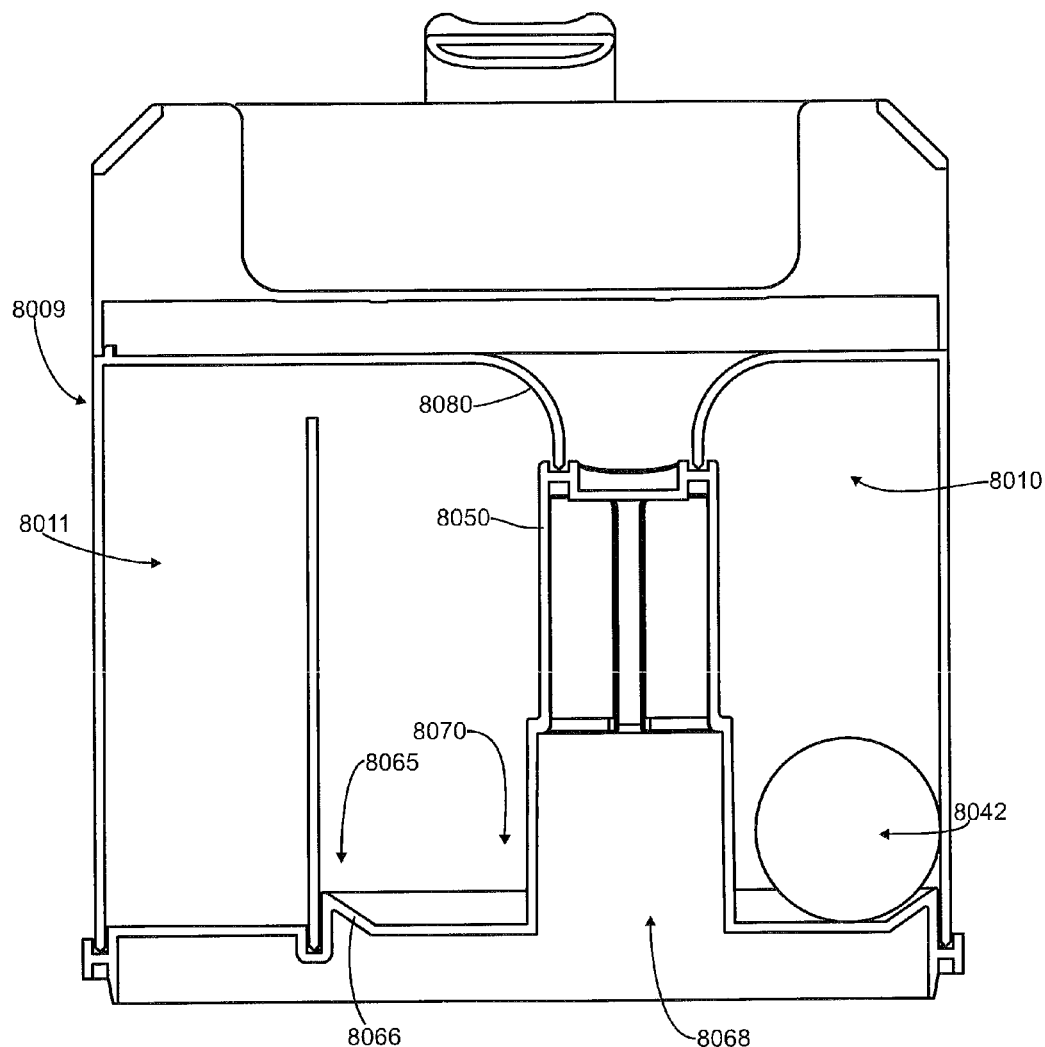
FIG. 32 is a cross sectional view of another embodiment of a cyclone bin assembly.

Referring to FIG. 32, in this embodiment, member 8068 is configured so that the juncture 8065 has an angled or inclined juncture surface 8066 and the juncture 8070 is formed as a sharp corner. Illustrated as a curved, juncture surface 8080 can optionally be configured as a sharp corner or as an inclined or angled surface.

Figure 33:
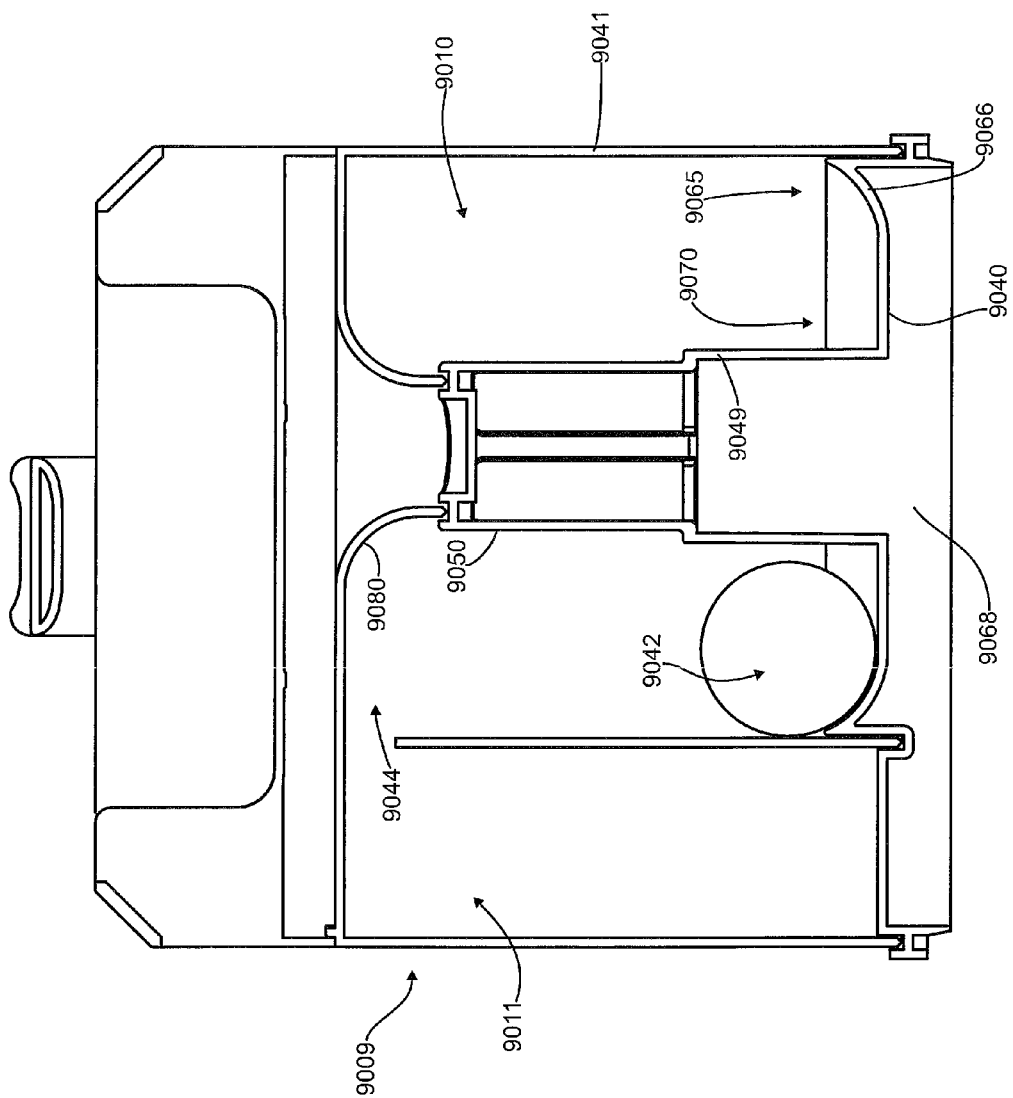
FIG. 33 is a cross sectional view of another embodiment of a cyclone bin assembly.

Referring to FIG. 33, in this embodiment member 9068 is configured so that the juncture between 9070, between bottom wall 9040 and vortex finder 9049 is configured as a sharp corner and juncture 9065 between the bottom wall 9040 and the cyclone chamber sidewall 9041 includes a curved juncture surface 9066. The curvature of juncture surface 9066 is selected to generally match the curvature of air inlet 9042. In this configuration, the air inlet 9042 is provided at a different location within the cyclone chamber 9010, but is still positioned generally tangential relative to cyclone chamber sidewall 9041. Changing the position of the air inlet 9042 may affect the air flow within the cyclone chamber and, in the example illustrated, may result in air circulating within the cyclone chamber 9010 in the direction that is generally opposite to the direction of air circulation in the cyclone chambers of the previous embodiments. Also, in this configuration, the air inlet 9042 is located adjacent and generally below the dirt outlet slot 9044.

Figure 34:
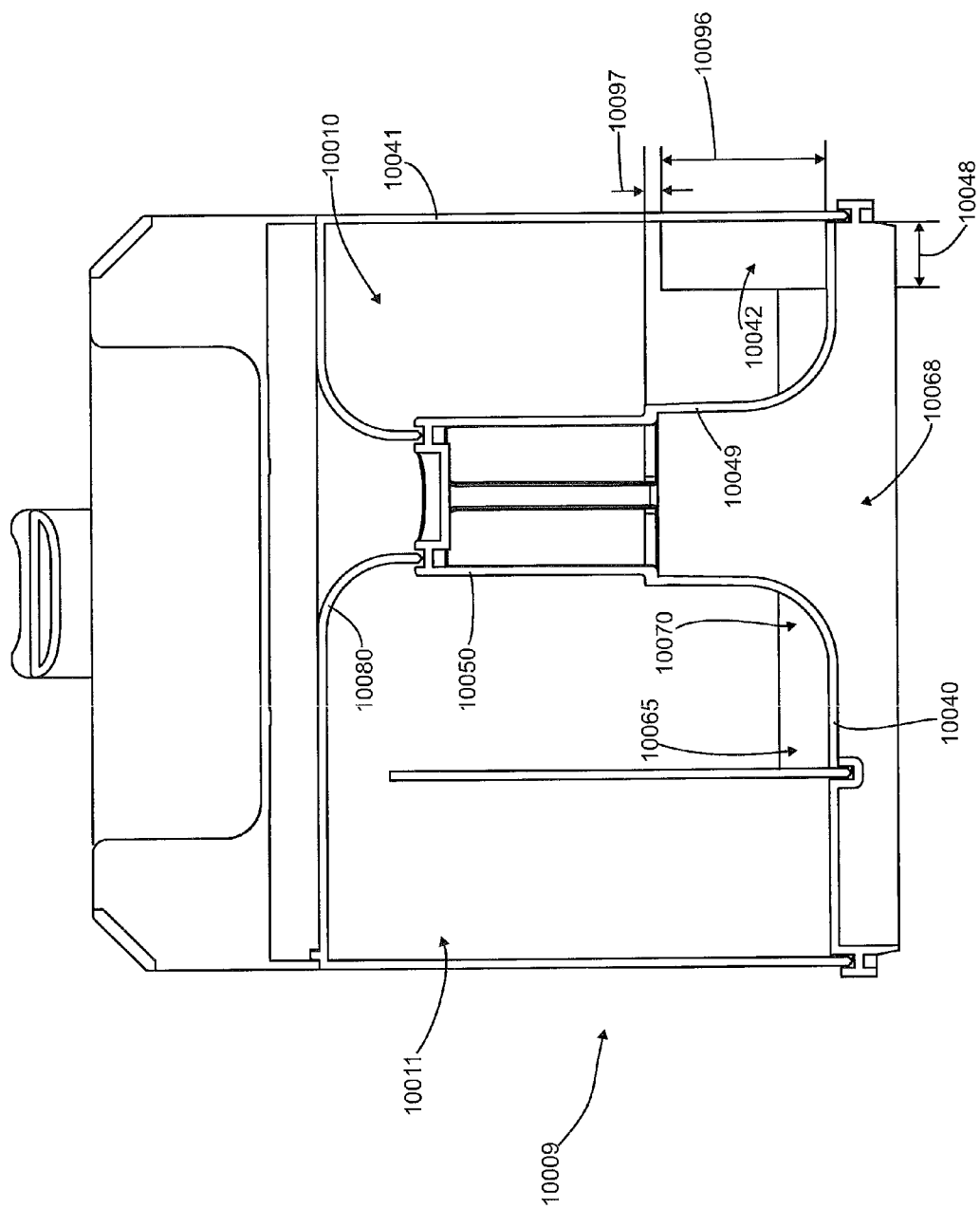
FIG. 34 is a cross sectional view of another embodiment of a cyclone bin assembly.

Referring to FIG. 34, in this embodiment, member 10068 is configured so that outer juncture 10065 (between cyclone chamber sidewall 10041 and bottom wall 10040) is configured as a generally sharp corner and inner juncture 10070 is configured as a curved surface. In this embodiment, the air inlet 10042 is generally rectangular (as opposed to being generally circular as in the previous embodiments) and has an air inlet height 10096. In the cited example, the air inlet height 10096 is still less than the height of the vortex finder 10049 thereby providing a gap of height 10097 between the top of the air inlet 10042 and top of the vortex finder 10049. In this embodiment, the sharp corner configure of juncture 10065 generally matches the shape of the lower portion of the air inlet 10042 and the air inlet is generally tangential to the cyclone chamber sidewall 10041.

Figure 35:
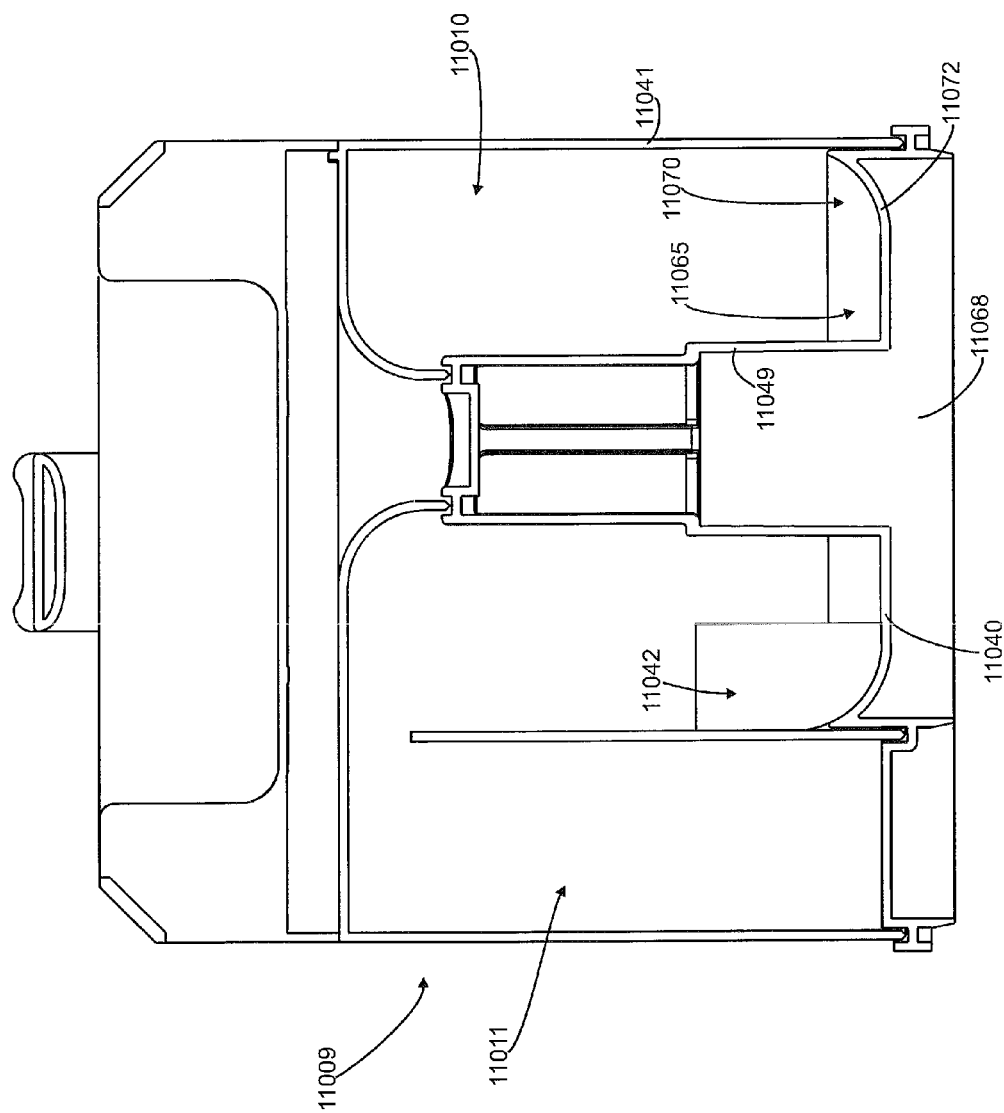
FIG. 35 is a cross sectional view of another embodiment of a cyclone bin assembly.

Referring to FIG. 35, in this embodiment the air inlet 11042 is a partially rectangular partially curved configuration. In the illustrated example, the lower portion of the air inlet 11042 located towards the inner section of the cyclone chamber sidewall 11041, and the lower wall 11040 is curved, and the surface 11072 at juncture 11070, is a curved surface that is configured to generally match the shape of the air inlet 11042. The juncture 11065 between the lower end wall 11040 and the vortex finder 11049 is configured as a sharp corner. Also in this example, the air inlet 11042 is positioned toward the center of the cyclone bin of the assembly 11009 and is adjacent to a portion of the cyclone chamber sidewall 11041 that separates the cyclone chamber 11010 from the dirt collection chamber 11011.

Figure 36:
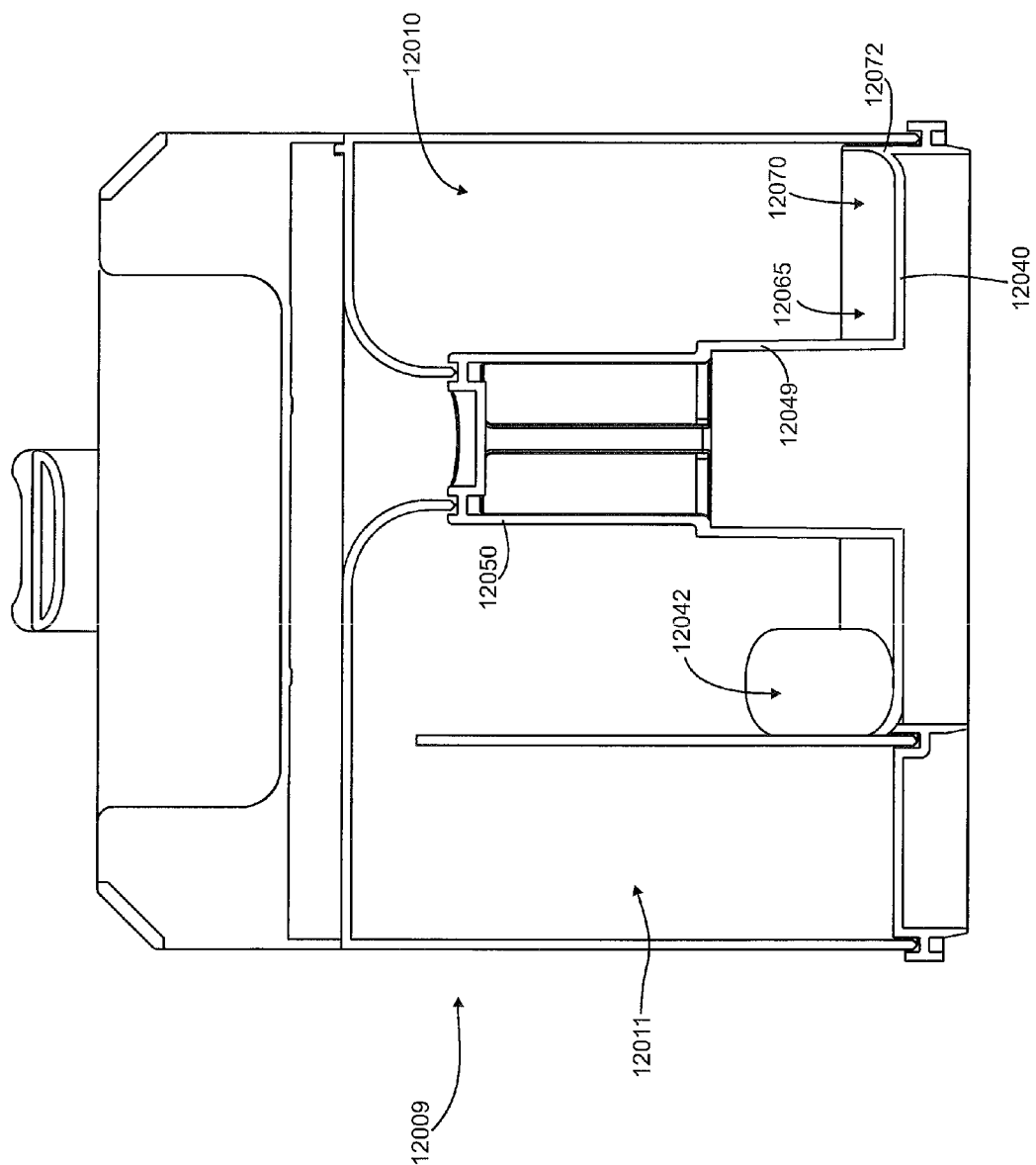
FIG. 36 is a cross sectional view of another embodiment of a cyclone bin assembly.

Referring to FIG. 36, this embodiment is generally similar to the embodiment of FIG. 35 but the air inlet 12042 is of a different configuration than air inlet 11042. In this example, the lower portion of the air inlet 12042 is curved and the juncture 12070 is also curved so that the juncture surface 12072 generally matches the shape of the air inlet 12042. The juncture 12065 between the bottom wall 12040 and the vortex finder 12049 is configured as a generally sharp corner.

Figure 37:
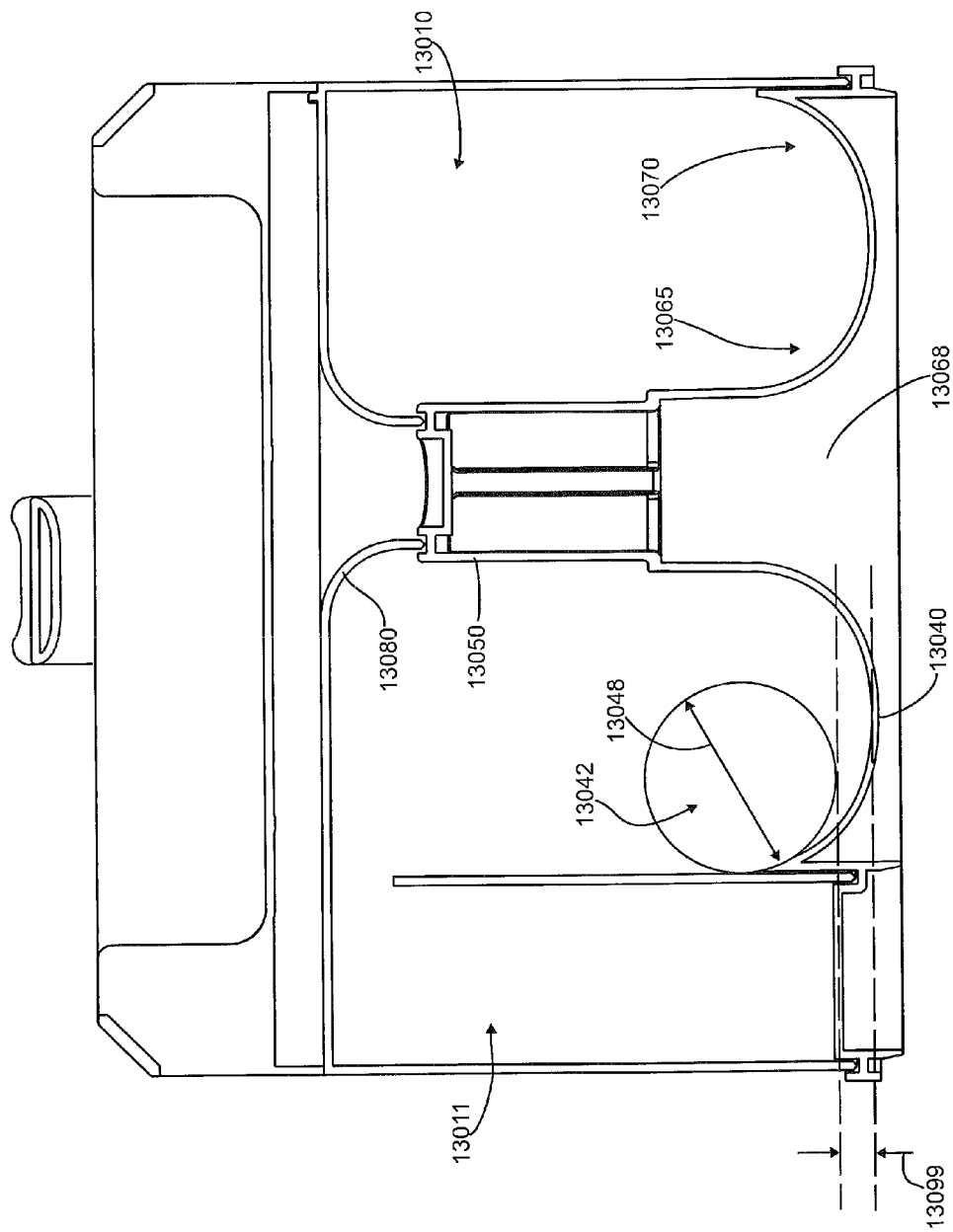
FIG. 37 is a cross sectional view of another embodiment of a cyclone bin assembly.

Referring to FIG. 37, in this embodiment, member 13068 is configured so that the bottom wall 13040 of the cyclone chamber 13010 is spaced below the bottom of the air inlet 13042. In the illustrated example, the bottom wall 13040 is offset below the bottom of the air inlet 13042 by distance 13099. The distance 13099 may be any suitable distance, and may be between about 0% and about 50% of the diameter 13048 of the air inlet 13042. In this example, junctures 13065 and 13070 are both curved but because of the vertical offset 13099, portions of the juncture 13070 are spaced apart from the edges of the air inlet 13042.

As exemplified in the forgoing, the juncture of the sidewall and the end wall at the cyclone air inlet end is preferably configured to permit air exiting the air inlet to transition smoothly (e.g., without forming eddy currents or other turbulence) as the air enters the cyclone chamber. Accordingly, the juncture of the side and end walls is preferably configured to match the shape of the cyclone air inlet and the cyclone air inlet is preferably positioned adjacent the juncture. However, as exemplified, the juncture may be angled so as to approximate the curvature of the air inlet. Alternately, if the air inlet is not circular, the juncture may be shaped similarly to the portion of the air inlet that abuts the juncture or may approximate the shape. As also exemplified, the air inlet may be spaced from the juncture of the side and end walls (e.g., above and/or inwardly therefrom) but may abut the sidewall and/or end wall inwards of the juncture.

Alternately or in addition, the juncture of the sidewall of a vortex finder (or insert) and an end wall may be shaped to match the shaped of the juncture of the sidewall and the end wall at the air inlet or may be angled or curved so as to reduce eddy currents or turbulence.

Alternately, or in addition, distance between the sidewall and the vortex finder and/or the innermost end of the vortex finder and the end wall may be greater than the diameter of the air inlet.

It will be appreciated that, in a preferred embodiment, each of these features is used. However, the use of any of the features may beneficially reduce eddy currents or other turbulence in the cyclone chamber and thereby reduce back pressure through the cyclone chamber. A reduction in the back pressure through the cyclone chamber mill permit the velocity of air flow at the dirty air inlet to be increased, all other factors remaining the same, and thereby increase the cleaning efficiency of a vacuum cleaner.

Barrier Wall

The following is a description of a barrier wall that may be used by itself in any surface cleaning apparatus or in any combination or sub-combination with any other feature or features disclosed herein.

Referring to FIGS. 44-54, schematic representations of alternate embodiments of a cyclone chamber and dirt collection chamber are shown. These schematic representations are generally similar to the cyclone chamber 10 and dirt collection chamber 11, and analogous features are identified using like reference characters with a unique suffix.

Figure 44:
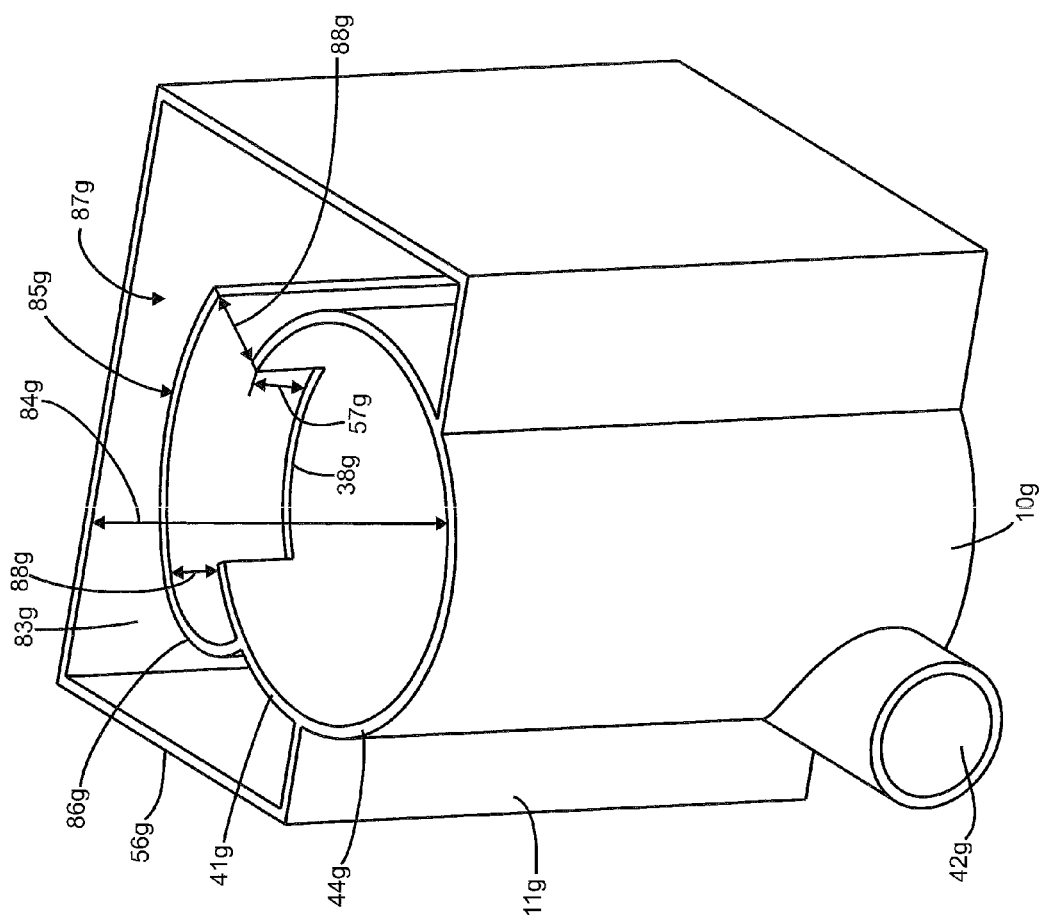
FIG. 44 is a perspective schematic representation of another embodiment of a cyclone bin assembly.

Referring to FIG. 44, a cyclone chamber 10g is illustrated in combination with a dirt collection chamber 11g. The cyclone chamber 10g includes an air inlet 42a, air outlet (not shown), sidewall 41a and a dirt outlet 44. For ease of description the upper walls of the cyclone chamber 10g and dirt collection chamber 11g have been removed, but it is understood that the upper ends of the dirt collection chamber 11g and cyclone chamber 10g can be covered with any suitable upper wall or lid. The air inlet 42a is provided toward the bottom end of the cyclone chamber 10g and the dirt outlet 44g is provided toward the top of the cyclone chamber 10g. Alternatively, the positions of the air inlet 42g and dirt outlet 44g may be reversed.

In the illustrated embodiment, a deflector or barrier wall 83g is positioned in the dirt collection chamber 11g generally opposite the dirt outlet 44g. In this position, dirty air exiting the cyclone chamber 10g may tend to contact the barrier wall 83g, which may help dis-entrain dirt and debris from the air flow. The barrier wall 83g may also guide or direct dirt particles in a desired direction within the dirt collection chamber 11g. Alternatively, instead of being positioned within the dirt collection chamber 11g, the barrier wall 83g may be provided in any other air passage or conduit that is in air flow communication between the dirt outlet 44g and the dirt collection chamber 11g (for example if the dirt outlet 44g is not in direct communication with the dirt collection chamber 11g).

The barrier wall 83g has a first or inner face 84g that faces and is spaced from the dirt outlet 44g and an opposed outer face 85g that is spaced from and faces the sidewall 56g of the dirt collection chamber 11g. The barrier wall 83g also defines an upstream end 86g and a downstream end 87g relative to the direction of air circulation within the cyclone chamber 10g. Barrier wall may be fixed in position by any means. For example, it may be affixed to the cyclone chamber sidewall, the end wall or a sidewall of the exterior dirt collection chamber. In the illustrated embodiment the barrier wall 83g extends from the cyclone chamber sidewall 41g, and the upstream end 86g of the barrier wall 83g is connected to the cyclone chamber sidewall 41g at a location upstream from the upstream end of the slot 44g, and is sealed against the sidewall 41g. The downstream end 87g of the barrier wall 83g is spaced apart from the cyclone chamber sidewall 41g. Alternatively, the upstream end 86g of the barrier wall 83g may be spaced apart from the cyclone chamber sidewall 41g. If the barrier wall is connected to or extends from the sidewall of the cyclone chamber, then the position from which the barrier wall extends is preferably up to 1 inch and more preferably 0.125 to 0.5 inches upstream from the upstream side of the dirt outlet.

The barrier wall 83g is radially spaced apart from the dirt outlet 44g and the cyclone chamber sidewall by a distance 88g. In the illustrated embodiment the distance 88g is generally constant and the distance between the upstream end of the dirt slot and the barrier wall 83g is the same as the distance between the downstream end of the dirt slot and the barrier wall 83g (i.e. most of the barrier wall 83g is generally concentric with or parallel to the cyclone chamber sidewall 41a). The distance 88g may be selected to be any suitable distance, and preferably is large enough to allow debris to pass between the barrier wall 83g and the sidewall 41g. For example, the distance 88g may be selected to be up to 1.5 inches or more, and may be configured to be less than 1 inch (e.g., 0.5-0.075 inches) and may be between about 0.125 and 0.5 inches. If the surface cleaning apparatus is to be used to clean, e.g., dry wall dust, then the spacing may be between 0.075-0.2 inches. In configurations in which one end of the barrier wall 83 flares away from the cyclone chamber sidewall 41 downstream from the dirt outlet (as explained herein), the distance between the flared portion of the barrier wall and the cyclone chamber sidewall 41 may exceed the ranges given above. For example, the distance between the cyclone chamber sidewall and the barrier wall at the downstream end of the dirt outlet may be between 10-50% further from the cyclone chamber sidewall than the distance between the cyclone chamber sidewall and the barrier wall at the upstream end of the dirt outlet and is preferably about 10-20% further.

In the illustrated embodiment, the barrier wall 83g is slightly wider in the axial direction than the dirt outlet slot 44g, so that the barrier wall 83g covers or overlaps the full width of the dirt slot 44g (e.g., it has a similar angular extent). Alternatively, the barrier wall 83g may have a width that is equal to or less than the width of the dirt slot 44g.

The height of the barrier wall may be from 35-150% the height of the dirt outlet. For example, in the illustrated embodiment, the barrier wall 83g extends substantially the entire height of the cyclone chamber 10g in the axial direction, and the height of the barrier wall 83g is greater than the height 57g of the dirt slot 44g. In this embodiment the barrier wall 83g has a constant height along its width, but alternatively the height of the barrier wall 83g may vary along its width (e.g. the upstream end of the wall may be taller than the downstream end, or vice versa).

Figure 45:
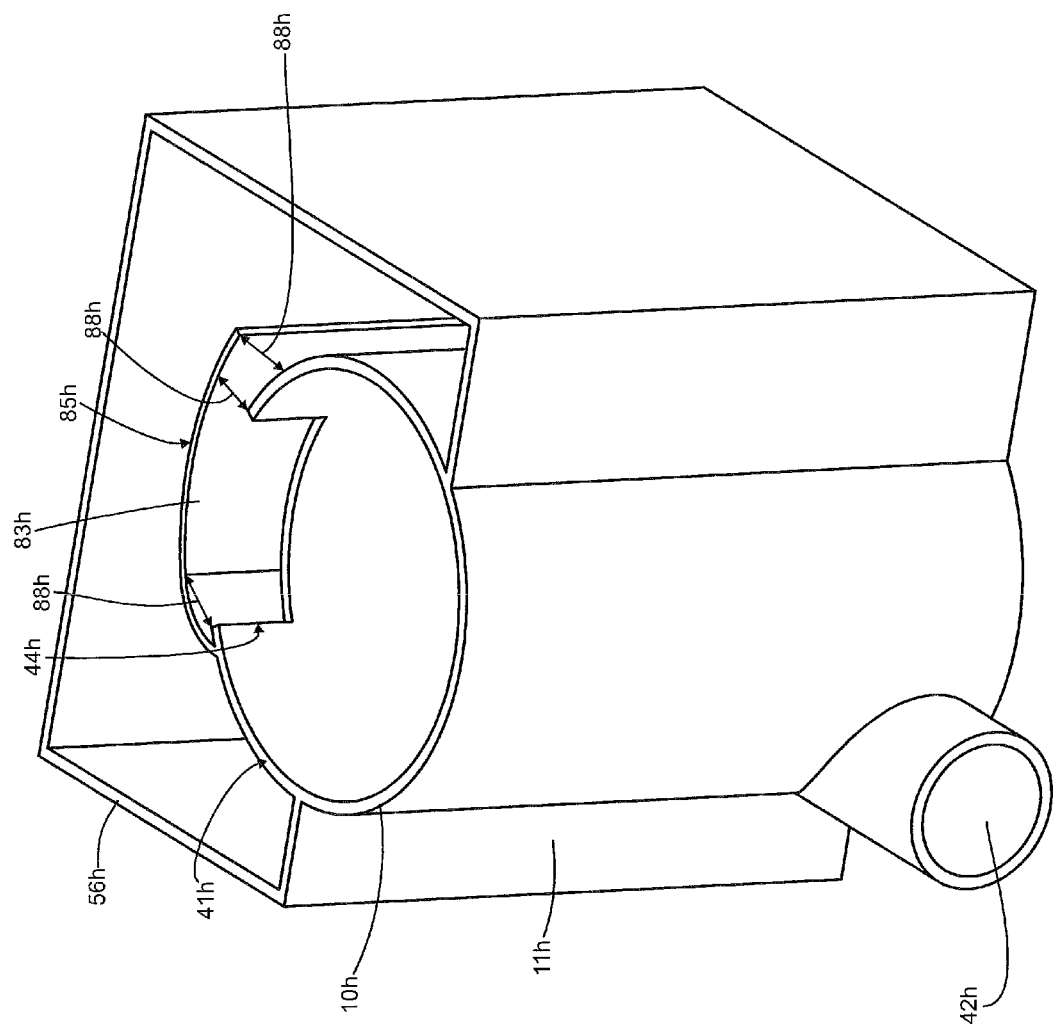
FIG. 45 is a perspective schematic representation of another embodiment of a cyclone bin assembly.

Referring to FIG. 45, in another embodiment, the barrier wall 83h does not extend the full height of the cyclone chamber 10h, and the upper end of the barrier wall 83h is axially offset below the upper end of the cyclone chamber sidewall 41h. In this configuration, the barrier wall 83h does not cover the full axial height of the dirt outlet 44h, but does extend to cover the full width of the dirt outlet 44h.

Also in this embodiment, the barrier wall 83h is not parallel to or concentric to the sidewall 41h. In this configuration, the distance 88h between the upstream end of the slot 44h and the barrier wall 83h is less than the distance 88h between the downstream end of the slot 44h and the barrier wall 83h. Further, the barrier wall 83h continues to diverge from the sidewall 41h so that the distance 88 between the barrier wall 83h and the sidewall 41 at a location downstream from the slot 44h is greater than the distance 88g at the downstream end of the slot 44h.

Figure 46:
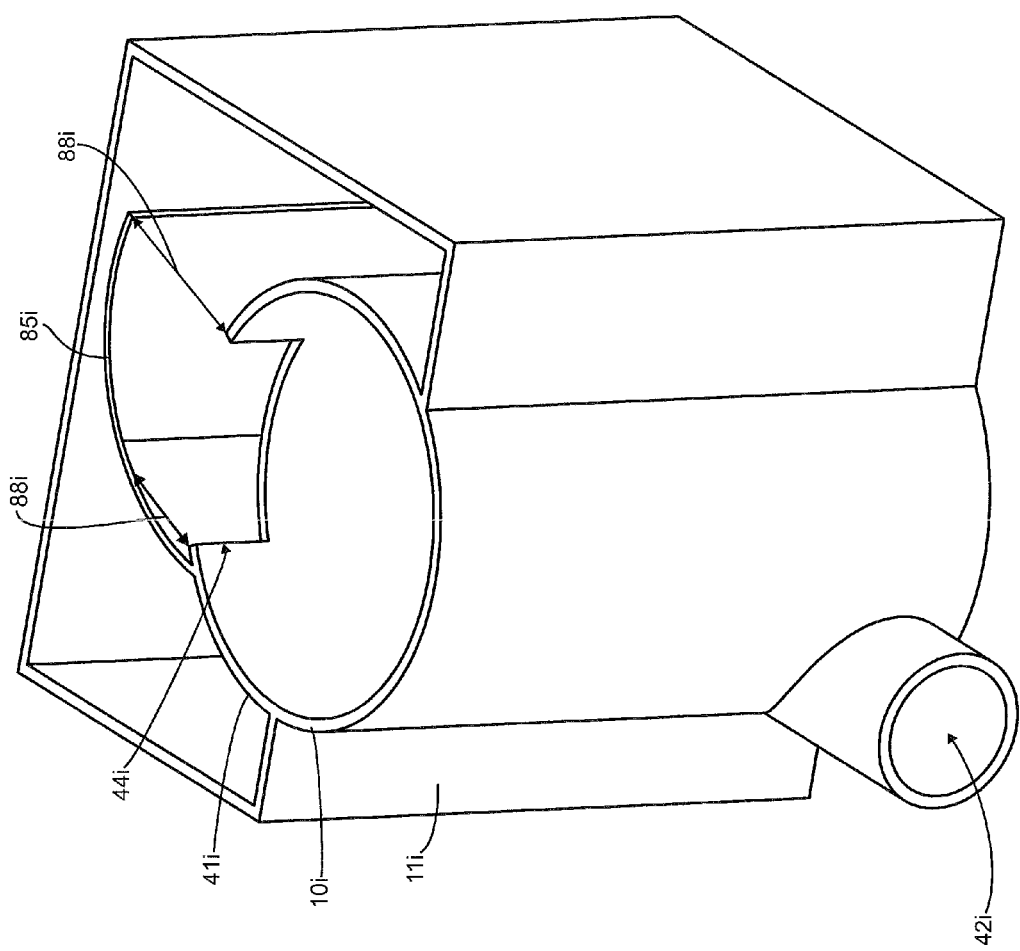
FIG. 46 is a perspective schematic representation of another embodiment of a cyclone bin assembly.

Referring to FIG. 46, in another embodiment a barrier wall 83i flares more substantially away from the outer surface of the cyclone chamber sidewall 41i so that the distance 88i at the downstream end of the dirt slot 44i is much greater than the distance 88i at the upstream end of the slot 44i.

Figure 47:
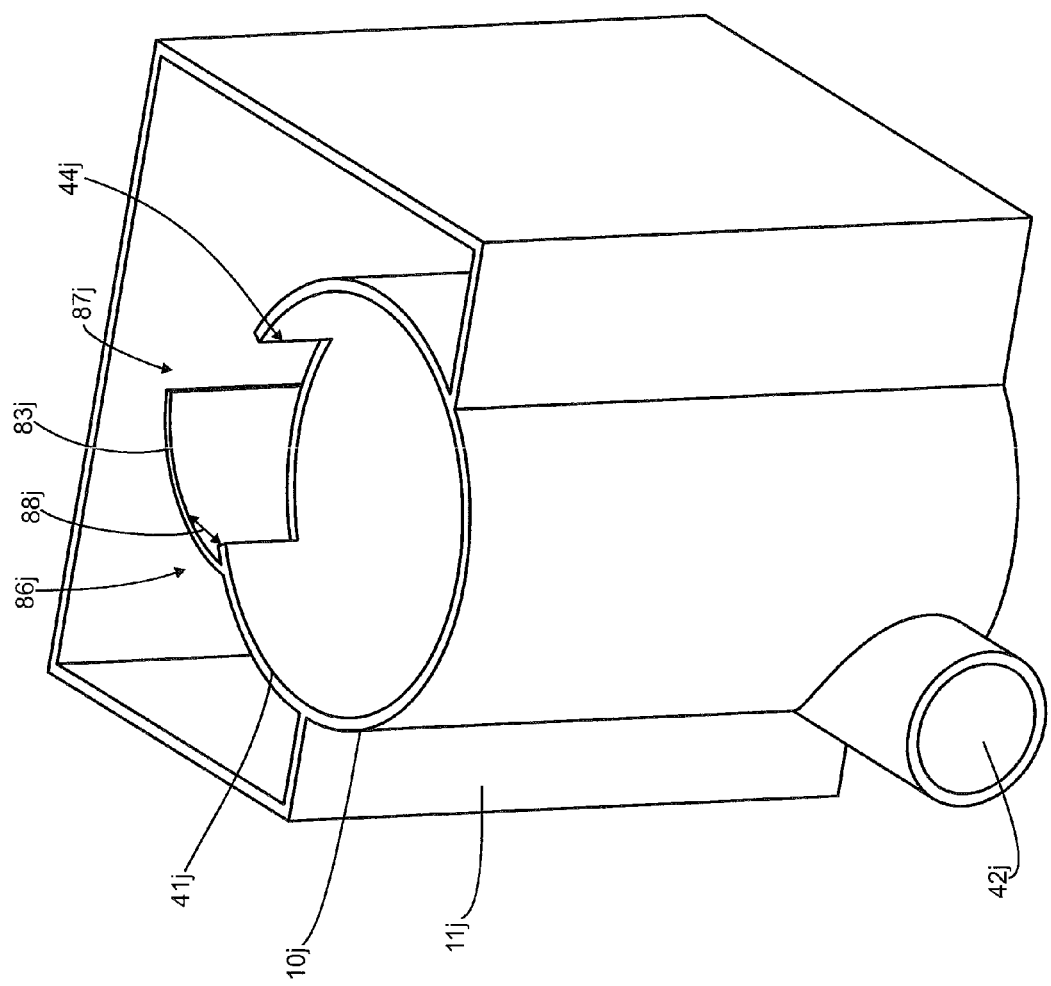
FIG. 47 is a perspective schematic representation of another embodiment of a cyclone bin assembly.

Referring to FIG. 47, in another embodiment a barrier wall 83j has a width that is less than the width of the dirt slot 44j. In this configuration, the barrier wall 83j covers the upstream end of the slot 44j and a portion of its width, but the downstream end 87j of the barrier wall 83j does not reach or cover the downstream end of the slot 44j.

Figure 48:
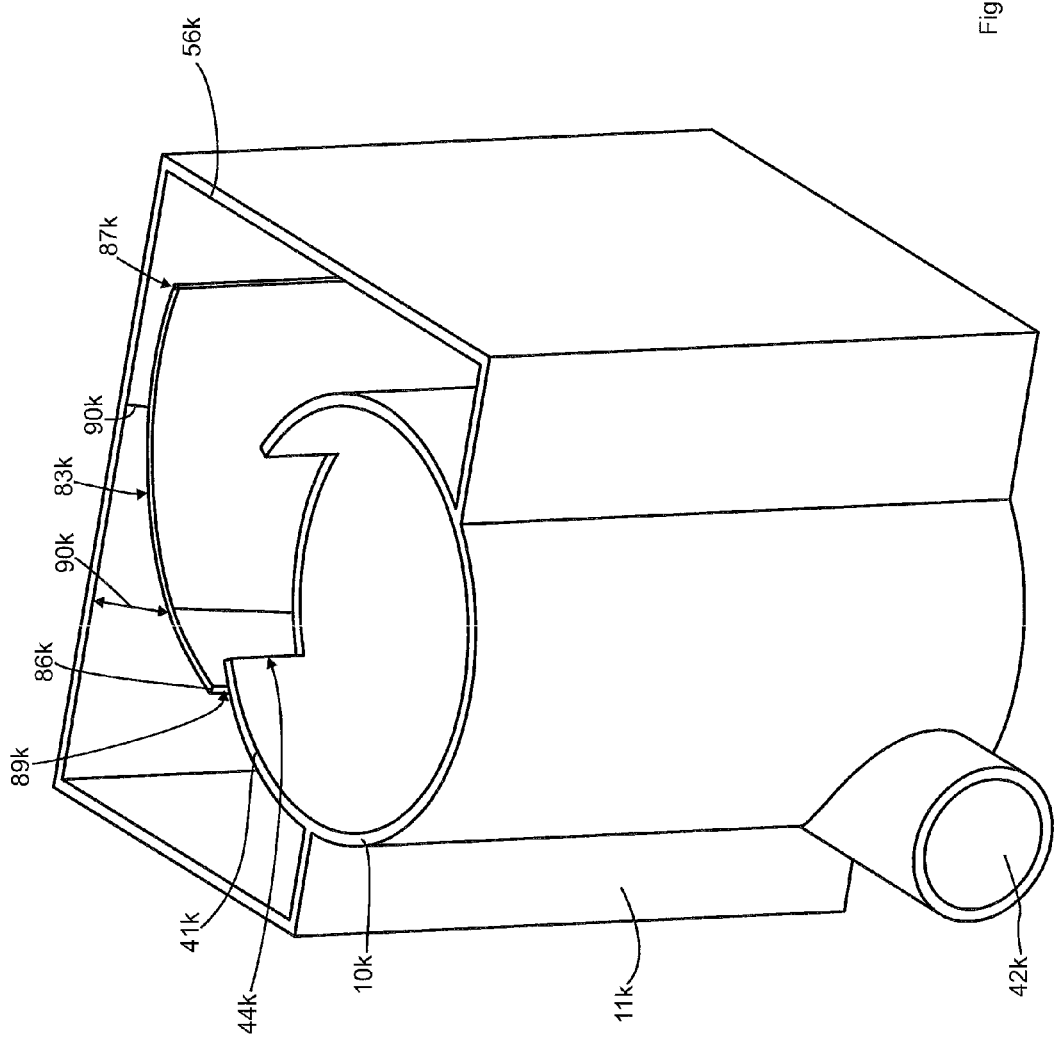
FIG. 48 is a perspective schematic representation of another embodiment of a cyclone bin assembly.

Referring to FIG. 48, in another embodiment a barrier wall 83k extends the full width and full height of the dirt slot 44k, but is configured such that the upstream end 86k of the barrier wall 84k is spaced apart from the sidewall 41k to provide a passage 89k between the wall 83k and the sidewall 41k. In this configuration the barrier wall 83k is not supported by the sidewall 41k and instead may extend upward from the bottom wall of the dirt collection chamber 11g. Alternatively, or in addition, one or more optional support ribs 90k (illustrated as optional using dashed lines) may extend between the dirt collection chamber sidewall 56k (and/or from sidewall 41k) and the barrier wall 83k to help provide support.

Figure 49:
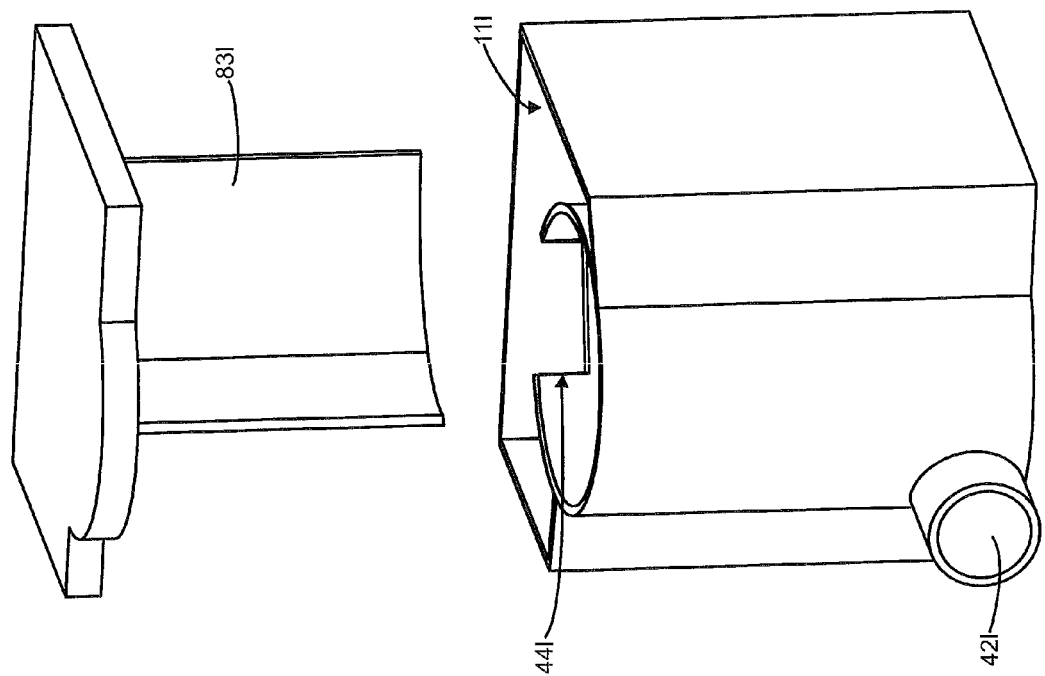
FIG. 49 is an exploded perspective schematic representation of another embodiment of a cyclone bin assembly.
Figure 50:
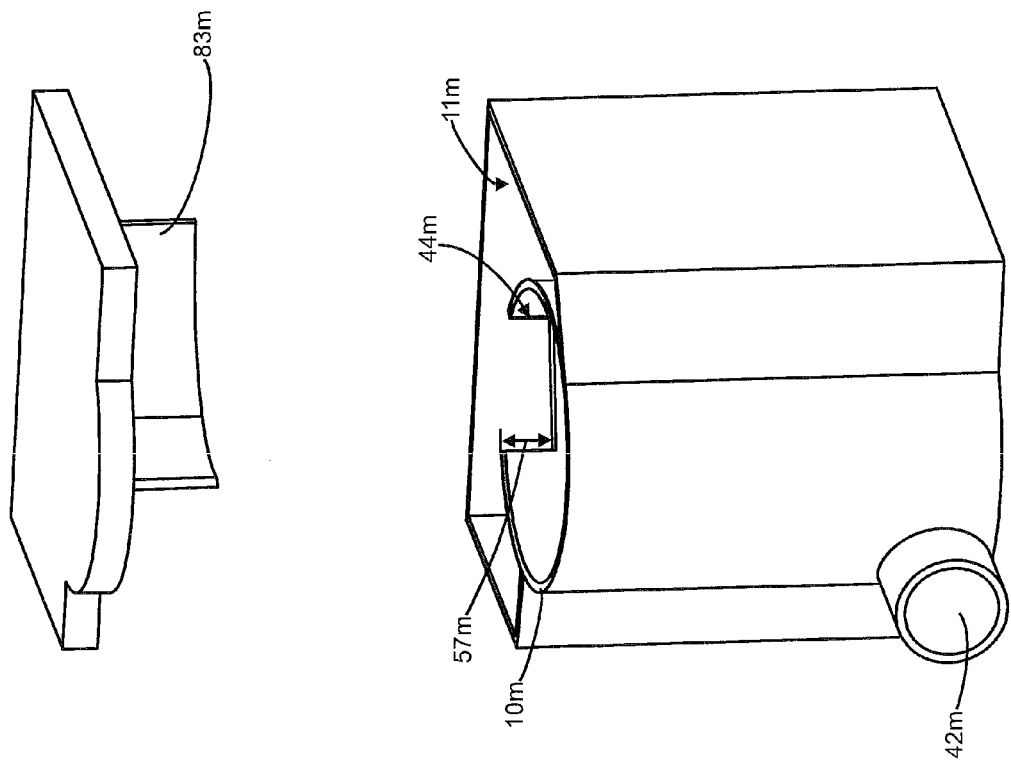
FIG. 50 is an exploded perspective schematic representation of another embodiment of a cyclone bin assembly.

Alternatively, instead of extending upwardly from the bottom wall of the dirt collection chamber, the barrier wall may depend downwardly from the upper wall of the dirt collection chamber. Referring to FIG. 49, in another embodiment a barrier wall 83L extends downwardly from the upper wall of the dirt collection chamber 11L and is sized to cover dirt slot 44L. Optionally, referring to FIG. 50, a barrier wall 83m that depends from the upper wall of the dirt collection chamber 11m can be configured to have a height that is less than the height of the cyclone chamber 10m, and optionally less than the height 57m of the slot 44m.

Figure 51:
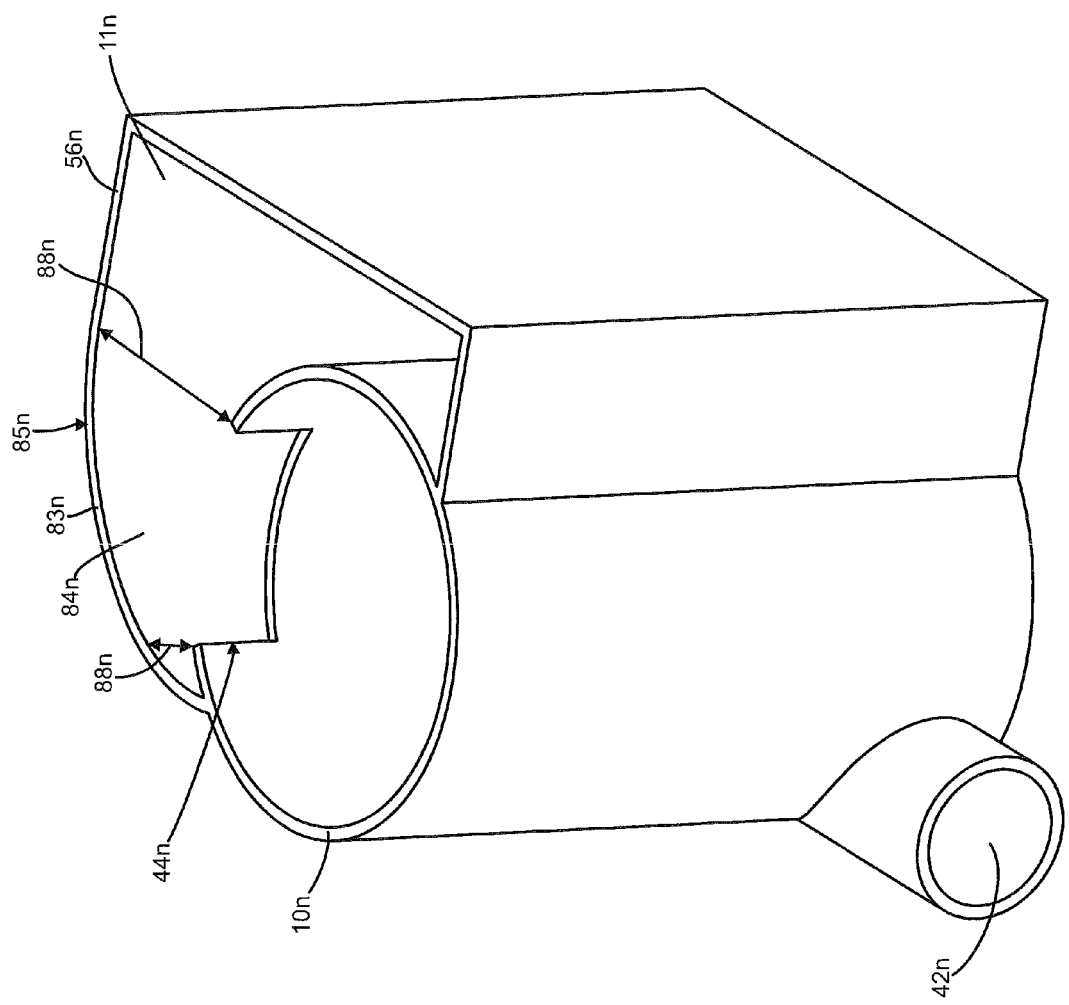
FIG. 51 is a perspective schematic representation of another embodiment of a cyclone bin assembly.

Optionally, some or all of the barrier wall may be integral with other portions of the cyclone chamber or dirt collection chamber. Referring to FIG. 51, in another embodiment a barrier wall 83n is integral with the dirt collection chamber sidewall 56n or optionally a passage extending to a dirt collection chamber. In this embodiment, the inner surface 84n of the barrier wall 83n faces the cyclone chamber sidewall 41n and the outer surface 85n may be part of the exterior surface of the cyclone chamber assembly (or optionally surrounded by another housing, etc.). If the barrier wall is integral with other portions of the cyclone chamber or the dirt collection chamber or a passage thereto, it preferably extends from a position somewhat upstream from the upstream end of the dirt outlet.

Figure 52:
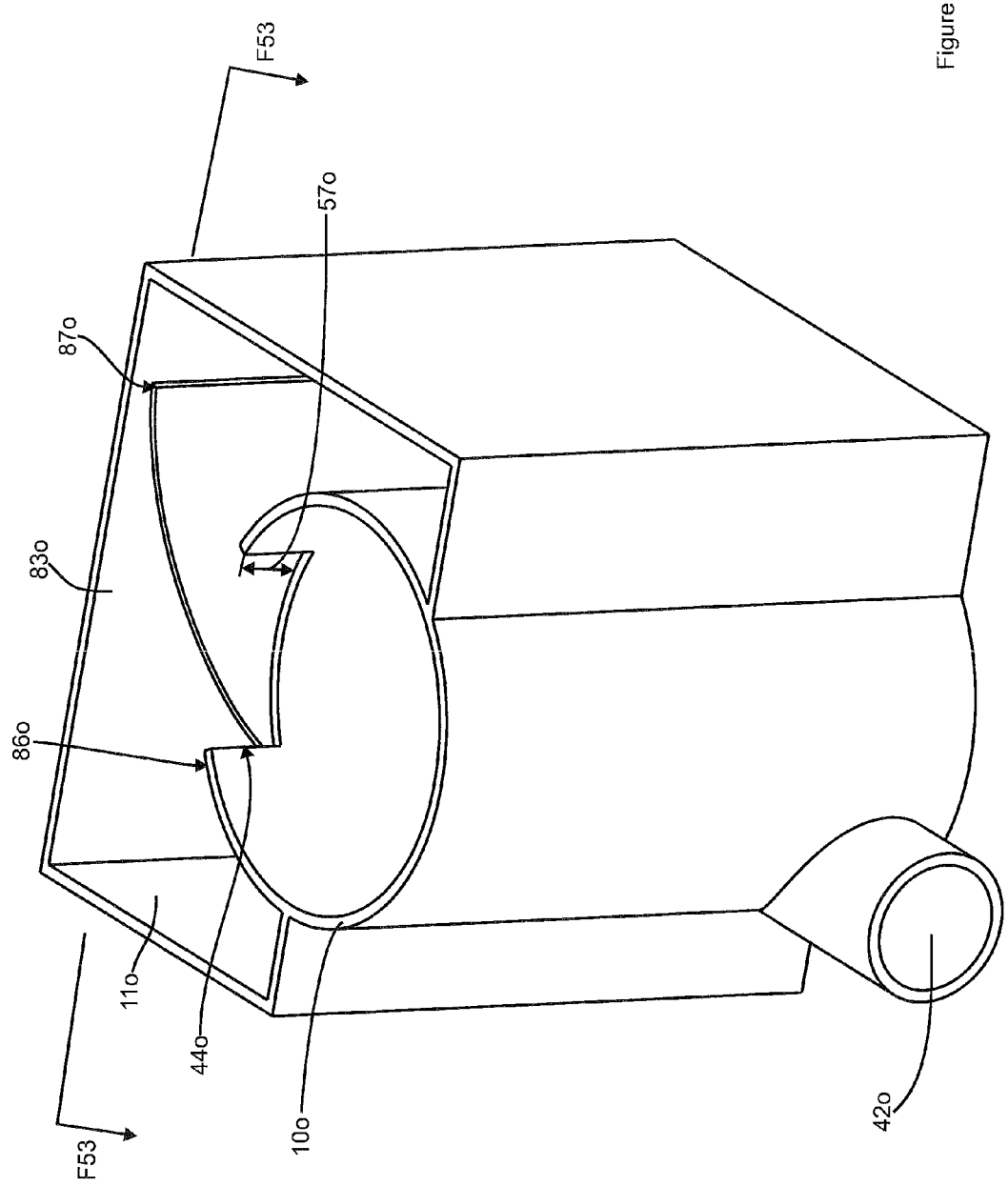
FIG. 52 is a perspective schematic representation of another embodiment of a cyclone bin assembly.
Figure 53:
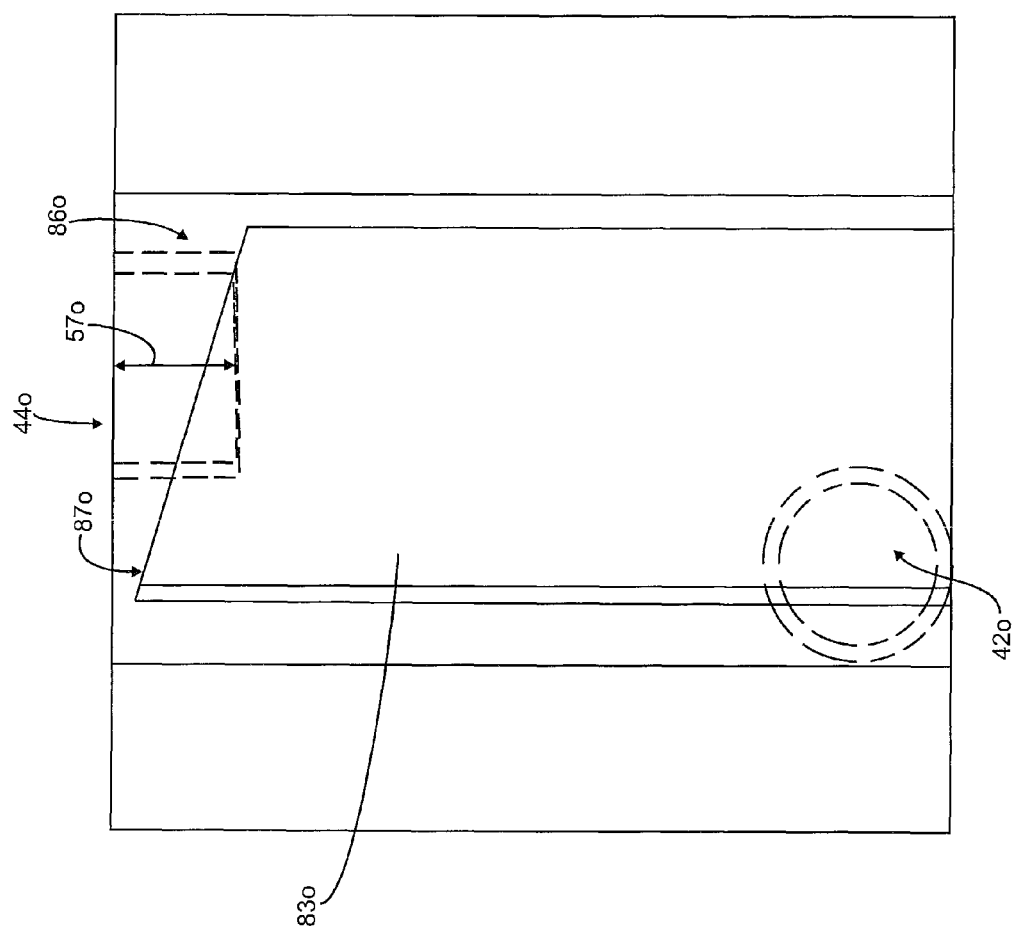
FIG. 53 is a schematic representation of another embodiment of a cyclone bin assembly.
Figure 54:
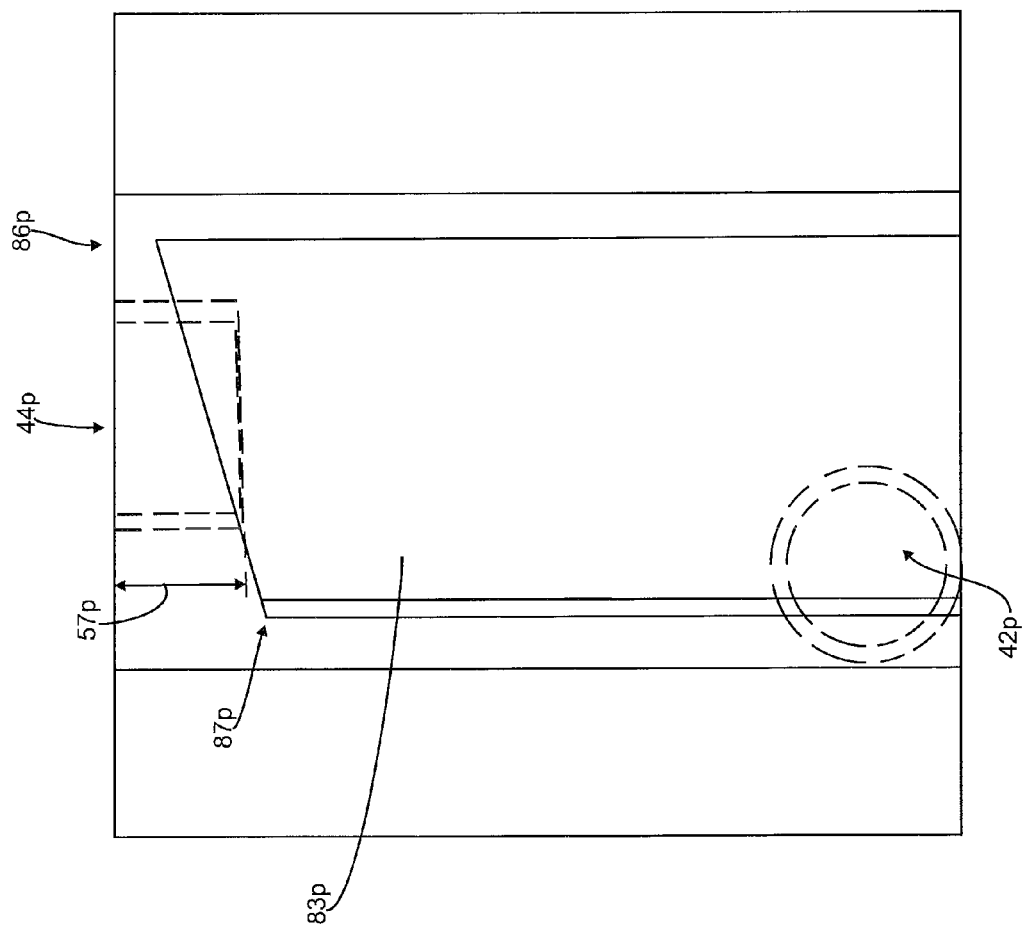
FIG. 54 is a schematic representation of another embodiment of a cyclone bin assembly.

Referring to FIG. 52, in another embodiment the barrier wall 88o has a variable height, and in the configuration illustrated, increases in height from the upstream end 86o toward the downstream end 87o. In the illustrated configuration, the upstream end 86o of the barrier wall 83o does not cover the full height 57o of the slot 44o, whereas the downstream end 87o covers more of the full height of the slot 44o. FIG. 53 is a section view showing the elevation of the barrier wall 83*o* relative to cyclone chamber 100 and slot 44*o*. FIG. 54 is an alternate embodiment in which the barrier wall 83*p* varies in height in the opposite direction (the upstream end 86*p* is shorted than the downstream end 87*p*).

Dirt Slot of Varying Heights

Figure 55:
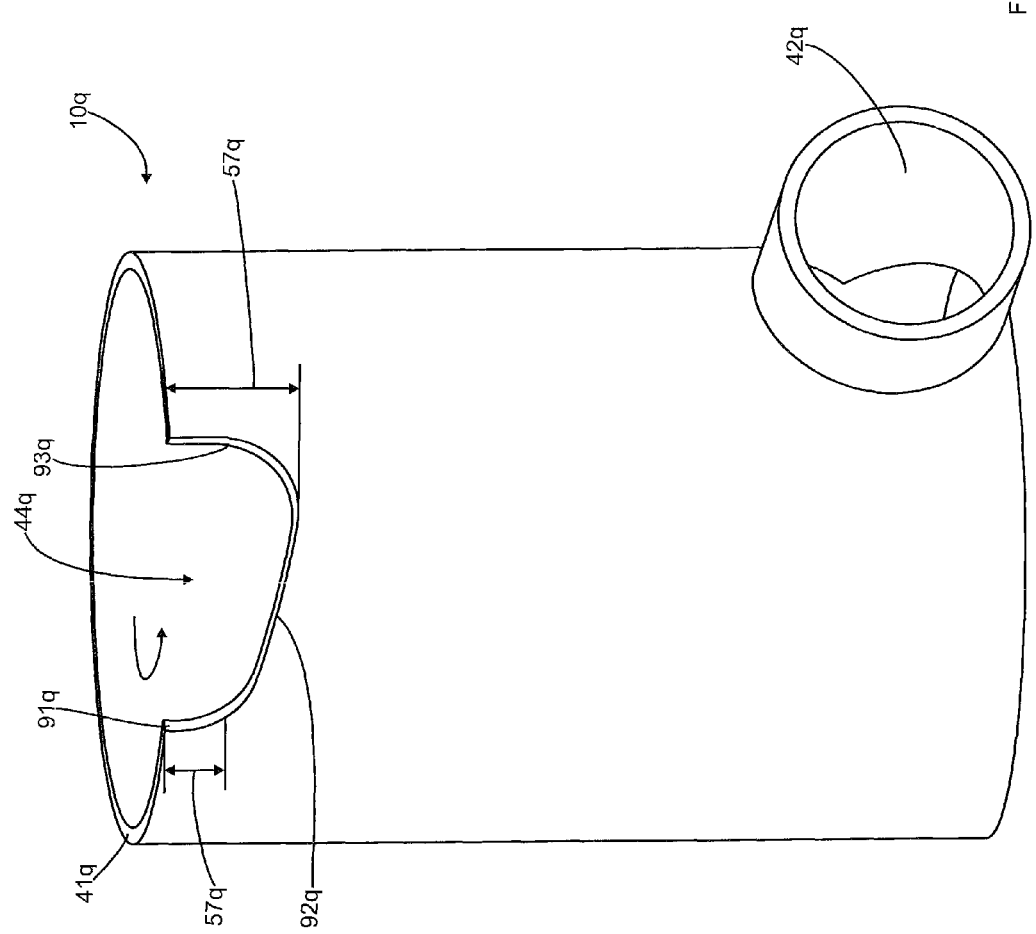
FIG. 55 is a perspective schematic representation of another embodiment of a cyclone bin assembly.
Figure 56:
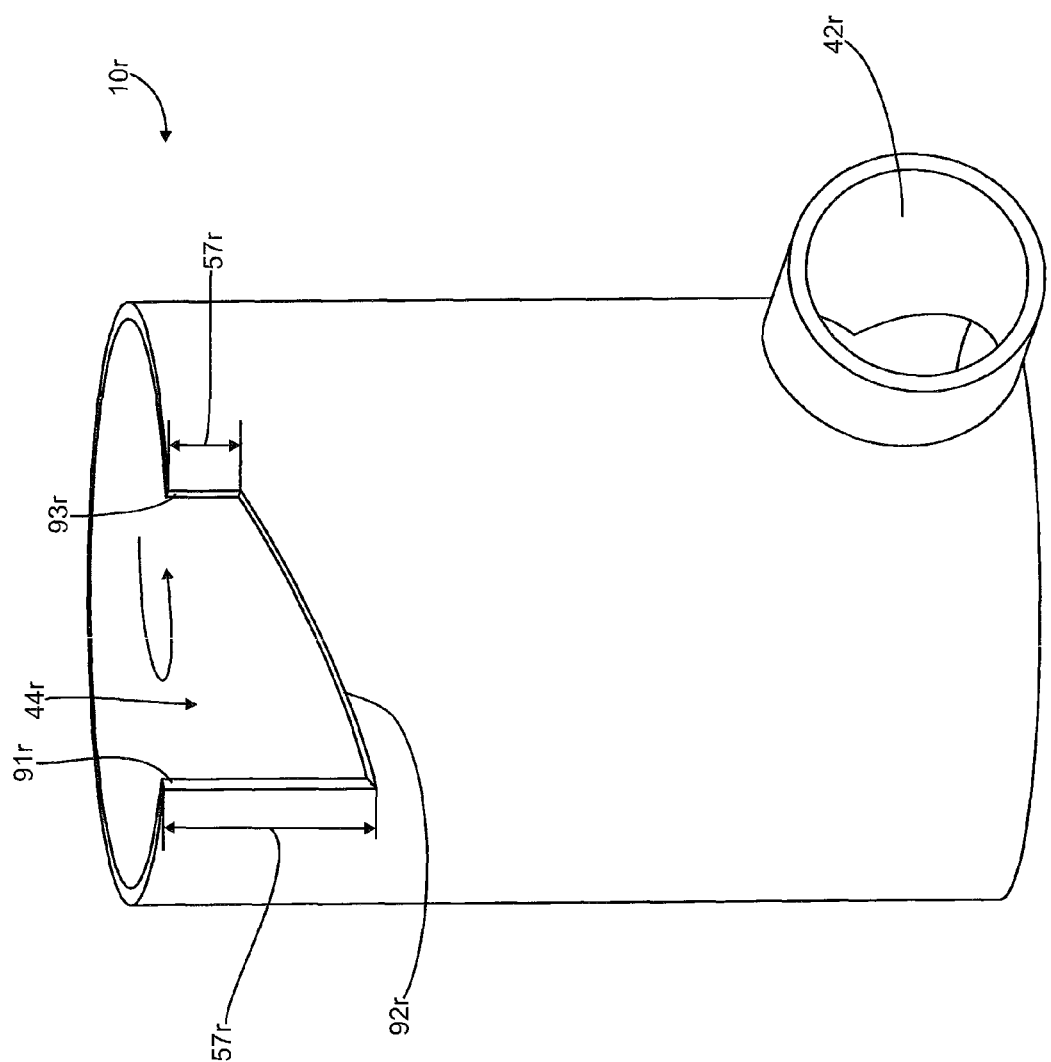
FIG. 56 is a perspective schematic representation of another embodiment of a cyclone bin assembly.
Figure 57:
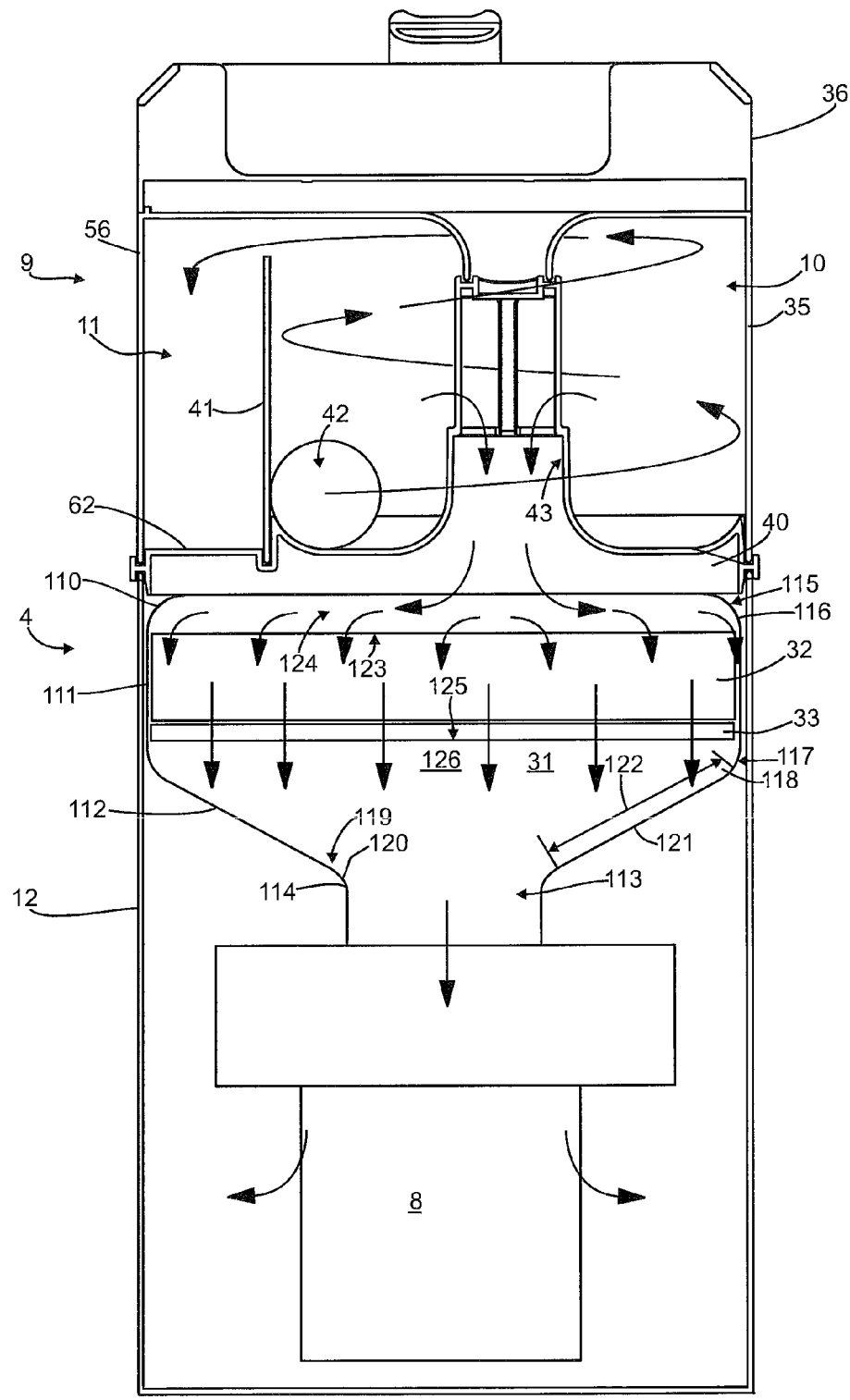
FIG. 57 is a schematic representation of a surface cleaning unit.

Referring to FIGS. 55-57, schematic representations of alternate embodiments of a cyclone chamber 10 are shown. The schematic embodiments are generally similar to the cyclone chamber 10, and analogous features are identified using like reference numerals with a unique suffix.

Referring to FIG. 55, the cyclone chamber 10*q* includes a dirt slot 44*q* that varies in height 57*q* along its width. In this embodiment, the height 57*q* at the upstream end of the slot 44*q* is less than the height 57*q* at the downstream end of the slot 44. Also, in this embodiment the intersection of the upstream edge 91*q* and the bottom edge 92*q* is rounded, as is the intersection between the downstream edge 93*q* and the bottom edge 92*q*. Alternatively, only one of these intersections may be rounded.

Referring to FIG. 56, in another embodiment the slot 44*r* is configured so that there are sharp corners between edges 91*r* and 93*r* and bottom edge 92*r*, and that the upstream end of the slot 44*r* is taller than the downstream end.

The slot 44*r* (and any other dirt outlet slot) can be configured so that the height at the shortest portion of the slot is between about 35% to about 100% (i.e. no change) of the height at the tallest portion of the slot.

The features of the dirt slot illustrated in the above embodiments may be used by itself or in any combination or sub-combination with any other feature or features disclosed herein.

Pre-Motor Filter Housing Construction

The following is a description of a pre-motor filter housing that may be used by itself in any surface cleaning apparatus or in any combination or sub-combination with any other feature or features disclosed herein.

Referring to FIG. 57, a schematic representation of a surface cleaning unit 4 is shown. In the illustrated example, two pre-motor filters 32 and 33 are positioned within the pre-motor filter chamber 31, although a differing number may be used. The pre-motor filter chamber 31 is defined by a housing that comprises an upper end wall 110 that may optionally include the downstream end of the vortex finder, a sidewall 111 and a lower end wall 112 that may optionally include the upstream end of the suction motor inlet.

The open headspace or header between the bottom of the cyclone bin assembly and the upper side 123 of the filter 32 defines an upstream air plenum 124. Providing the upstream plenum 124 allows air to flow across the upper side 123 of the filter 32. The open headspace or header downstream of the filters 32, 33, between the downstream side 125 of filter 33, provides a downstream air plenum. Providing a downstream plenum 126 allows air exiting the filters 32, 33 to flow inwardly and toward the suction motor inlet. In use, air exiting the cyclone chamber 10, via the air outlet 43, flows into upstream plenum 124, through filters 32, 33, into downstream plenum 126 and into the air inlet portion 113 of the suction motor 8.

As exemplified in FIG. 17, the outer sidewall of the motor housing 12 may surround some or all of the pre-motor filter chamber 31. Further, most or all of the upper end wall 110 may be provided by the lower surface of the cyclone bin assembly 9, including portions of the cyclone chamber end wall 40 and the dirt collection chamber end wall 62. In this configuration, when the cyclone bin assembly 9 is removed, most of the upper end wall 110 is also removed, which may "open" the pre-motor filter chamber 31 and allow a user to access the filters 32, 33. Similarly, most of the lower end wall 112 is provided by the suction motor inlet sidewall 114.

Optionally, the pre-motor filter housing has an upstream and/or a downstream header that is configured to reduce turbulence. Accordingly, some or all of the intersections between, the walls 110 and 111, the walls 111 and 112, and the wall 112 and the suction motor inlet may include angled or curved surfaces, which may be shaped in a similar manner to the configuration of the junctures of the cyclone chamber 10 discussed previously. Providing curved or smoother junctures within the pre-motor filter housing 31 may help reduce back-pressure caused by the pre-motor filter chamber. This may help improve the efficiency of the surface cleaning apparatus 1 by increase the velocity of the air flow at the dirty air inlet, all other factors remaining the same. Improving the efficiency may allow the surface cleaning apparatus to provide improved suction capabilities, and/or may allow the surface cleaning apparatus to maintain its existing suction capabilities while requiring a smaller, less powerful motor 8.

In the illustrated embodiment, the juncture 115 between the sidewall 111 and the upper wall 110 includes a curved juncture surface 116. The curvature of the surface 116 can be selected to help improve air flow into the upstream plenum 124. Optionally, the juncture surface 116 can remain with the pre-motor filter chamber 31 when the cyclone bin assembly 9 is removed, or alternatively the juncture surface 116 may be part of the cyclone bin assembly 9 and may be removable from the pre-motor filter chamber 31.

The juncture 117 between the sidewall 111 and the wall 112 forming part of the suction motor inlet 113 also includes a curved juncture surface 118. The curvature of surface 118 may be the same as, or different than the curvature of surface 116. Optionally, the juncture between the wall 112 and the inlet sidewall 114 of the suction motor inlet may also be curved or angled. In the illustrated embodiment, the juncture 119 between walls 112 and 114 includes a curved surface 120, which may help improve air flow into the suction motor 8. Alternatively, instead of being curved, junctures surfaces 116, 118 and 120, as well as the juncture of the vortex finder and wall 110, may be generally planar angled or inclined surfaces. The curvature of surfaces 116, 118 and 120 may be any of suitable magnitude that helps improve air flow efficiency through the pre-motor filter chamber 31 and suction motor air inlet 113.

A generally flat bridging surface 121 forms part of wall 112 and extends between juncture surfaces 118 and 120 and has a length 122. Together, the juncture surfaces 118 and 120 and surfaces 121 and 114 may co-operate to form a generally flared or trumpet-like motor inlet 113. As illustrated, the vortex finder may also be flared or trumpet-shaped.

Figure 58:
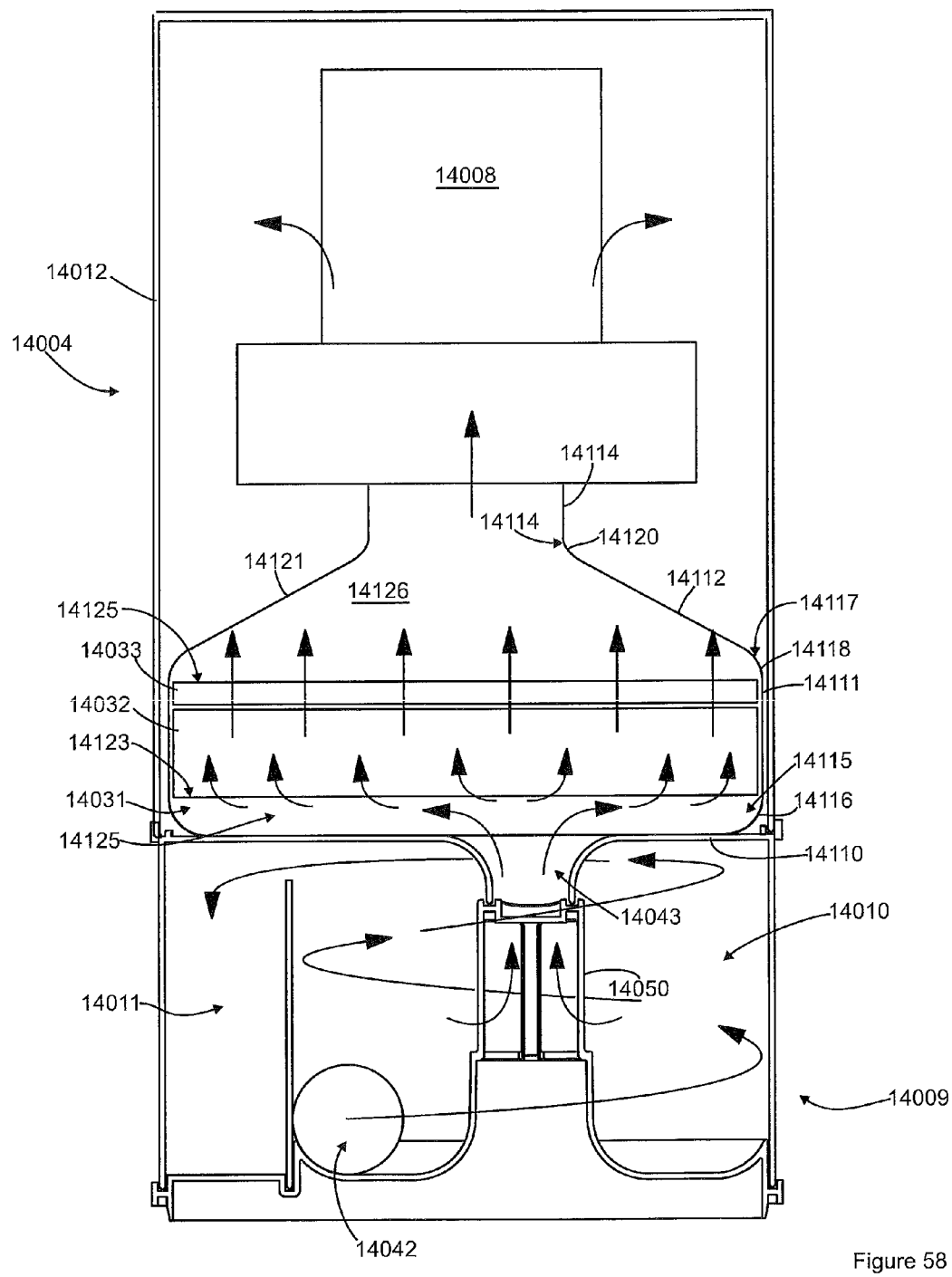
FIG. 58 is a schematic representation of another embodiment of a surface cleaning unit.

Referring to FIG. 58, another embodiment of a surface cleaning unit 14004 is shown. Surface cleaning 14004 is generally similar to surface cleaning unit 4, and analogous features are identified using like reference characters indexed by 14000.

In the illustrated embodiment, the surface cleaning unit 14004 includes a cyclone bin assembly 14009 that is positioned below the suction motor 14008 and suction motor housing 14012. The pre motored filter chamber 14031, containing filter 14032 and 14033, is located between cyclone bin assembly 14009 and the suction motor 14008 and the illustrated configuration is positioned above cyclone bin assembly 14009.

In this embodiment, air enters the cyclone chamber 14010 via air inlet 14042 and exits via air outlet 14043. Air then flows into the upstream header or plenum 14125 before contacting the upstream face 14123 of filter 14032 and flowing through the filters 14032 and 14033 into the downstream headspace or plenum 14126. From the downstream plenum 14126, air is guided by walls 14112, 14114, to the air inlet of the suction motor 14008. Like the previous embodiment, juncture 14115 between the end wall 14110 and the side wall 14111 includes a curved or a radiused surface 14116 to help improve air flow. Similarly junctures 14117 and 14119 provided in the downstream plenum 14126 include curved or radius surface 14118 and 14120, respect to the leak. A flat bridging surface 14121 connects curved surfaces 14118 and 14120 and helps provide the flared or trumpet like inlet for the suction motor 14008.

Figure 59:
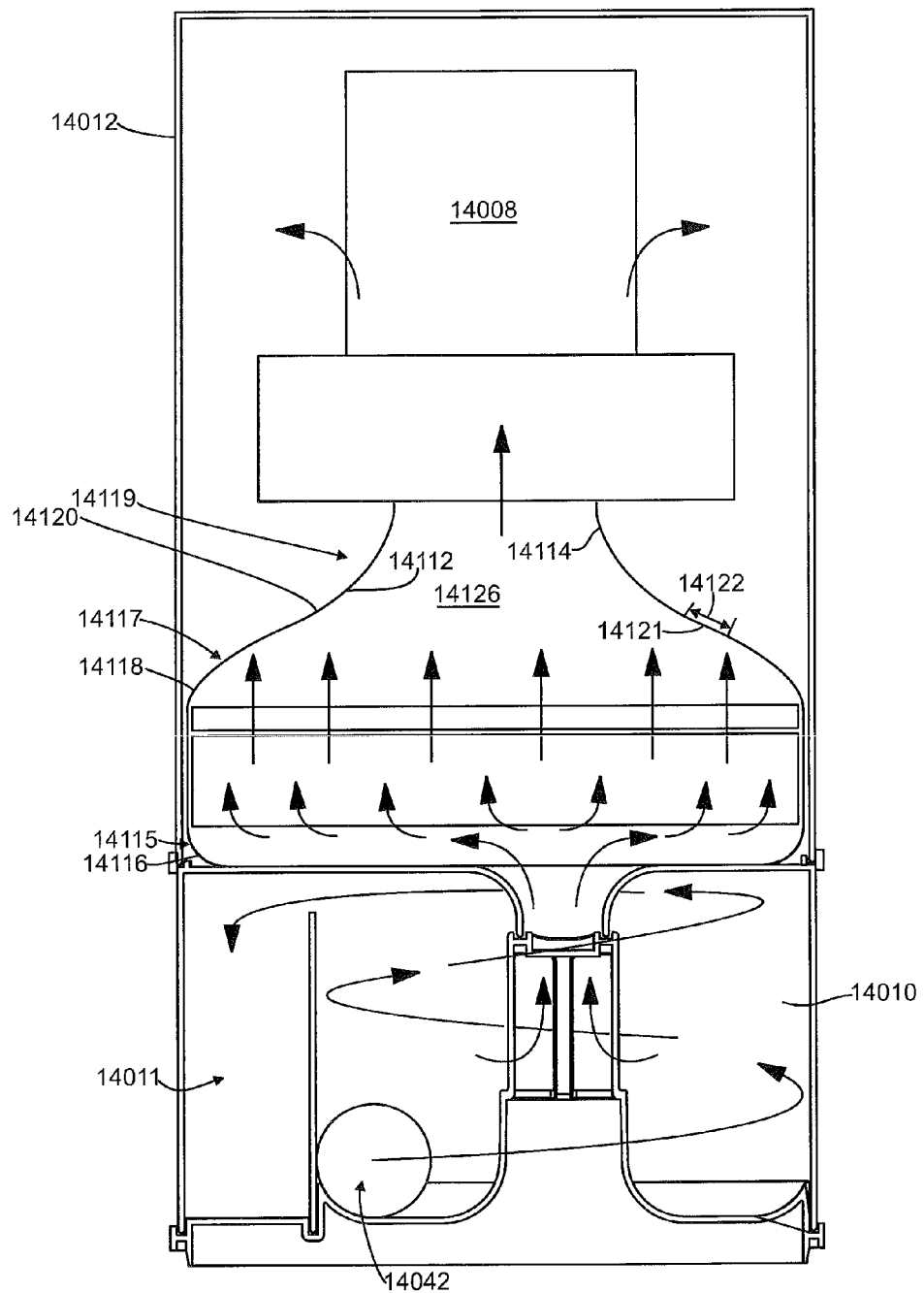
FIG. 59 is a modified version of the schematic representation of FIG. 59.

Referring to FIG. 59, the embodiment of FIG. 58 is shown having curved juncture surfaces 14118 and 14120 that have a larger radius or degree of curvature than those shown in FIG. 58. A bridge surface 14121 is still provided between surfaces 14120 and 14118 but its length 14122 in the embodiment of FIG. 59 is substantially less than its length in the previous embodiment. The curvature of juncture surface 14116 remains unchanged from the embodiment of FIG. 58. Providing a higher degree or curvature and/or larger curved juncture surfaces 14118, 14120 may help improve air flow from the downstream plenum 14126 to the suction motor 14008.

Figure 60:
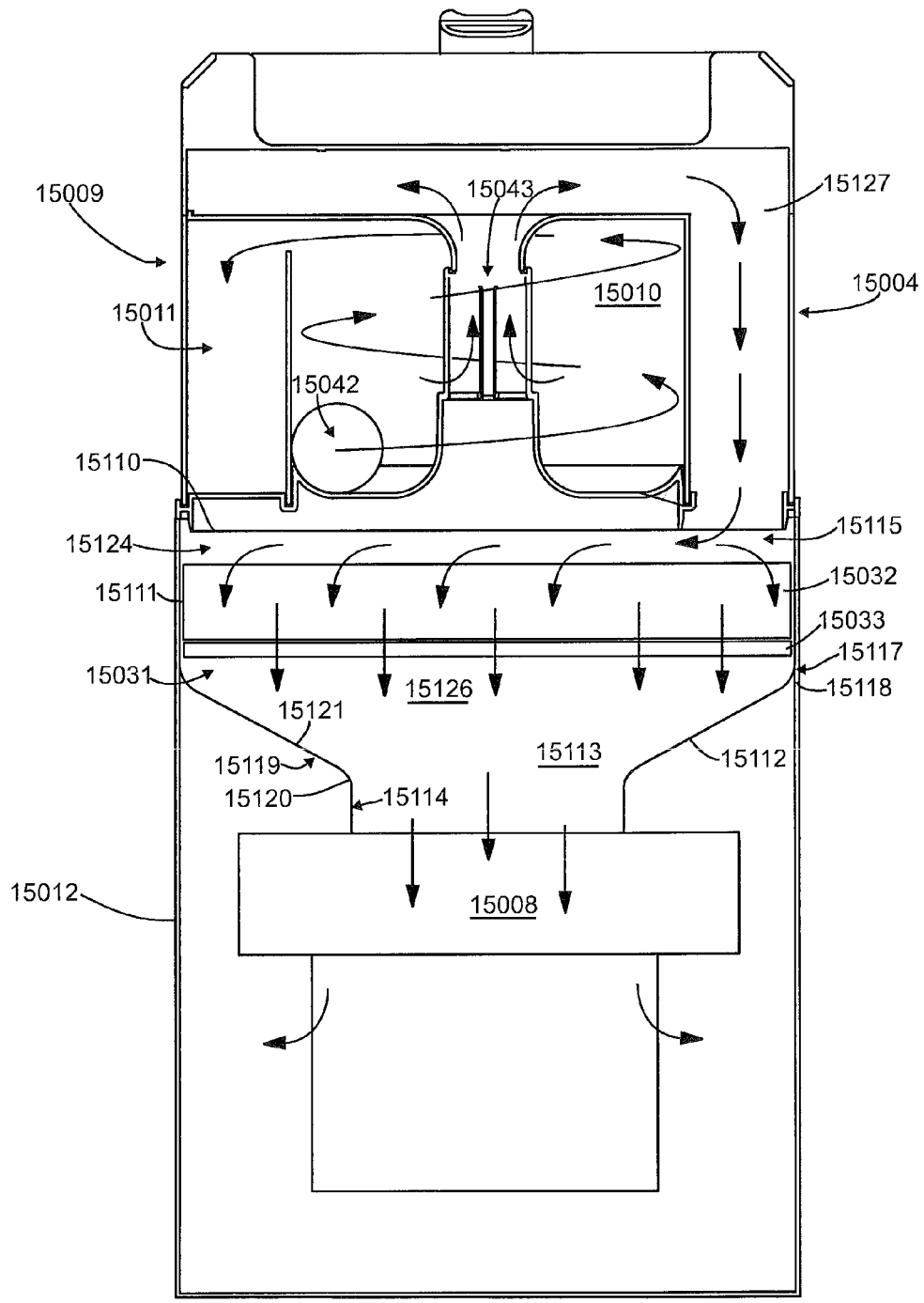
FIG. 60 is a schematic representation of another embodiment of a surface cleaning unit.

Referring to FIG. 60 another embodiment of the surface cleaning unit 15004 is shown. Surface cleaning unit 15004 is generally similar to surface cleaning unit 4 and analogous features are identified using like referencing characters indexed by 15000. In the illustrated embodiment the cyclone bin assembly 15009 is positioned above the suction motor 15008 and surrounding housing 15012, and the pre-motor chamber 15031 is defined there between.

In the illustrated embodiment air enters cyclone chamber 15010 via inlet 15042 and exists via air outlet 15043. In this configuration air outlet 15043 is not directly connected to upstream plenum 15124 and instead is connected via an external air flow conduit 15127 which is provided outside cyclone chamber 15010 and provides air flow communication between air outlet 15043 and plenum 15124.

As in the previous embodiment, air exiting the cyclone chamber 15010 goes into upstream plenum 15124, through filters 15032, 15033 and into downstream plenum 15126. In this embodiment, the juncture 15115 between upper wall 15110 and side wall 15111 is not curved, and instead and is formed as a sharp corner. Juncture 15117 and 15119 provided downstream of the filters 15032, 15033 are curved in this embodiment and include curved juncture services 15118 and 15120 respectively.

Suction Motor Air Inlet

The following is a description of a suction motor air inlet that may be used by itself in any surface cleaning apparatus or in any combination or sub-combination with any other feature or features disclosed herein.

Figure 61:
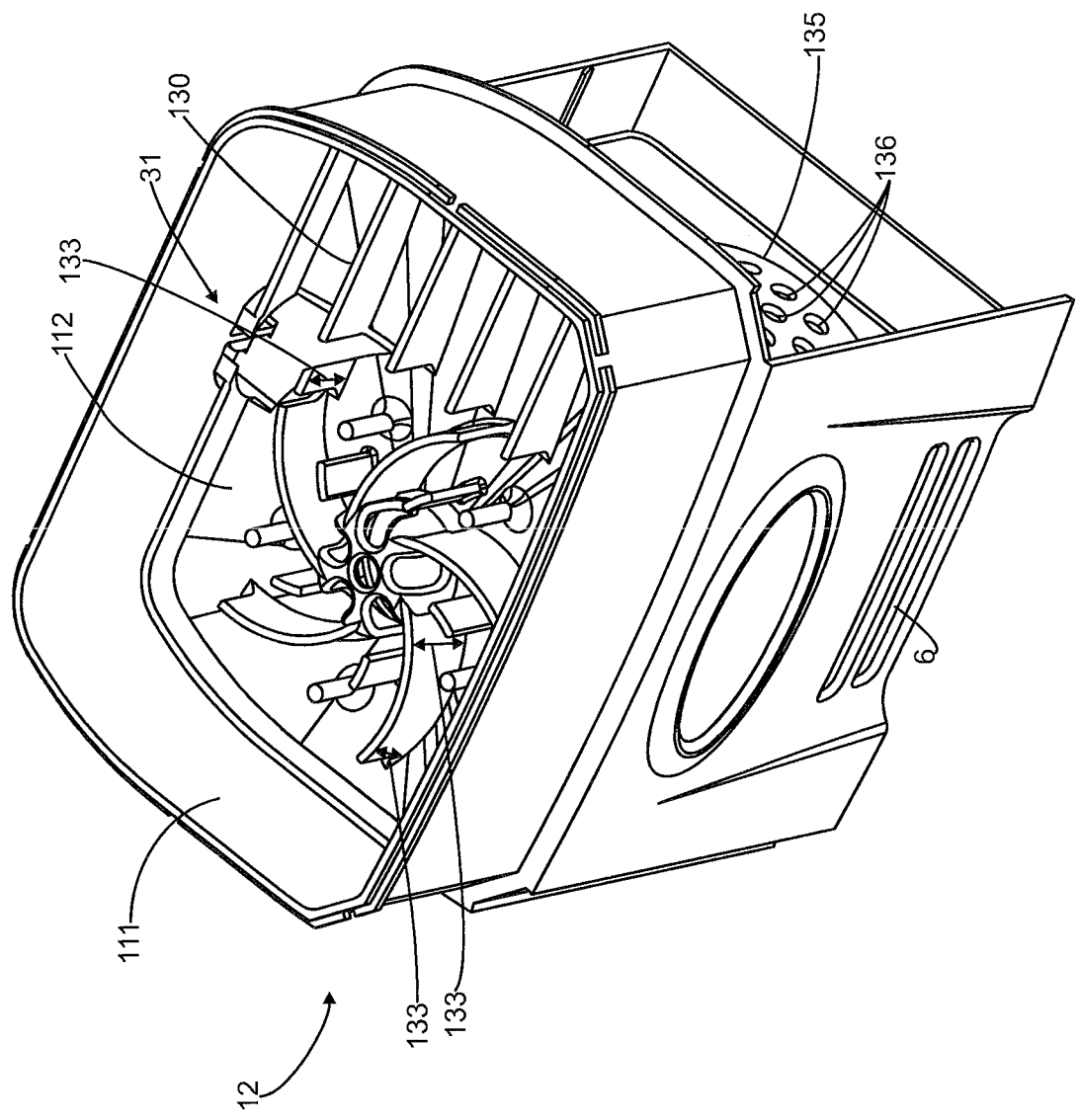
FIG. 61 is a perspective view of a the top of the suction motor housing of the surface cleaning apparatus of FIG. 1.
Figure 62:
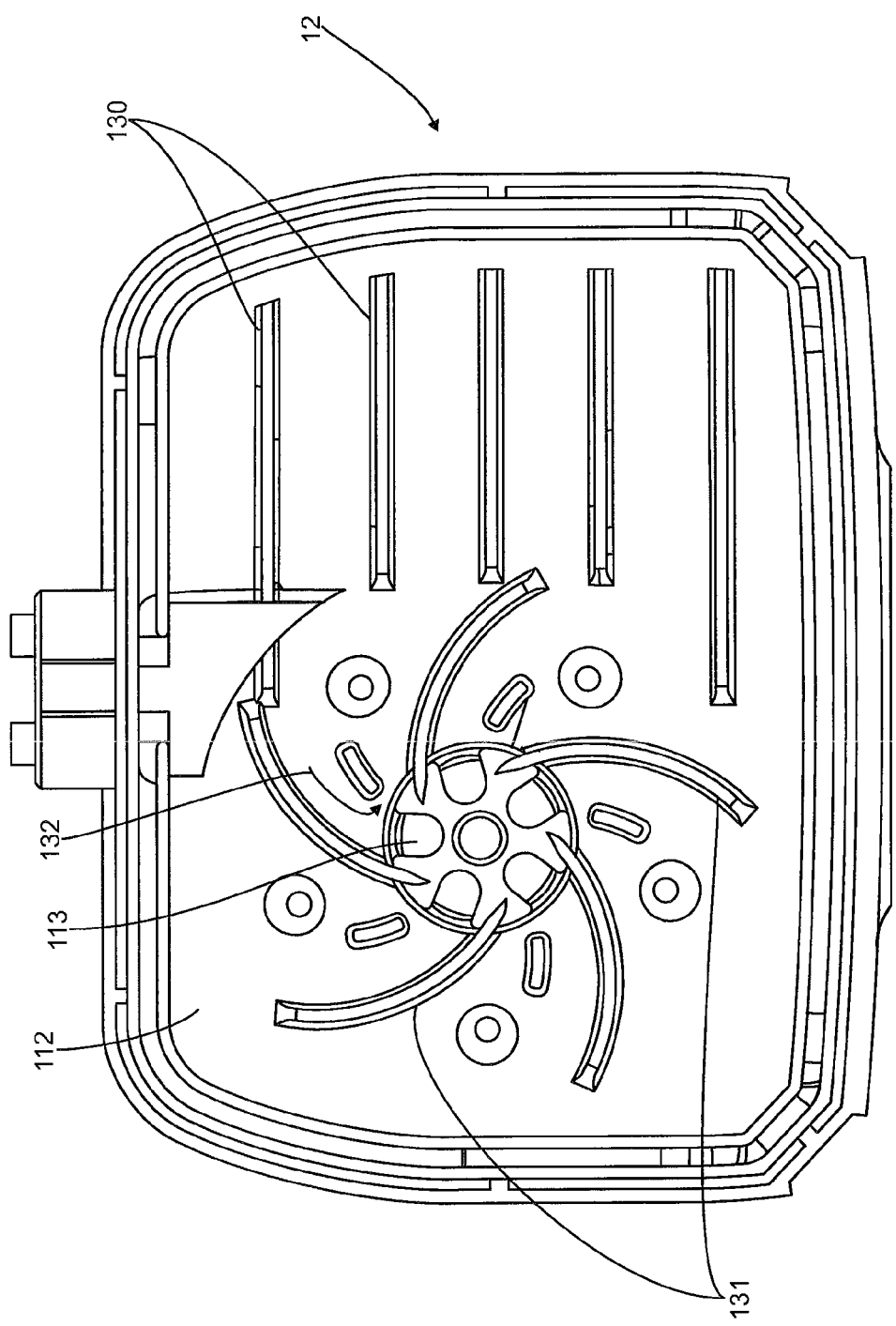
FIG. 62 is a top view of the top of the suction motor housing of the surface cleaning apparatus of FIG. 61.

Referring to FIG. 61, the suction motor housing 12 is shown separated from the upper portion 2, and with the cyclone bin assembly 9, filters 32, 32 and door 13 removed. In this embodiment, the suction motor housing 12 includes the sidewall 111 and the bottom wall 112 that bound part of the pre-motor filter chamber 31. The bottom wall 112 includes a plurality of optional supporting ribs 130 that project upwards from the wall 112 into the chamber 31. The ribs 130 are configured to contact the downstream side 125 of the filters (in this example felt filter 33) in the chamber 31 and to hold it above the wall 112, thereby help to maintaining the downstream plenum 126 (FIG. 57). The ribs 130 are spaced apart from each other to allow air to flow between them, within the plenum 126, and toward the suction motor air inlet 113.

Optionally, some or all of the support ribs in the pre-motor filter chamber 31 may be configured to help guide or direct the air flowing through the downstream plenum 126. For example, some of the ribs may be configured to help induce rotation of the air within the plenum 126, before it flows into the suction motor 8. Preferably, this pre-rotation of the air flow can be selected so that the air is rotated in the direction of revolution of the fan of the suction motor 8. Pre-rotating the air in this manner may help improve the efficiency of the surface cleaning unit 4. The ribs may be configured in any suitable manner to help impart rotation to the air flow.

In the illustrated embodiment, the plurality of ribs 130 includes a plurality of curved ribs 131 that are provide around the suction motor air inlet 113. The ribs 131 are curved to impart rotation of the air flow in the direction indicated by arrow 132, which preferably is the same direction as the direction of revolution of the suction motor 8.

The ribs 130 define a rib height 133. If the lower wall 112 of the pre-motor filter is flat, the height 133 of each rib 130, 131 may remain constant along its entire with. Alternatively, if the lower wall 112 varies in height (e.g., the extend inwardly along a portion of a trumpet-shaped suction motor inlet), the ribs 130, 131 may also vary in height. Preferably, the ribs 130, 131 are configured such that the upper ends of the ribs 130, 131 lie in a common plane to support the filter 33, and the lower ends of the ribs are in contact with the wall 112.

In the illustrated example, the wall 112 has a slight curvature and portions of the wall 112 are generally inclined toward the suction motor air inlet 113. In this configuration, the height 133 at the outer end of the ribs 131 (disposed away from the air inlet 113) is less than the height 113 at the inner ends of the ribs 131 (the ends adjacent the suction motor inlet 113). Providing constant contact between the lower edges of the ribs 131 and the wall 112 may help impart rotation to the air flow and may help prevent air from flowing underneath the ribs 131.

Also referring to FIG. 61, the suction motor housing 12 optionally includes a shroud 135 surrounding the suction motor 8. The shroud 135 is configured to protect and optionally support the suction motor 8, and may also function as a finger guard to prevent a user from accidently contacting the suction motor 8 when the door 13 is open or removed. The shroud 135 also includes a plurality of air flow apertures 136 to allow air exiting the suction motor 8 to flow through the to the clean air outlet 6.

Suction Motor Housing Construction

The following is a description of a suction motor construction that may be used by itself in any surface cleaning apparatus or in any combination or sub-combination with any other feature or features disclosed herein.

Optionally, portions of the shroud 135 and/or motor housing 12 may be configured to help reduce the amount of suction motor noise that escapes the housing 12. This may help reduce the overall amount of noise produced by the surface cleaning apparatus 1. Alternatively, or in addition, to reducing the noise output, the shroud 135 and housing 12 may be configured to help tune the noise generated and to filter out particular noise frequencies.

Figure 63:
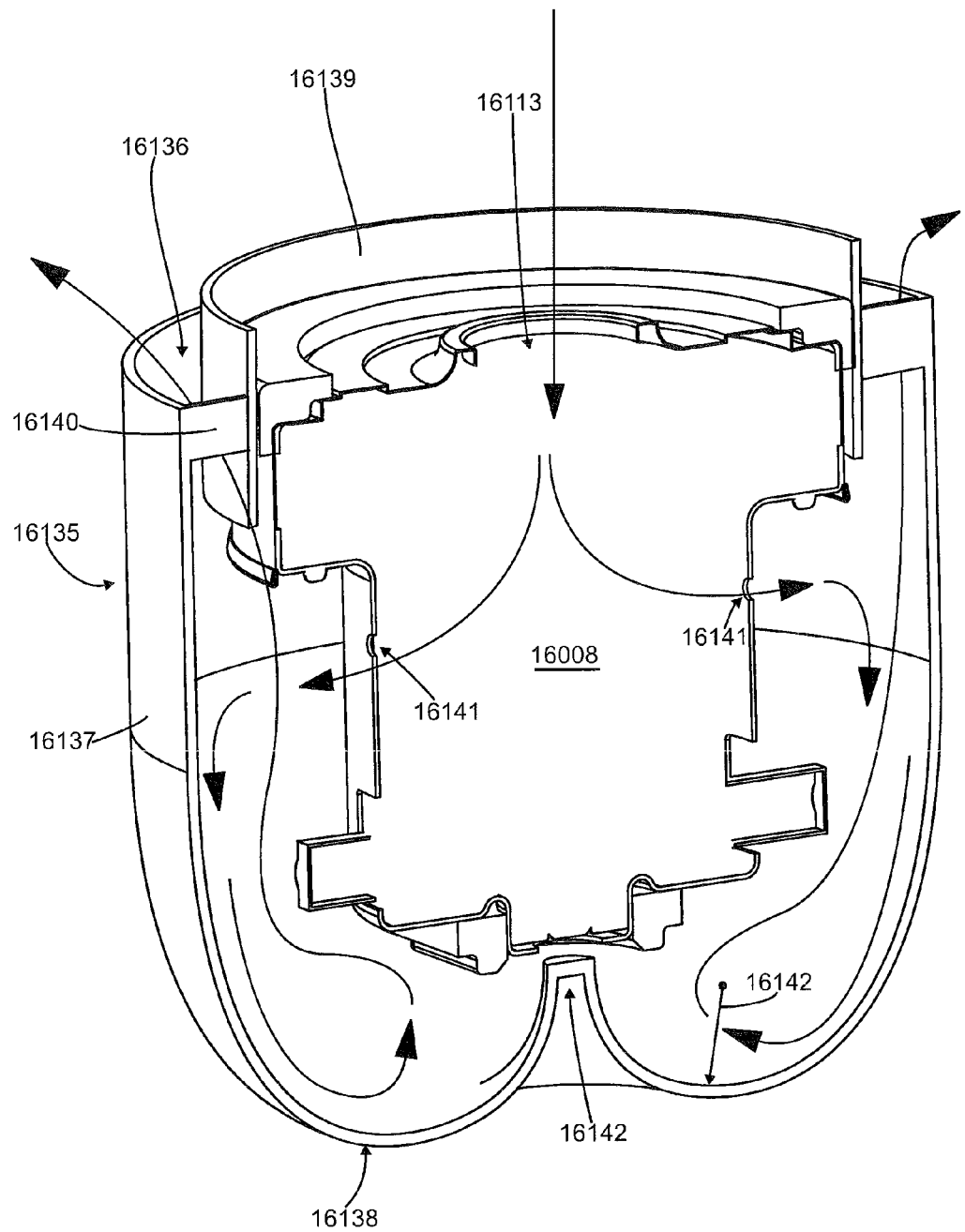
FIG. 63 is a perspective cut away of a suction motor housing of another embodiment of a surface cleaning apparatus.

Referring to FIG. 63, a schematic cross-sectional representation of another embodiment of a suction motor shroud 16135 is illustrated. The suction motor shroud 16135 is analogous to shroud 135, and analogous features may be identified using like reference characters indexed by 16,000. In this embodiment, the housing 16012 includes a sidewall 16137 surrounding the suction motor 16008 and a bottom wall 138. The suction motor 16008 is mounted to a collar 16139 that is suspended within the housing 16012 via ribs 16140.

In this configuration, air enters the suction motor 16008 via its air inlet 16113 and exits via the motor outlet 16141, which is in the radial direction in the illustrated example. From the air outlet 16141, the air is directed downwardly and flows toward the bottom wall 16138. In the illustrated embodiment, the bottom wall 16138 is curved or scalloped to help smoothly redirect the airflow upwards, towards the air outlet 16136 (which in this example is a generally annular gap between the wall 13137 and collar 16139). Providing curved surfaces on the bottom wall 16138 may help reduce turbulence in the airflow and may help reduce the noise escaping the suction motor housing by directing some of the noise inwardly. The radius 16142 of the curved portions of the wall 16138 may be any suitable radius. Upstanding projection 16142 extends upwardly from the bottom wall 16138 and helps form the curved portions of the bottom wall 16138 into a generally torus-like configuration, instead of forming a single continuous bowl-like surface covering the entire lower end of the shroud 16135. This may help prevent air from flowing across the centerline of the shroud 16135, which may help prevent mixing or other turbulent behavior.

Figure 64:
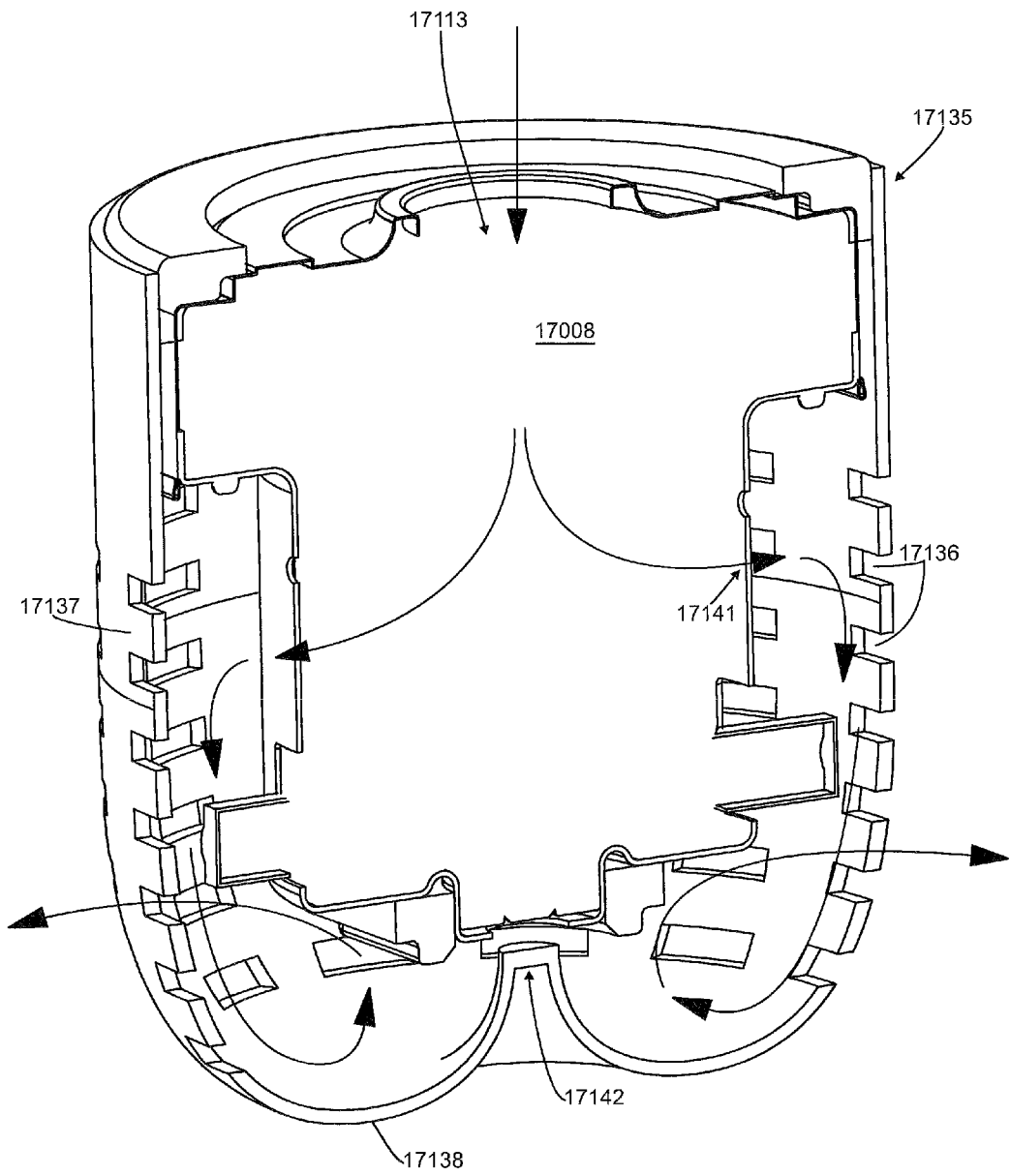
FIG. 64 is a perspective cut away of a suction motor housing of another embodiment of a surface cleaning apparatus.

Referring to FIG. 64, another embodiment of a motor shroud 17135 is shown. Shroud 17135 is generally similarly to shroud 135 and analogous features are indicated using like reference characters indexed by 17000. In this embodiment the upper end of the shroud 17135 is closed and supports the upper end of the motor 17008. The bottom end of the shroud 17135 includes a bottom wall 17138 that is curved. As air exits the air outlet 17141 of the suction motor 17008 it can flow downwardly within the shroud 17135 and may be re-directed smoothly by the rounded wall 17138, and then ejected via the air apertures 17136. Providing a smooth transition surface on bottom wall 17138 to re-direct and guide the air flow may help reduce the turbulence and may help smooth the air flow. This may help reduce noise generated by the surface cleaning apparatus. An upstanding projection 17142 projects inwardly from the bottom wall 17138 and helps shape the bottom of the shroud 17135 into a generally torus-shaped configuration as opposed to a generally bowl-like shape. Providing projection 17142 may help prevent air from flowing across the center of the shroud 17135 (i.e. from left to right as illustrated, or vice versa) which may help limit mixing or other turbulence inducing flows.

Figure 65:
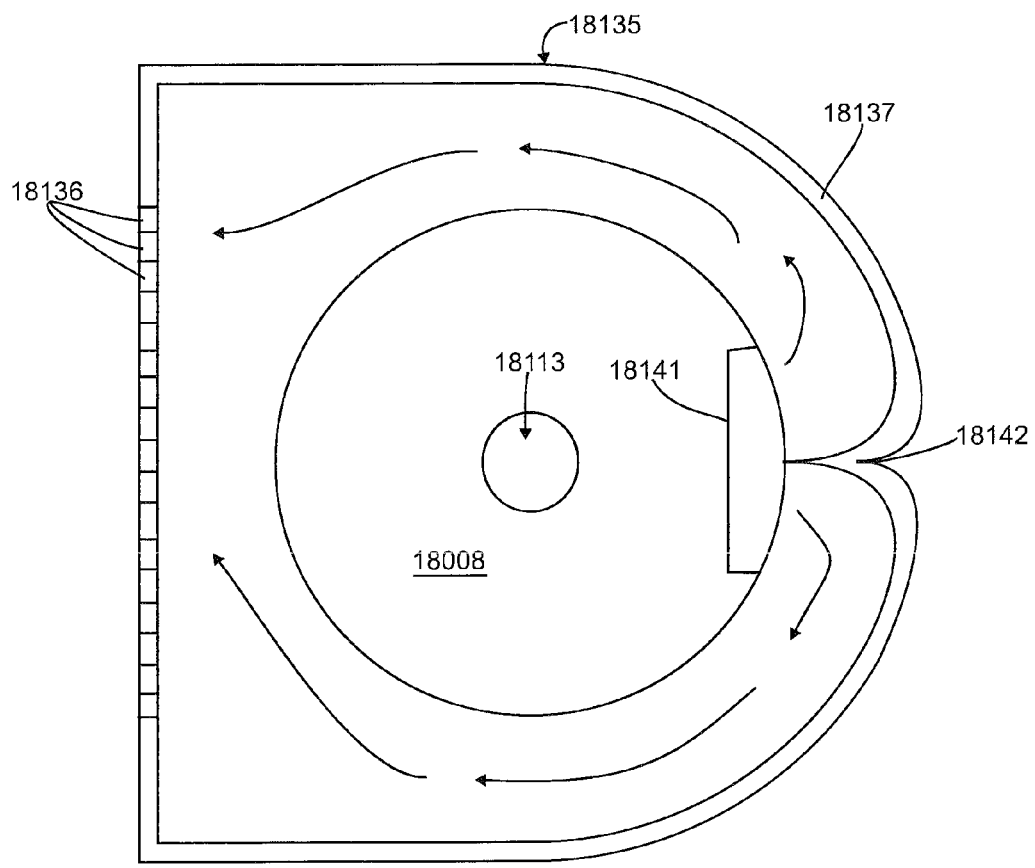
FIG. 65 is a perspective cut away of a suction motor housing of another embodiment of a surface cleaning apparatus.

Referring to FIG. 65, another embodiment of a motor shroud 18135 is shown. Shroud 18135 is generally similarly to shroud 135 and analogous features are indicated using like reference characters indexed by 18000. Alternatively, or in addition, to providing rounded features on the end wall or bottom surface of the shroud 18135, the shroud 18135 may also be configured to include scalloped or rounded portions in the sidewall of the shroud 18137. FIG. 65 is a top view of section motor 18008 positioned within the shroud 18135 and the motor 18008 is configured to receive air via air inlet 18113 and to eject air radially via outlet 18141. In the illustrated example, radial air outlet 18141 is directed in one direction, to the right as illustrated, such that air exiting the motor will tend to be directed to the right side of the shroud 18135 as illustrated. In this configuration, portions of the sidewall 18137 that are facing the air outlet 18141 may be curved to help guide and direct air exiting the outlet 18141 and directed inwardly and, optionally, to an opposing side of the shroud 18135 that comprises the air apertures 18136. Optionally, a projection 18142 can extend inwardly from the sidewall 18137 to divide the interior of the shroud 18135 into two portions and to prevent airflow at the outlet 18141 from mixing. Providing the air outlet 18141 directly opposite (i.e., 180° apart from) the air apertures 18136 may help extend the amount of time it takes for air exiting the motor to reach the apertures 18136 which may increase the likelihood that air exiting the outlets 18136 will be smooth or laminar which may help reduce noise output. Alternatively, instead of the configuration illustrated, the air outlet has a motor 18141 may be positioned at any relative orientation to the air outlets 18136 including for example 90° to the outlets 18136 or directly opposite the outlets 18136.

Motor Shroud

The following is a description of a suction motor shroud that may be used by itself in any surface cleaning apparatus or in any combination or sub-combination with any other feature or features disclosed herein.

Figure 66:
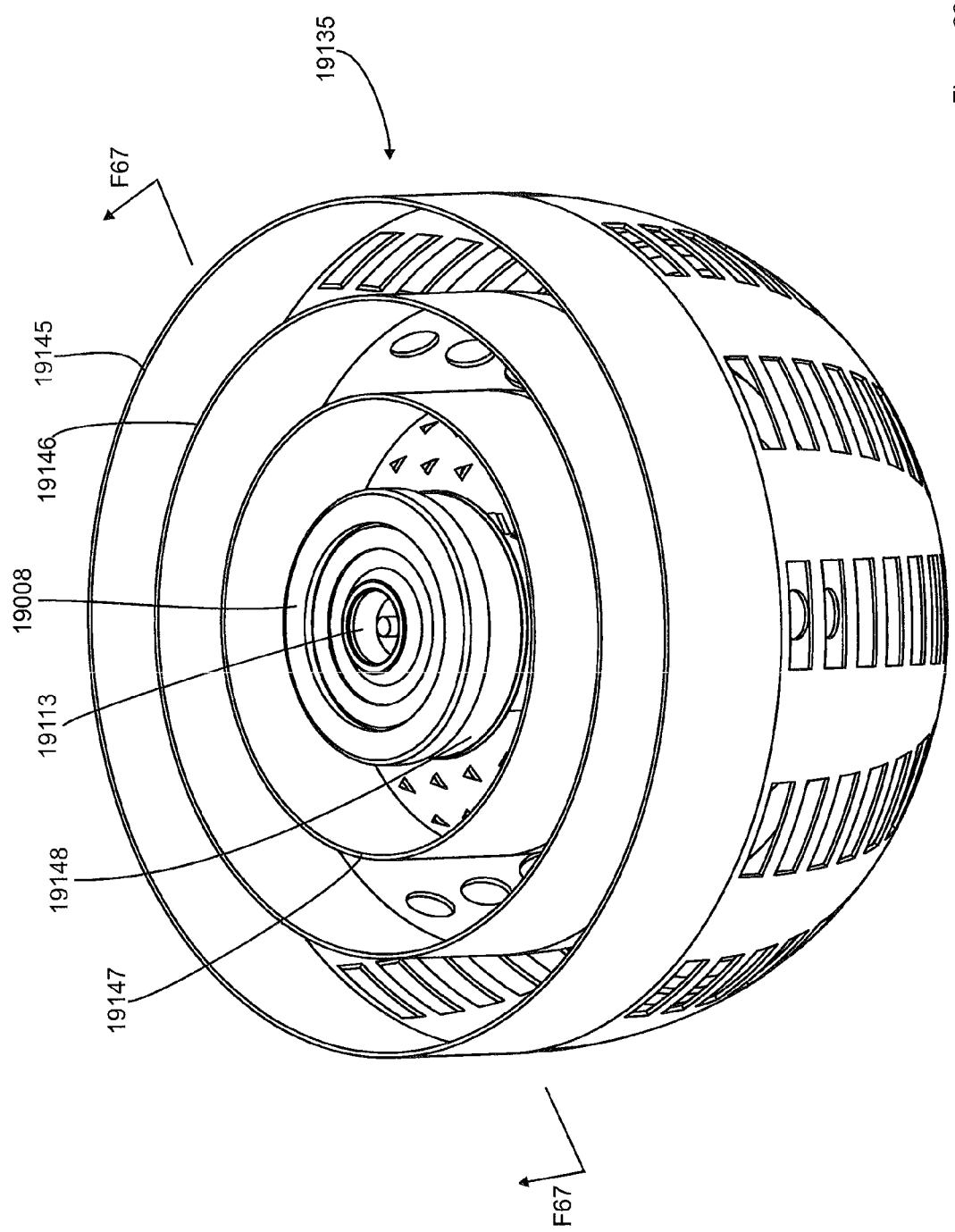
FIG. 66 is a perspective view of a suction motor housing of another embodiment of a surface cleaning apparatus.
Figure 67:
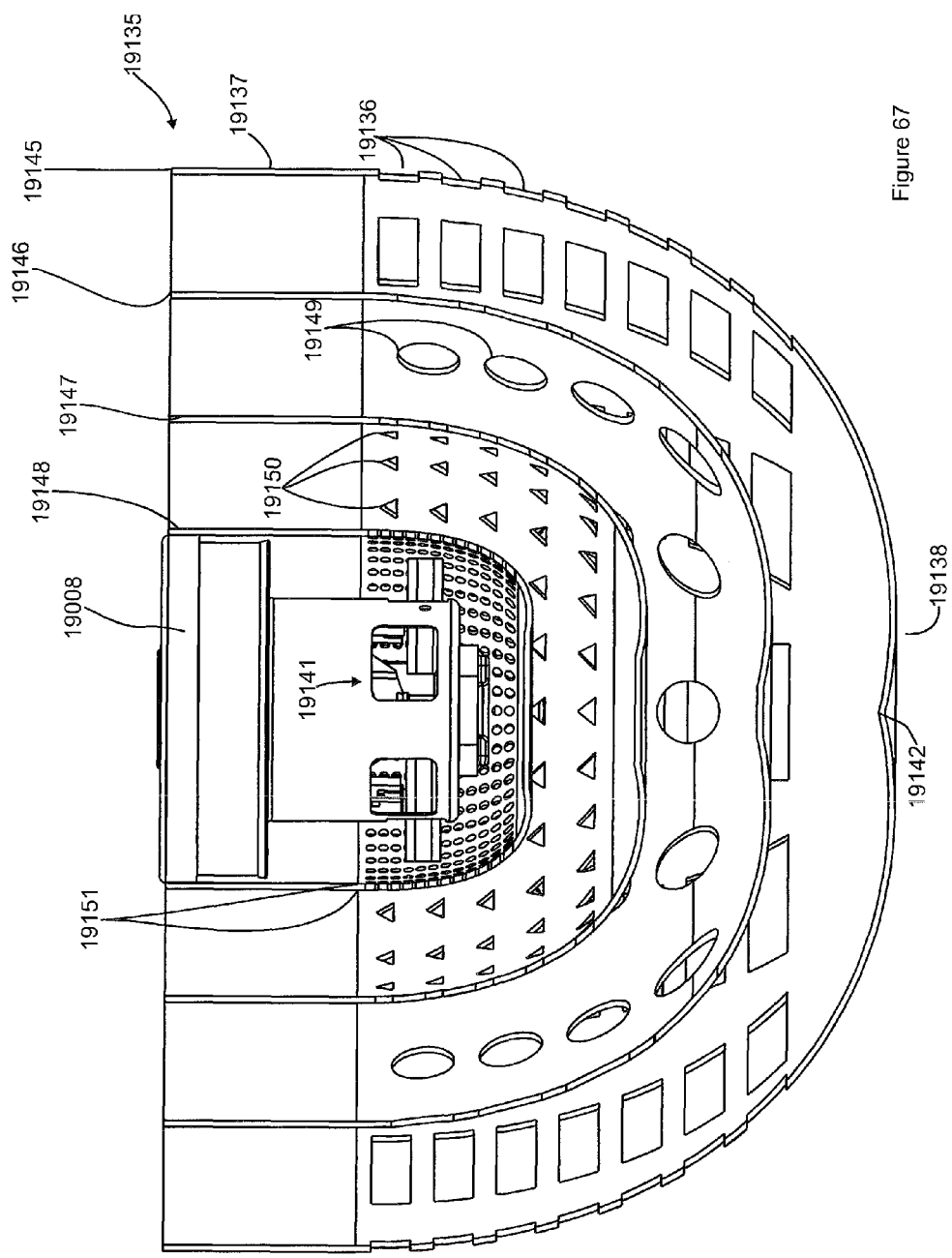
FIG. 67 is a cross sectional view of the portion of the surface cleaning apparatus of FIG. 66; and, FIG. 68 is a schematic representation of an embodiment of a sound absorbing material.

Referring to FIG. 66, an alternate embodiment of a motor shroud 19135 is shown. Shroud 19135 is generally similar to motor shroud 135 in analogous features will be identified using like reference characters indexed by 19000's. In this embodiment, instead of comprising a single layer, the motor shroud 19135 includes four concentric sub-shrouds 19145, 19146, 19147 and 19148. Each sub-shroud 19145, 19146, 19147 and 19148 is positioned to generally surround the motor 19008 and to nest amongst the other sub-shrouds. Referring also to FIG. 67, in this configuration air flowing radially from the suction motor outlets 19141 will sequentially pass through each sub-shroud 19148, 19147, 19146, 19145 before reaching the outer most air apertures 19136.

Optionally, each sub-shroud can be provided with air openings or apertures of a different configuration. For example, apertures in the sub-shrouds may be of different sizes, different shapes and may be in different positions relative to each other. Providing apertures or openings of different sizes and/or configurations may help limit overall noise output as each opening may be relatively more effective at screening noise at a given frequency and therefore stacking the openings in sequence may help sequentially filter out a variety of different frequencies.

In the illustrated example, the outer most sub-shroud 19145 may form the overall outer wall 19137 of the shroud 19135 and includes generally rectangular apertures 19136. The next sub-shroud 19146 includes a plurality of generally circular air apertures 19149. The apertures 19149 can be sized so that they have a different cross-sectional area than rectangular apertures 19136 and can be positioned such that they are generally radially aligned with or alternatively generally radially offset from apertures 19136 in the outer wall 19137. The next shroud 19147 includes a plurality of generally smaller, triangular shaped apertures 19150 and the inner most shroud 19148 contains a plurality of even smaller circular apertures 19151. The number of apertures formed on any given shroud and their configuration, shape and/or surface area may be varied and may be selected to help filter out given frequencies generated by suction motor 19008 and air flow flowing through the shroud 19135. While the illustrated with an open top, the shroud 19135 may have an upper cover or upper wall that is solid to seal the upper ends of all of the shrouds and to help direct air to flow radially outwardly through the apertures.

Sound Absorbing Material

The following is a description of a sound absorbing material that may be used by itself in any surface cleaning apparatus or in any combination or sub-combination with any other feature or features disclosed herein.

Optionally, portions of the surface cleaning apparatus 1 can be formed from or covered/lined with a sound absorbing or sound dampening material. The material may include a plurality of regions of different density. Portions of the material at a given density may tend to resonate at a given natural frequency, and the densities of the regions in the material may be selected so that the regions will resonate, or not resonate, at frequencies that are likely to be produced by the suction motor 8 and air flowing through the housing 12. Providing different regions with different densities, each having their own natural frequency, may allow the sound absorbing material to counter act noises at a variety of different frequencies. This may be advantageous when compared to a generally homogenous material that may tend to have a single natural frequency. Accordingly, a sheet of sound absorbing material may be constructed from portions of different sound absorbing materials that are adhered together to some a continuous self-supporting sheet.

For example, the sound absorbing material may include a plurality of pieces of different sound absorbing material or nodes held within a surrounding matrix. The plurality of nodes may include variety of different nodes having different shapes, sizes and/or densities. Optionally, the nodes may be made from the same material as each other, or some of the nodes may be made from a different material. Similarly, some or all of the nodes may be formed from the same material as the surrounding matrix, or alternatively the matrix may be formed from a different material than the nodes.

Each of the nodes and surrounding matrix may be formed from any suitable material, including, for example, one or more of polyurethane, polypropylene, polyethylene, rubber, ABS plastic, other plastics, glass, metal and composite materials.

Figure 68:
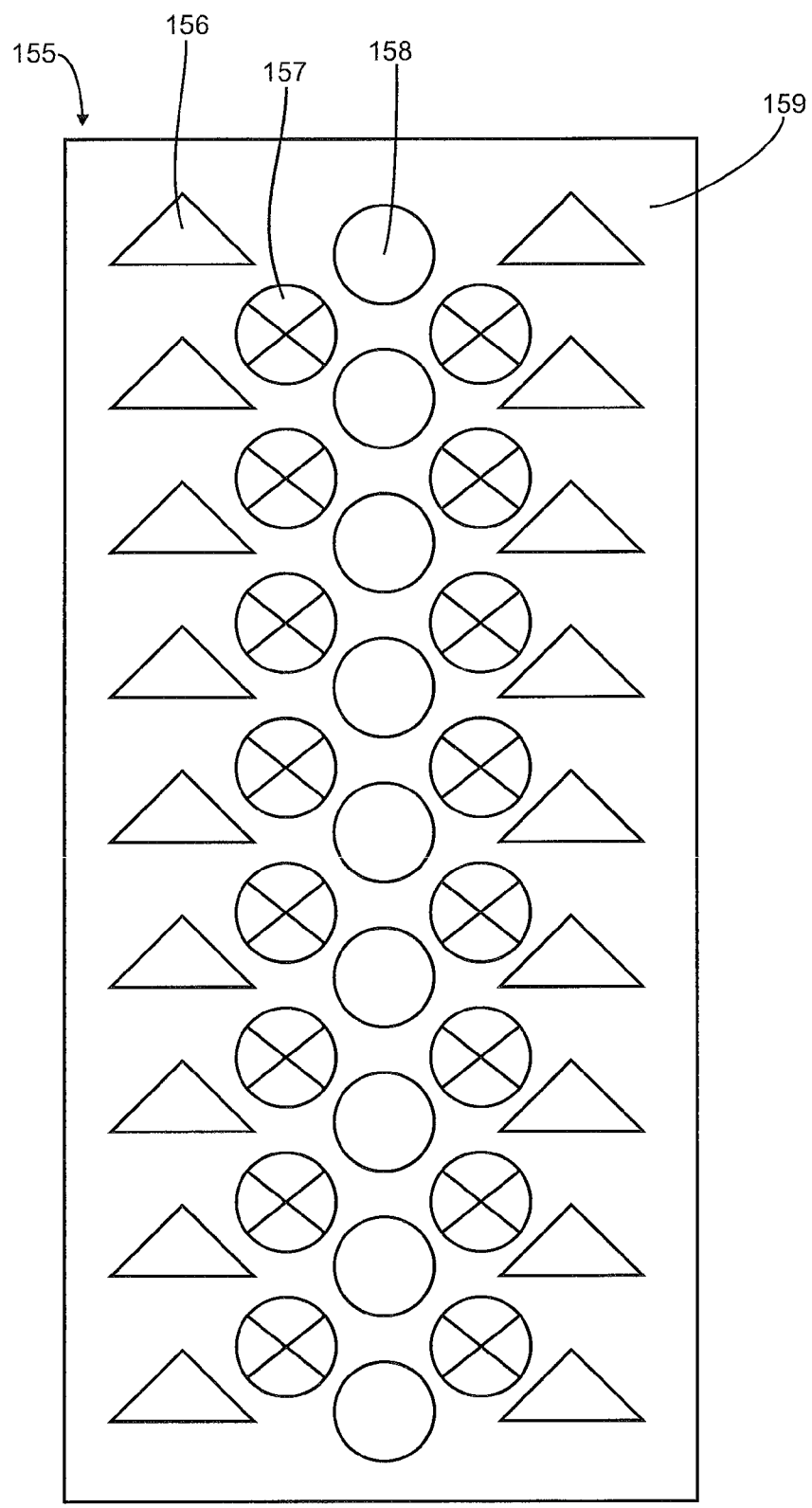

Referring to FIG. 68, a schematic representation of a material 155 that includes three sets of nodes 156, 157 and 158 held within a surrounding matrix of material 159 is provided. Each set of nodes 156, 157, 158 has a different density, and optionally may have a different shape as illustrated. Alternatively, the nodes 156, 157, 158 may have different shapes and the same density, or different densities and the same shapes.

Optionally, the nodes 156, 157, 158 may be generally randomly distributed within the matrix 159. Alternatively, the nodes 156, 157, 158 may be arranged in pre-determined patterns.

In the illustrated embodiment, each set of nodes 156, 157, 158 may tend to resonate at a different natural frequency due to their varying densities and geometries. Excitation of any given set of the nodes 156, 157, 158 by sound produced by the surface cleaning apparatus 1 may cause the set of nodes 156, 157, 158 to vibrate. The matrix 159 may absorb and/or dissipate some or all of the vibrations, thereby dampening sound waves at the given frequency, and reducing the amount of sound that passes through the material 155.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What is claimed is:

1. A cyclone comprising a cyclone chamber having an air inlet, a vortex finder, a first end wall, a second end wall and a sidewall, the air inlet has an inlet end having a shape and a cross sectional area in a plane transverse to a direction of airflow through the air inlet, and the air inlet is provided at a first juncture of the sidewall and the first end wall and is located on the first end wall, the vortex finder is provided on the first end wall and has a wall that meets the first end wall at a second juncture, wherein the air inlet comprises an enclosed, curved passage provided inside the cyclone chamber, the passage comprising an outlet of the air inlet, the passage has a radial inner side and the radially inner side of the passage is spaced from the vortex finder by a radial offset distance whereby a portion of the cyclone chamber is located in the offset distance and the portion of the cyclone chamber has an absence of an air inlet introducing air directly into the portion, the sidewall having a diameter at an outlet end of the passage and the passage is located within the diameter.

2. The cyclone of claim 1 wherein the cyclone chamber has a diameter and the air inlet is spaced from the vortex finder by a distance that is up to 10% of the diameter.

3. The cyclone of claim 1 wherein a portion of the first end wall extends between the air inlet and the vortex finder and the portion is rounded.

4. The cyclone of claim 1 wherein a portion of the first end wall extends between the air inlet and the vortex finder and the portion is flat.

5. The cyclone of claim 1 wherein the vortex finder extends into the cyclone chamber a first distance and the air inlet has an inner end that extends into the cyclone chamber a distance less than the first distance.

6. The cyclone of claim 1 wherein at least one of the first and second junctures extends at an angle to the walls between which it is positioned.

7. The cyclone of claim 1 wherein at least one of the first and second junctures is rounded.

8. The cyclone of claim 7 wherein at least one of the first and second junctures has a radius that is proximate a radius of the air inlet.

9. The cyclone of claim 6 wherein the first end wall is openable and at least a portion of one of the first and second junctures is part of the openable first end wall.

10. The cyclone of claim 1 wherein the first juncture downstream of the air inlet has the same shape as a portion of the inlet end that is adjacent the first juncture.

11. The cyclone of claim 6 wherein the first juncture extends at an angle to both the sidewall and the first end wall.

12. The cyclone of claim 11 wherein the first juncture is rounded.

13. The cyclone of claim 6 wherein the second juncture is rounded.

14. The cyclone of claim 1 wherein the first juncture has a radius that is proximate a radius of the air inlet and the second juncture has a radius that is proximate the radius of the first juncture.

15. The cyclone of claim 1 further comprising a central insert member extending away from a center of the second end wall into the cyclone chamber and the central insert member comprises a central member wall extending away from the second end wall and the central member wall and the second end wall meet at a third juncture that extends at an angle to both the central member wall and the second end wall.

16. The cyclone of claim 15 wherein the third juncture is rounded.

17. The cyclone of claim 15 further comprising a dirt collection chamber external to the cyclone chamber and in communication with the cyclone chamber via a dirt outlet.

18. The cyclone of claim 17 wherein the sidewall extends to the second end wall and the dirt outlet is provided in the sidewall adjacent the second end wall.

19. The cyclone of claim 15 wherein each of the vortex finder and the central insert member has an inner end and a screen extends between the inner ends.

20. The cyclone of claim 1 wherein the vortex finder comprises a screen, wherein the screen has an inner end, the inner end has a cross sectional area in a plane transverse to a direction of airflow through the vortex finder and the cross sectional area of the inner end is less than the cross sectional area of the air inlet.

21. The cyclone of claim 1 wherein the passage is spaced from the vortex finder such that a portion of the first end wall on which the vortex finder is provided extends around all of the vortex finder such that the portion of the first end wall is also positioned between the passage and the vortex finder.

* * * * *